US012159281B2

(12) United States Patent
Petersen et al.

(10) Patent No.: US 12,159,281 B2
(45) Date of Patent: Dec. 3, 2024

(54) SYSTEMS, METHODS, AND COMPUTING PLATFORMS FOR MANAGING NETWORK ENABLED SECURITY CODES

(71) Applicant: 1080 Network Inc., Lakeway, TX (US)

(72) Inventors: Christopher Petersen, Lakeway, TX (US); Tim Kuchlein, Lakeway, TX (US)

(73) Assignee: 1080 Network, Inc., Lakeway, TX (US)

( * ) Notice: Subject to any disclaimer, the term of this patent is extended or adjusted under 35 U.S.C. 154(b) by 0 days.

(21) Appl. No.: 18/363,796

(22) Filed: Aug. 2, 2023

(65) Prior Publication Data

US 2024/0086919 A1    Mar. 14, 2024

Related U.S. Application Data

(60) Provisional application No. 63/370,278, filed on Aug. 3, 2022.

(51) Int. Cl.
*G06Q 20/40*    (2012.01)
*G06Q 20/38*    (2012.01)

(52) U.S. Cl.
CPC ..... *G06Q 20/4014* (2013.01); *G06Q 20/3829* (2013.01); *G06Q 20/407* (2013.01)

(58) Field of Classification Search
None
See application file for complete search history.

(56) References Cited

U.S. PATENT DOCUMENTS

| | | | |
|---|---|---|---|
| 2012/0054046 A1* | 3/2012 | Albisu | G06Q 20/3274 705/16 |
| 2015/0220917 A1* | 8/2015 | Aabye | G06Q 20/3278 705/64 |
| 2015/0278815 A1* | 10/2015 | Randazza | G06Q 20/202 705/72 |
| 2016/0182497 A1 | 6/2016 | Smith | |

(Continued)

OTHER PUBLICATIONS

ISA/220—Notification of Transmittal or Search Report and Written Opinion of the ISA, or the Declaration Mailed on Nov. 21, 2023 for WO Application No. PCT/US23/071570, 1 page(s).

(Continued)

*Primary Examiner* — Steven S Kim
*Assistant Examiner* — Jason B Fenstermacher
(74) *Attorney, Agent, or Firm* — Alston & Bird LLP

(57) ABSTRACT

Various embodiments of the present disclosure provide techniques for facilitating a credential-less exchange over a network using a plurality of identifier mappings, member interfaces, and security code tuples that are tailored to an ephemeral key. The techniques may include receiving a secured interaction request and issuing or enabling a previously issued universally unique ephemeral key (UUEK) in response to the secured interaction request. The techniques may include validating a user, instrument, or UUEK and, in response, storing a secured event for the user, instrument, or UUEK and providing a secured interaction response indicative of the secured event. The techniques may include subsequently receiving an exchange request for executing a value-based exchange using the UUEK and facilitating the exchange request based at least in part on the secured event.

20 Claims, 12 Drawing Sheets

(56) References Cited

U.S. PATENT DOCUMENTS

| | | |
|---|---|---|
| 2019/0333055 A1* | 10/2019 | Mohammed .......... H04L 9/3234 |
| 2020/0092269 A1 | 3/2020 | Le Saint et al. |
| 2020/0322135 A1 | 10/2020 | Kupwade Patil et al. |
| 2021/0090074 A1* | 3/2021 | Powell ................. G06Q 20/367 |
| 2023/0298027 A1* | 9/2023 | Mayo ............... G06Q 20/40145 |
| | | 705/44 |

OTHER PUBLICATIONS

Outgoing—ISA/210—International Search Report Mailed on Nov. 21, 2023 for WO Application No. PCT/US23/071570, 2 page(s).
Outgoing Written Opinion of the ISA Mailed on Nov. 21, 2023 for WO Application No. PCT/US23/071570, 4 page(s).

* cited by examiner

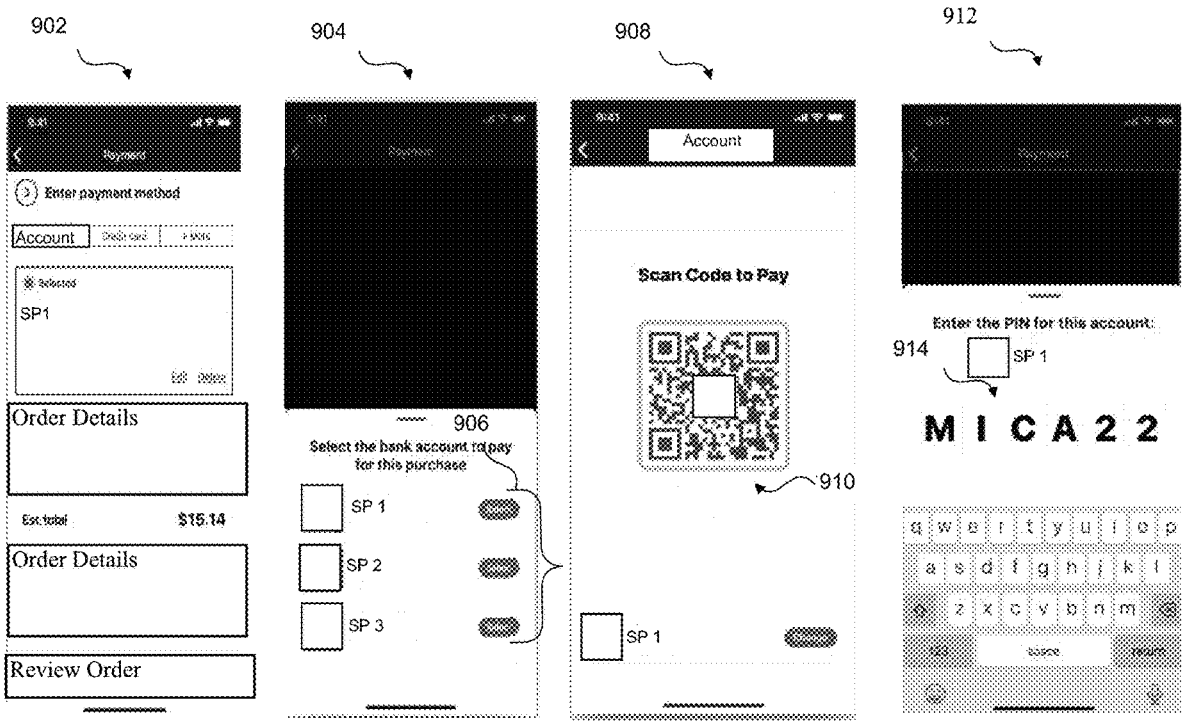

SYSTEMS, METHODS, AND COMPUTING PLATFORMS FOR MANAGING NETWORK ENABLED SECURITY CODES

CROSS-REFERENCE TO RELATED APPLICATIONS

This application claims the benefit of U.S. Provisional Patent Application Ser. No. 63/370,278 filed on Aug. 3, 2022, which is incorporated herein by reference in its entirety, including any figures, tables, drawings, and appendices.

TECHNOLOGICAL FIELD

Embodiments of the present disclosure generally relate to network enabled security codes.

BACKGROUND

Various embodiments of the present disclosure address technical challenges related to network-based exchanges given limitations of existing exchange processing techniques and architectures. Existing processes for executing an exchange over a computing network rely on the use of persistent credentials, such as payment credentials (e.g., card numbers, usernames, passwords, bank routing numbers, account numbers, etc.) and their proxies, which expose recipients of the credentials to fraud, regulatory and compliance costs, and reputational risk. Moreover, due to the static nature of traditional credentials, users must accept risk of financial loss, damaged credit scores, identity theft, and other outcomes each time the user provides their credentials to enable an exchange. The inherent lack of security of persistent credentials is conventionally addressed using strict communication protocols, data governance procedures, and authentication schemes, each of which introduce additional technical problems by adding overhead and complicating network-based transactions without solving the root technical problem of data security.

One technique, for example, includes the use of provider managed personal identification numbers (PINs) and/or other security codes that may be set by a user or the provider and then subsequently used to verify an exchange using a particular account. These codes may be encoded within a physical medium and automatically authenticated each time the physical medium is used to authorize an exchange. Alternatively, the codes may be provided with an exchange request to the provider to authorize each individual exchange.

Traditional codes lack flexibility and are insecure in a number of different ways. First, traditional codes are deployed as a four digit number, which presents attack vectors for malicious parties as they may be brute force attacked given a limited number of available combinations. Moreover, in order to work effectively, traditional codes must be provided at the same time that an exchange is requested. This leads to increased network traffic and increases the cost of an exchange even when the exchange is declined. Additionally, such codes traditionally apply to all exchanges, are not configurable for particular characteristics of a request (e.g., exchange value, time, etc.), are burdensome to change, and increase liability for a user (e.g., in the case that the code is encode to a physical medium) or a provider. These and other technical challenges limit the effectiveness of conventional security codes and, in turn, present security challenges for executing network-based exchanges.

Various embodiments of the present disclosure make important contributions to various existing network-based value exchange processing techniques by addressing each of these technical challenges.

BRIEF SUMMARY

Various embodiments of the present disclosure disclose a secure intermediary computing platform and computing services that facilitate the credential-less execution of a value-based exchange that leverages a UUEK (Universally Unique Ephemeral Key) to eliminate the use of persistent credentials. To do so, the intermediary computing platform may facilitate interactions between one or more member platforms to register a user and/or a user instrument in a value exchange system that is powered by a new, ephemeral data structure referred to herein as an UUEK. Unlike conventional exchange systems, the intermediary computing platform does not receive or rely upon persistent user or instrument credentials to register a user and/or a user's instrument. The elimination of such credentials enables the use of new, more flexible, interfaces, such as application programming interfaces (APIs) described herein, that are leveraged by the intermediary computing platform to communicate with different network members to register a user, a user's instrument, instrument policies, and different security codes without exposing user credentials at any step in the process. Once registered, the intermediary computing platform may issue UUEKs to a member platform that may replace traditional, persistent credentials. The issued UUEKs are not reflective of persistent credentials or any other sensitive user or instrument information. Interfaces between a member platforms and the intermediary platform may allow (i) a user to present the issued UUEK (without explicit reference to a persistent credential) from a member platform to an intermediate platform and (ii) the intermediary platform to map the issued UUEK to instrument keys for the same or another member platform and provide the instrument keys to the member platform to authorize a value-based exchange. In this way, network-based transactions may be authorized in a seamless process without exposing sensitive user or instrument information that may be susceptible to network attacks.

Some of the techniques of the present disclosure further enhance the security of network-based exchanges by leveraging flexible interfaces, such as APIs, between entities of a value-based exchange to establish security codes for a UUEK. The security codes may be used to enable and disable the use of UUEK for authorizing an exchange. In this way, the execution of a value-based exchange may be predicated based at least in part on the adjudication of security code for the UUEK. Importantly, the security codes are network administered and enable n-character codes that may vary in complexity. As described herein, this allows for the enforcement of instrument-specific security measures by an intermediary platform, without risk of exposing sensitive user or financial information, before an exchange authorization is ever provided to a service provider, such as a financial institution. Ultimately, the techniques of the present disclosure enable additional flexibility (e.g., through the use of new interfaces, etc.) and security (e.g., through the elimination of persistent credentials, introduction of new security codes, etc.), while reducing computing power requirements and enabling significantly greater network throughput for exchange processing relative to traditional techniques.

In some embodiments, a computer-implemented method comprises receiving, by one or more processors, a secured interaction request that is indicative of a security code input and a user identifier; identifying, by the one or more processors, a security code tuple for the security code input based on the user identifier; validating, by the one or more processors, the security code input based at least in part on a comparison between the security code input and a security code reference of the security code tuple; in response to validating the security code input, (i) storing, by the one or more processors, a secured event for the user, and (ii) providing, by the one or more processors, a secured interaction response indicative of the secured event, wherein the secured interaction response is indicative of at least one of (a) universally unique ephemeral key (UUEK) or (b) secured event for the UUEK; receiving, by one or more processors, an exchange request for executing a value-based exchange using the UUEK; providing, by the one or more processors, an exchange authorization request to the member platform, wherein the exchange authorization request is indicative of the instrument identifier and the secured event; and receiving, by the one or more processors, an exchange authorization response that is indicative of at least one of an exchange approval or an exchange denial, wherein the exchange authorization response is based at least in part on the secured event.

In some embodiments, a computing system comprises memory and one or more processors communicatively coupled to the memory, the one or more processors are configured to receive a secured interaction request that is indicative of a security code input and a user identifier; identify a security code tuple for the security code input based on the user identifier; validate the security code input based at least in part on a comparison between the security code input and a security code reference of the security code tuple; in response to validating the security code input, (i) store a secured event for the user, and (ii) provide a secured interaction response indicative of the secured event, wherein the secured interaction response is indicative of at least one of (a) universally unique ephemeral key (UUEK) or (b) secured event for the UUEK; receive an exchange request for executing a value-based exchange using the UUEK; provide an exchange authorization request to the member platform, wherein the exchange authorization request is indicative of the instrument identifier and the secured event; and receive an exchange authorization response that is indicative of at least one of an exchange approval or an exchange denial, wherein the exchange authorization response is based at least in part on the secured event.

In some embodiments, one or more non-transitory computer-readable storage media includes instructions that, when executed by one or more processors, cause the one or more processors to receive a secured interaction request that is indicative of a security code input and a user identifier; identify a security code tuple for the security code input based on the user identifier; validate the security code input based at least in part on a comparison between the security code input and a security code reference of the security code tuple; in response to validating the security code input, (i) store a secured event for the user, and (ii) provide a secured interaction response indicative of the secured event, wherein the secured interaction response is indicative of at least one of (a) universally unique ephemeral key (UUEK) or (b) secured event for the UUEK; receive an exchange request for executing a value-based exchange using the UUEK; provide an exchange authorization request to the member platform, wherein the exchange authorization request is indicative of the instrument identifier and the secured event; and receive an exchange authorization response that is indicative of at least one of an exchange approval or an exchange denial, wherein the exchange authorization response is based at least in part on the secured event.

BRIEF DESCRIPTION THE DRAWINGS

Having thus described the disclosure in general terms, reference will now be made to the accompanying drawings, which are not necessarily drawn to scale, and wherein:

Figure 6:
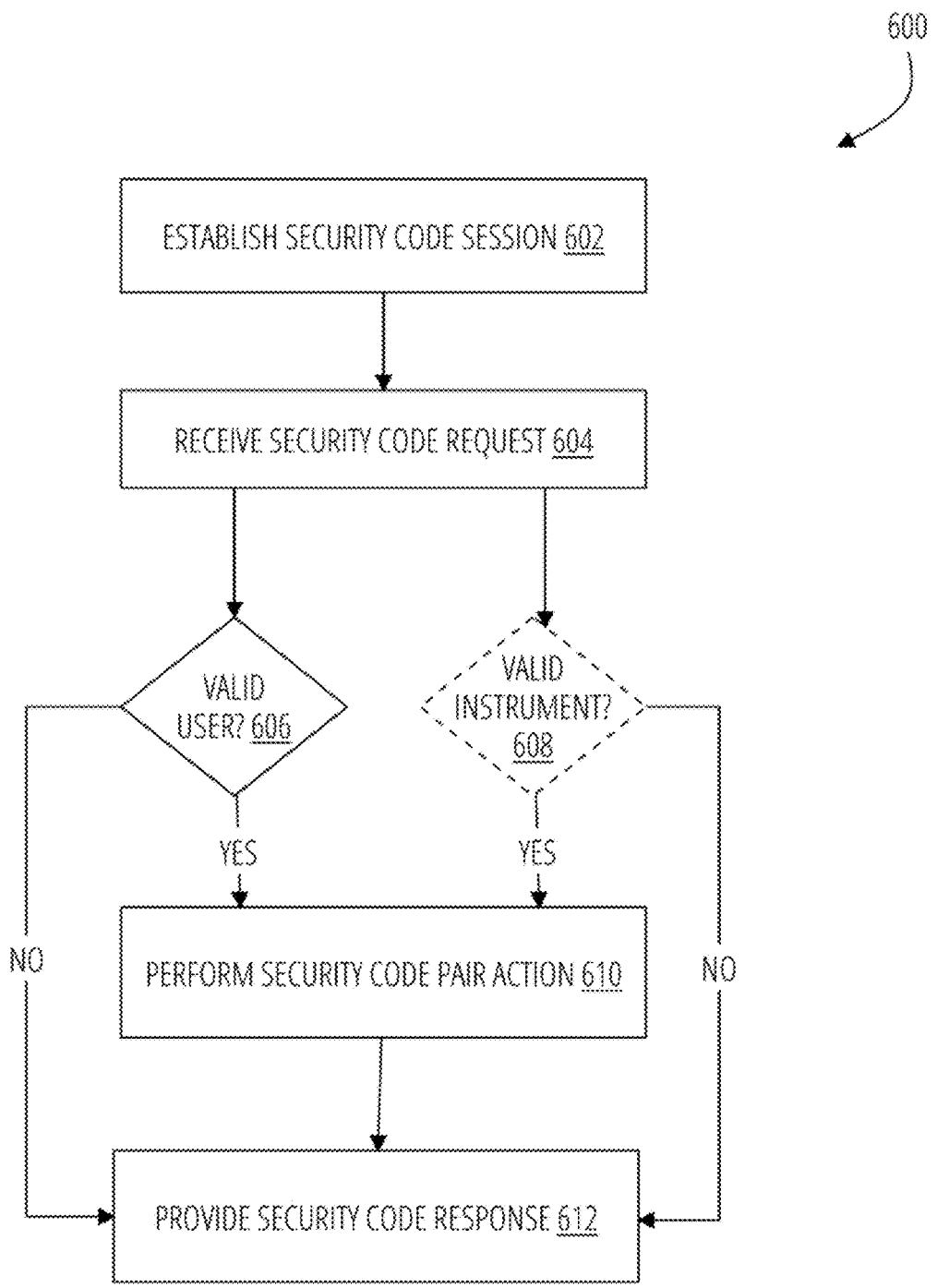
Figure 7A:
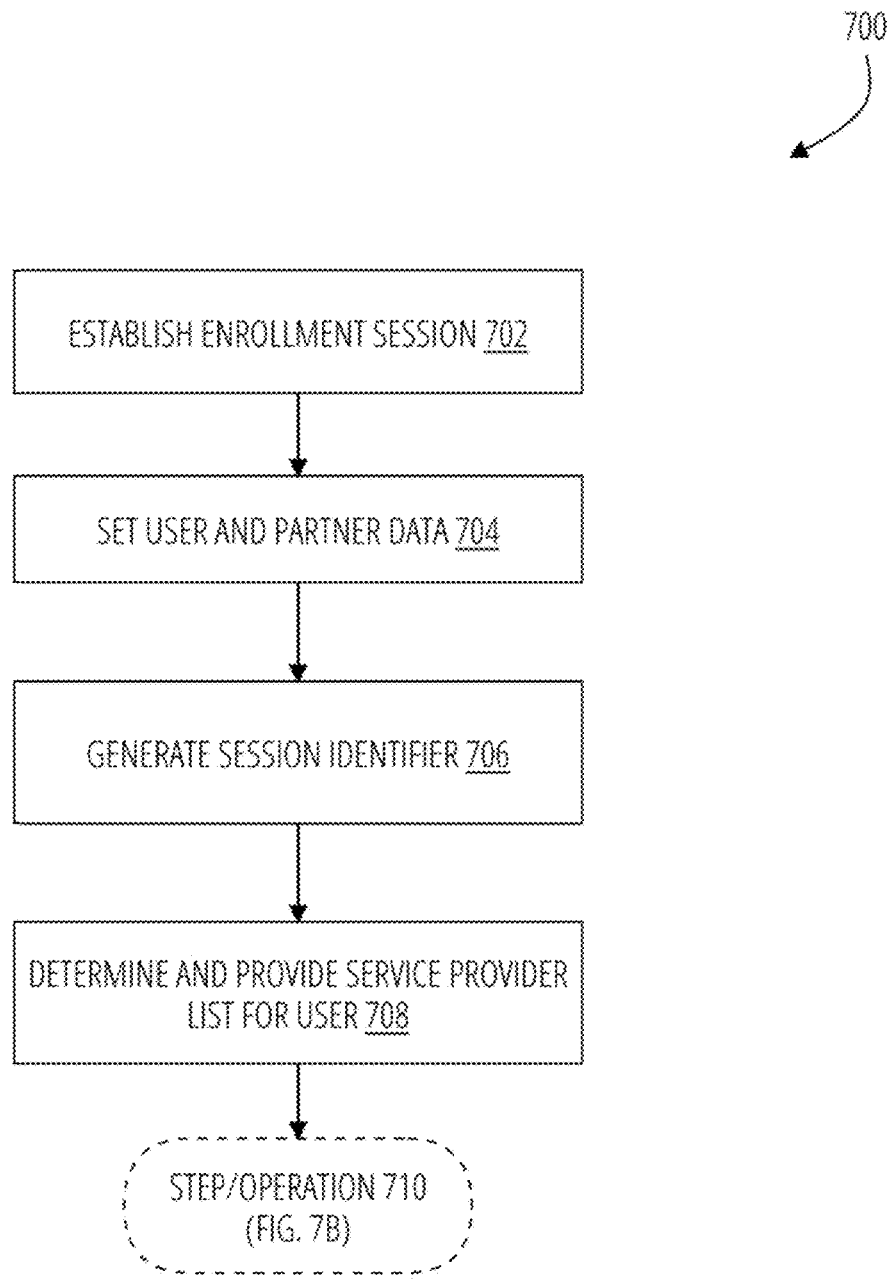
Figure 7B:
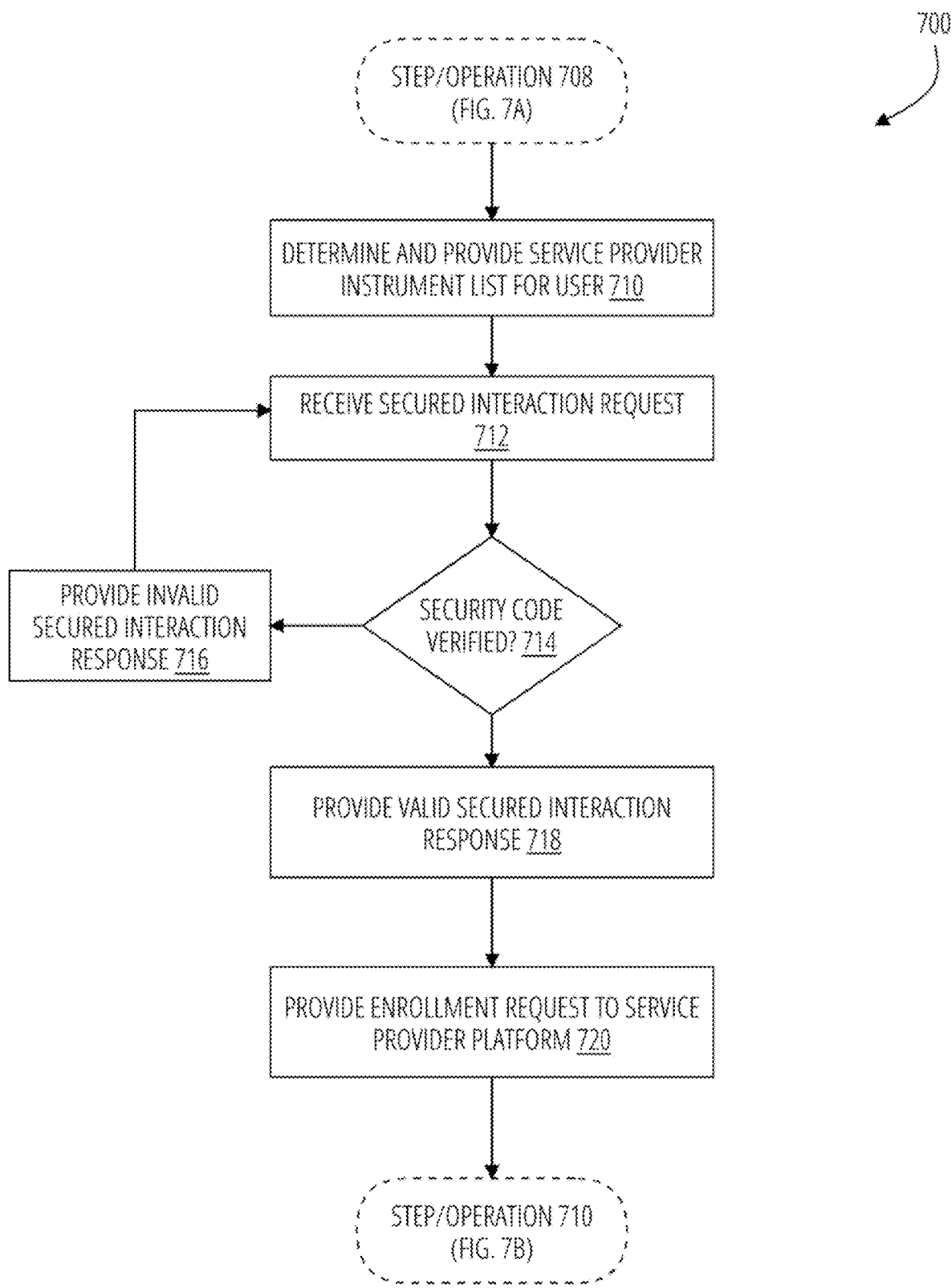
Figure 7C:
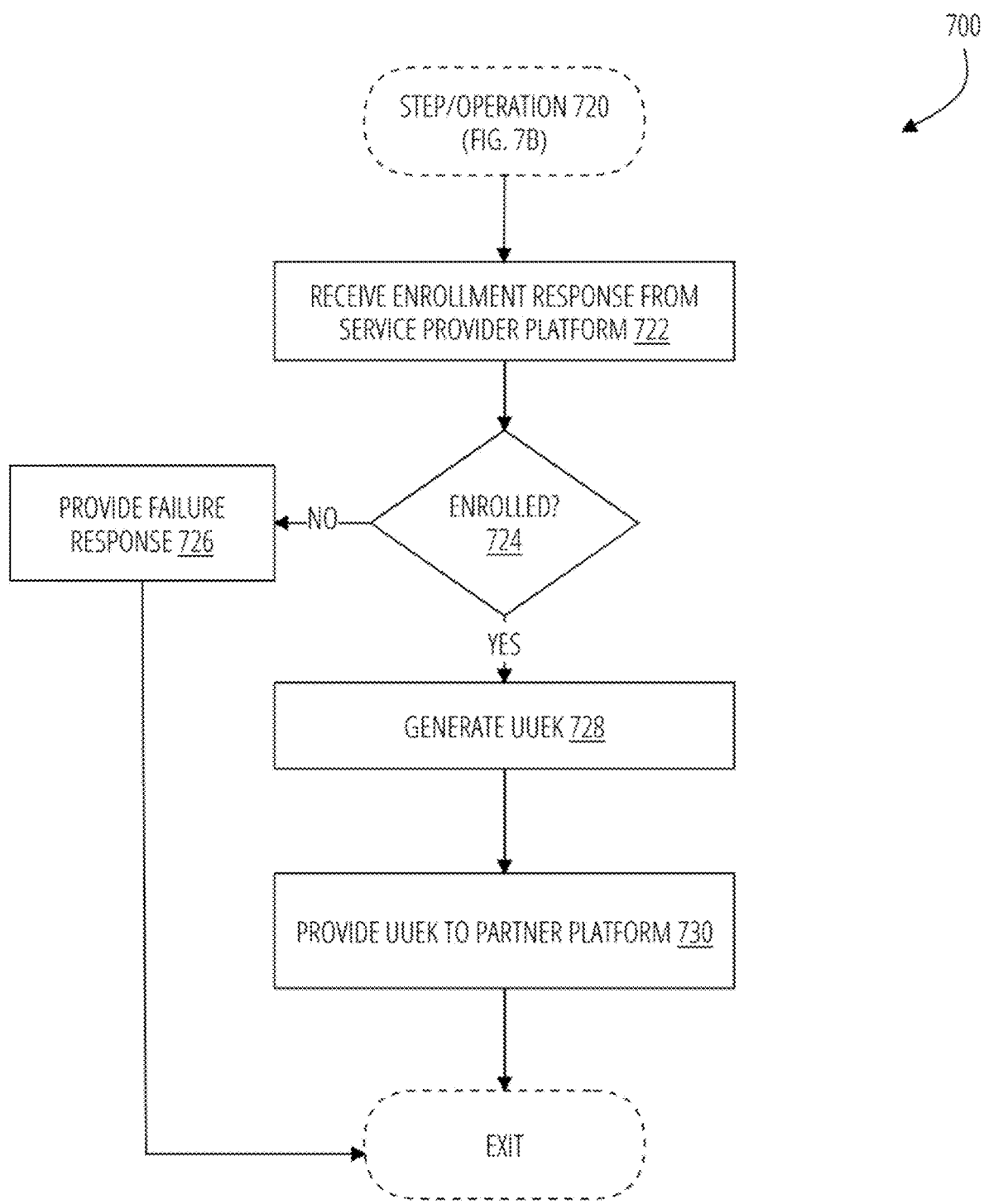
Figure 8A:
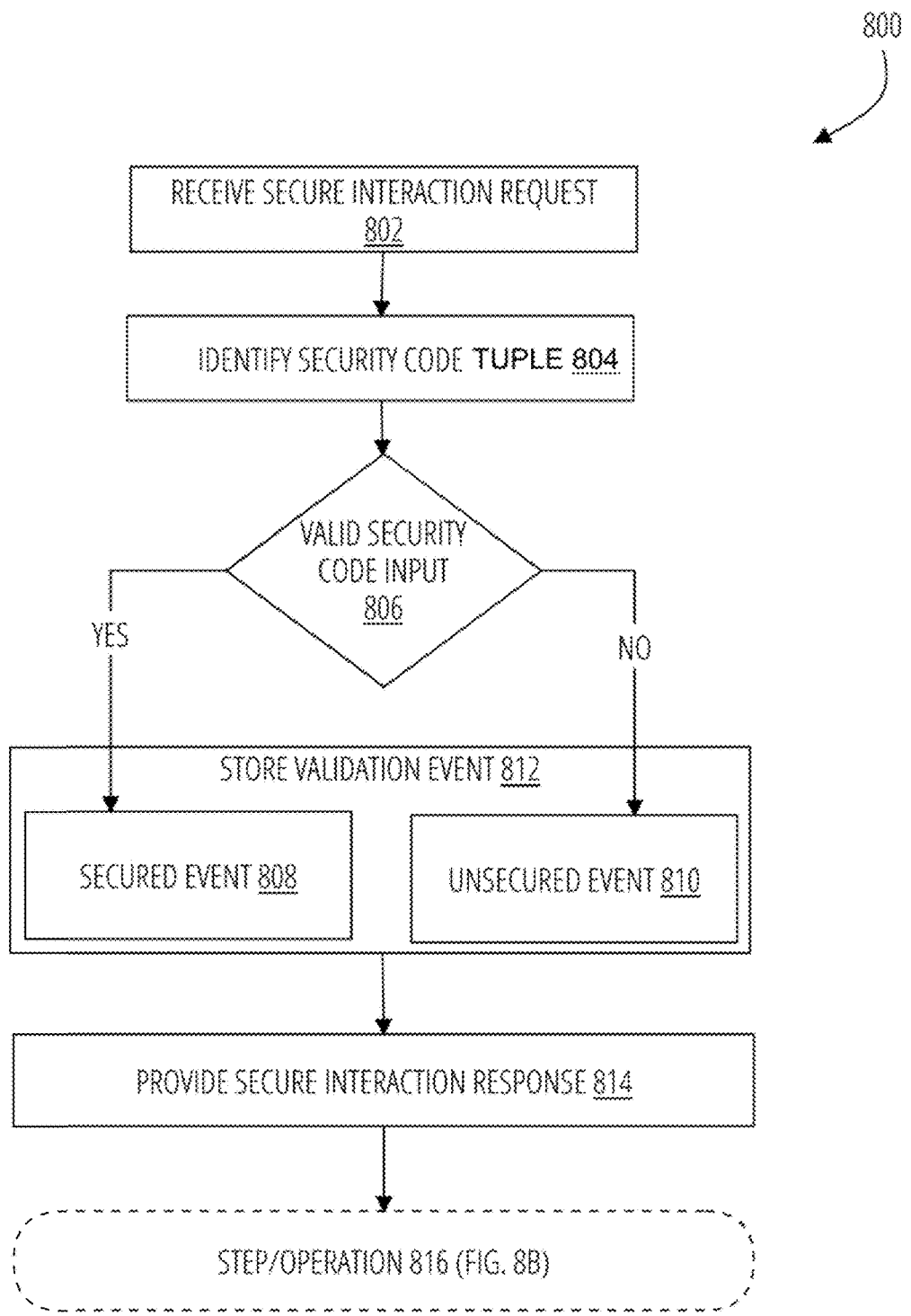
Figure 8B:
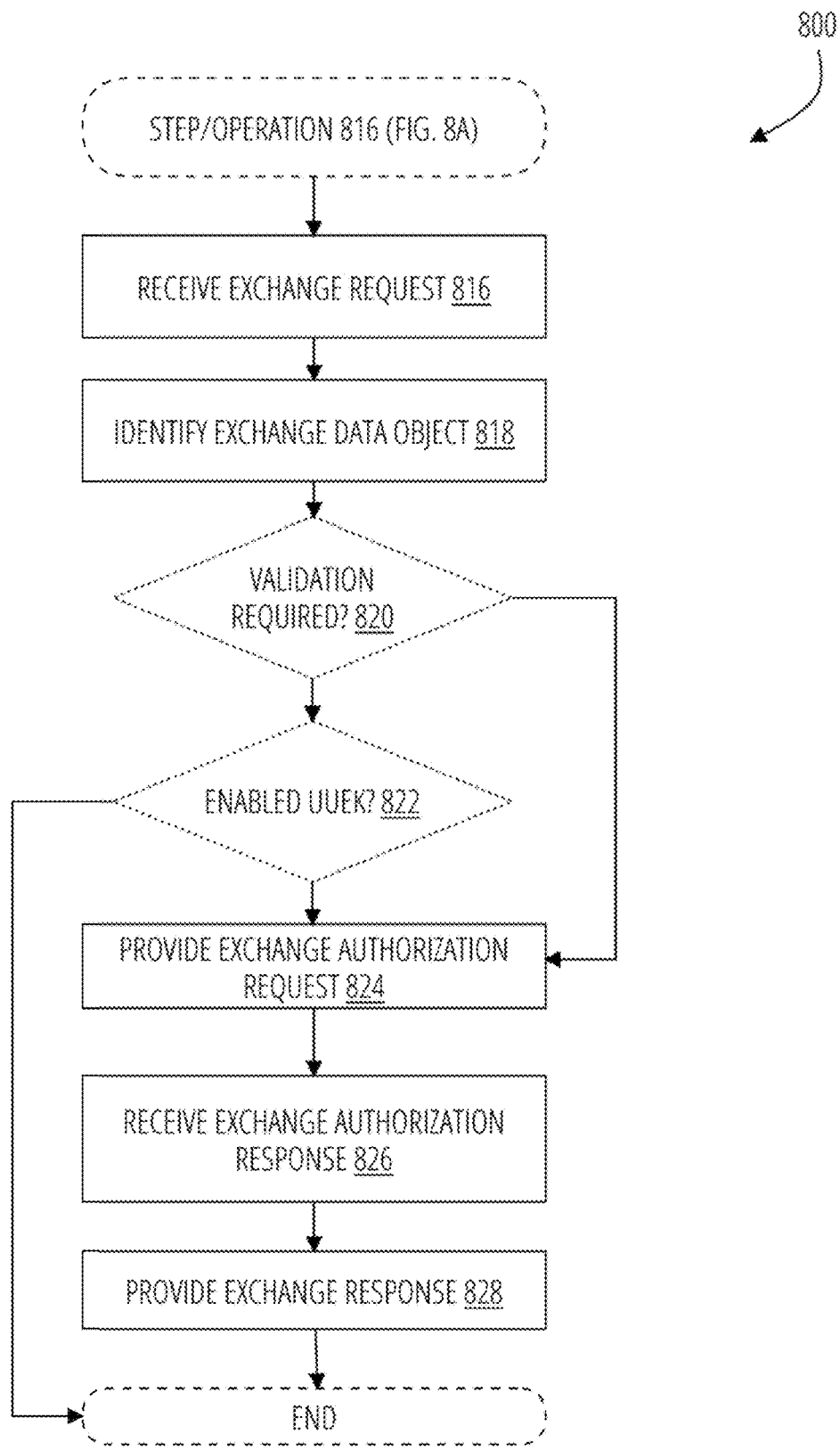

FIG. 6 provides a process flow for facilitating a network administered security code for a user in accordance with one or more embodiments of the present disclosure;

FIGS. 7A-C provide process flows for establishing a secured cross-entity relationship in accordance with one or more embodiments of the present disclosure;

FIGS. 8A-B provides a process flow for facilitating a secured credential-less interaction in accordance with one or more embodiments of the present disclosure;

FIG. 9A-D provide example interfaces for facilitating a credential-less exchange of value in accordance with one or more embodiments of the present disclosure.

DETAILED DESCRIPTION

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based at least in part on," "based at least on," "based upon," and/or similar words are used herein interchangeably in an open-ended manner such that they do not necessarily indicate being based at least in part only on or based solely on the referenced element or elements unless so indicated. Like numbers refer to like elements throughout.

I. GENERAL OVERVIEW AND TECHNICAL ADVANTAGES

Various embodiments of the present disclosure provide technical solutions for managing network-based exchanges. In various embodiments, an exchange platform may be configured to facilitate a credential-less exchange of value between one or more member platforms. These exchanges may be facilitated in real time, without persistent credentials that may expose members to financial, legal, reputational, or other risks. Accordingly, in various embodiments, client devices may purchase, sell, and/or execute a value-based exchange, in real-time, over any network, without exposing sensitive information susceptible to network-based attacks.

Embodiments of the present disclosure provide improved instrument-level validation and enablement techniques that leverage new interfaces, security code administration, and policy matching techniques to increase data security and communication flexibility, while reducing computing resource expenditure requirements for safeguarding sensitive data through network communications.

Some techniques of the present disclosure, for example, retrieve and transform data objects into unique data keys recognizable only to approved entities. The data keys may be provided and/or established by leveraging exchange interfaces between an exchange platform and other member platforms in an exchange network. Once established, the data keys may be mapped to sensitive credentials stored within a source platform (e.g., a service provider platform), without requiring the network transmission of the sensitive credentials. Future communications to facilitate a value-based exchange may replace traditional, persistent credentials with data keys to enable a source platform to identify persistent credentials and/or perform one or more actions for a particular instrument associated therewith. In this manner, the exchange platform may facilitate an exchange using keys (and/or other identifiers) that are not, by themselves, traceable to underlying sensitive information. This, in turn, allows the exchange platform to holistically track, facilitate, and distribute network-based communications without exposing a member to network attacks.

Some embodiments of the present disclosure present network-based exchange processing techniques for facilitating credential-less exchanges. To do so, some of the techniques of the present disclosure leverage new data structures, UUEKs, that may replace persistent credentials traditionally used to authorize a value-based exchange. Using the techniques of the present disclosure, a UUEK may be securely issued across member platforms to allow a user to execute a value-based exchange using an identifier that is recognizable to a single party, the exchange platform. The UUEK may be mapped to unique identifiers that may reference sensitive information without directly identifying (and thereby exposing) the sensitive information. A unique identifier, for example, may reference a mapping only interpretable by a source platform, such that the identifiers are unusable by malicious parties unaffiliated with the exchange platform. In this manner, the exchange platform may distribute, track, and facilitate exchanges without exposing member platforms to data security risks. Moreover, the exchange platform may continuously update, modify, and/or redistribute UUEKs to the member platforms to continuously adapt UUEKs in real time. In this manner, the exchange platform may provide technical improvements to data and network security, while reducing the computing resource requirements (e.g., for securely encrypting persistent credentials) for facilitating value-based exchanges.

Some techniques of the present disclosure may leverage credential-less exchanges of the present disclosure to enable the use of flexible exchange interfaces between members of an exchange network. Unlike traditional exchange interfaces, credential-less exchanges allow for the use of interfaces capable of facilitating complex network administered, n-character security codes that are tailored to a UUEK. By doing so, an intermediary computing platform may receive information necessary for establishing a security code tailored to a UUEK. The security code may be leveraged to validate a UUEK before an exchange is initiated. In this way, exchanges are proactively filtered based at least in part on the veracity of an ephemeral data structure. This, in turn, limits network traffic to those exchanges that are most likely to be authorized, which increases network performance in a robust network-based exchange ecosystem. Moreover, the network administration of security codes may increase the realizable complexity of the actual codes, for instance, by enabling n-character codes of varying complexities. Even simple n-character codes may have over 14,776,336 possible combinations, which is drastically more secure relative to traditional 4-character alpha-numeric code with 1,679,616 combinations.

Example inventive and technologically advantageous embodiments of the present disclosure include (i) data transformation, mapping, and processing schemes for facilitating the network-based credential-less exchanges, (ii) exchange interfaces and network-based communication schemes for improving network security for cross-platform communications, (iii) ephemeral data structures and data management techniques for distributing the ephemeral data structures to facilitate real-time, secure, and dynamic value-based exchanges, and (iv) UUEK validation techniques for enabling and/or disabling UUEK for an exchange.

II. EXAMPLE DEFINITIONS

In some embodiments, the term "exchange platform" refers to a computing entity that is configured to facilitate credential-less exchanges of value for one or more members in an exchange network. The exchange platform may include one or more processing devices, memory devices, and/or the like that are physically and/or wirelessly coupled and configured to collectively (and/or individually) perform the one or more computing tasks for facilitating a value system agnostic exchange. In some examples, the exchange platform may include, define, and/or otherwise leverage one or more APIs for facilitating communications (e.g., requests and responses, etc.) between a plurality of members. As described herein, the APIs may be leveraged to facilitate a secure exchange between one or more members in any value system.

In some embodiments, the term "member" refers to an entity that collaborates with the exchange platform to take part in an exchange of value. As examples, a member may include (i) a partner that utilizes the exchange platform to receive value, (ii) a service provider that utilizes the exchange platform to provide value, and/or (iii) both a partner and a service provider. As used herein, a member may refer to as a partner when it receives value through a value exchange and/or a service provider when it provides value through a value exchange. Thus, the same member may be a partner or a service provider depending on the role of the member in a value exchange. For example, a member may be a partner that receives value for a value exchange. The same member may be a service provider that provides value in another value exchange. In some examples, the same member may be both the partner and the service provider in the same value exchange, such that the member utilizes the exchange platform to provide and then receive value in a sole member value exchange.

In some embodiments, a member is a partner when it utilizes a service provided by a service provider. A partner may include any value seeking entity in any value system. As an example, in a financial value system, a partner may include a merchant (e.g., retailer, brick-and-mortar establishment, etc.) that may utilize a service provider, such as a financial institution, to access funds for a financial transaction. In addition, or alternatively, in an information value system, a partner may include a news publisher (e.g., a newspaper, media organization, etc.) that may utilize a service provider, such as a news agency (e.g., wire service, news service, etc.) to access information for an information transaction. As will be understood, the techniques of the present disclosure may be applied to any value system and the partner may include any value seeker for any respective value system.

In some embodiments, a member is a service provider when it provides a service for a partner. A service provider may include a source of value in any value system. As an example, in a financial value system, a service provider may include a financial institution (e.g., bank, currency exchange platform, credit union, etc.) that may provide access to funds for a financial transaction between one or more entities. In addition, or alternatively, in an information value system, a service provider may include a news agency (e.g., wire service, news service, etc.) that may source information for publication by a news publisher. As will be understood, the techniques of the present disclosure may be applied to any value system and the service provider may include any source of value for any respective value system.

In some embodiments, the term "service provider instrument" refers to a mechanism leveraged by a service provider for providing value on behalf of a particular user. The service provider instrument may depend on the value system and/or service provider. In some examples, the service provider instrument may include an account with the service provider. For example, in a financial value system, a service provider instrument may include a bank account (e.g., checking, saving, etc.), brokerage account, line of credit, and/or the like. In an information value system, the service provider instrument may include a subscriber account, and/or the like. In some examples, a service provider instrument may include a virtual instrument hosted by a service provider platform.

In some embodiments, a service provided by a service provider is subject to one or more policies and/or security codes. For instance, the service provider and/or a service provider instrument may be associated with a security code for verifying the use of a service provider instrument. In addition, or alternatively, a service provider may be associated with one or more member policies for authenticating a security code.

In some embodiments, the term "security code" refers to a data entity that defines a sequence of characters for verifying a user in an interaction, such as a physical exchange, a virtual exchange, an enrollment, and/or the like. A security code may include a sequence of one or more distinct characters of a dynamic length (e.g., six characters, eight characters, etc.) that may be previously set by and/or provided to a user. The security code may be later provided by the user to validate the user's presence for an interaction (e.g., by comparing a security code input to a security code reference as described herein). The one or more distinct characters may include any number of alpha-numeric, emoji, kanji, wingdings, and/or the like.

In some embodiments, the security code is a network administered n-character PIN. As described herein, the security code may be managed as a service through a client device to (i) securely retrieve a UUEK, (ii) enroll an instrument with a member platform, and/or (iii) enable or disable the use of a UUEK (and/or any other exchange credential) prior to an exchange request. In this manner, the security code may be deployed against any type of service provider instrument through the retrieval, enrollment, and/or enablement or disablement of a corresponding UUEK. By managing the security code at the network level, members may benefit from faster exchanges since the chance of an authorization decline for invalid PIN is eliminated. For example, a UUEK may be disabled until a security code is received for enabling the UUEK. The exchange platform may prevent a user from initiating an exchange until a UUEK is enabled, thereby ensuring that all exchange authorization requests provided to a service provider are pre-validated in view of a security code. This effectively reduces network traffic between members in an exchange network, thereby decreasing network congestion in traditionally high traffic communication systems.

In some embodiments, a security code corresponds to a user. For instance, a security code may be previously set by and/or provided to a user through interaction with an exchange platform. As an example, a security code may be set by a user through interaction with an exchange network widget embedded within a member software application. This allows the security code to be set without directly interacting with or sharing the security code with a respective member platform. In some examples, a security code may be instrument- or member-specific. For instance, a respective security code may be configured to retrieve and/or enable a UUEK of a particular member platform and/or a service provider instrument of the particular member platform. In addition, or alternatively, a respective security code may be configured to enroll an account of a member platform with the exchange network. By way of example, the exchange platform may govern the use of security code to implement one or more secure action using a plurality security code tuples that each correlate a security code to a respective user, member platform, and/or service provider instrument.

In some embodiments, the term "security code tuple" refers to a data entity that defines a correlation between a security code, a user, and one or more of a member platform and/or service provider instrument. A security code tuple may include a data object, record, and/or any other data structure (e.g., linked nodes, etc.) that is configured to represent an association between a security code, and a user, and, in some embodiments, either a member platform, a service provider instrument, or both. A security code tuple, for example, may include a security code reference, a user identifier, one or more member identifiers, one or more instrument identifier, and/or contextual pairing data. The contextual pairing data may include one or more pairing attributes, such as one or more timing attributes. The timing attributes, for example, may be indicative of a configuration time (e.g., indicative of a time at which the security code tuple is set, etc.), an expiration time (e.g., a time at which the security code must be reset, etc.), and/or the like. As described herein, a security code tuple may be leveraged by the exchange platform to identify a security code reference for a user to perform a secure action (e.g., such enabling the use of a UUEK for an exchange) on the user's behalf based at least in part on a comparison between the security code reference and a security code input provided by the user.

In some embodiments, the term "security code reference" refers to a data entity that defines a recorded security code. A security code reference may include an internal representation (e.g., for the exchange platform, etc.) of a security code for a user.

In some embodiments, the term "security code input" refers to a data entity that defines a sequence of characters provided to perform a secure action. A security code input may include user input provided by a user, as described herein. In some examples, a secure action may be performed for a user in the event that the security code input matches a security code reference. As one example, a respective UUEK that is assigned to a user may be enabled in the event that the security code input matches a security code reference for the user (e.g., as defined by a security code tuple).

In some embodiments, the term "security code request" refers to a data entity that defines a request to set, reset, and/or remove a security code for a user. A security code request may be provided to an exchange platform from a member of the exchange network. The security code request may be indicative of member user reference for the user and, in some examples, a member instrument reference for the user. By way of example, a security code request that only includes a member user reference may default to all service provider instruments associated with a user and may, for example, initiate a set, reset, and/or remove operation for a security code that applies to all service provider instruments that are maintained by a respective member platform for the user. In addition, or alternatively, a security code request that includes a member user reference and a member instrument reference may initiate a set, reset, and/or remove operation for a security code that applies to a particular service provider instrument maintained by the respective member platform for the user. In addition to the references, the security code request may include a code action attribute that is indicative of a desired set, reset, and/or remove operation and security code input indicative of a new, modified, or existing n-character PIN.

In some embodiments, the term "secured interaction request" refers to a data entity that defines a request to perform a secure interaction using a security code input. A secured interaction request may be provided to an exchange platform from a member of the exchange network. The secured interaction request may be indicative of (i) a user, member platform, and/or service provider instrument and (ii) a security code input for the user. In addition, or alternatively, the secured interaction request may be indicative of one or more contextual security attributes. The one or more contextual security attributes may include one or more timing attributes. The one or more timing attributes, for example, may be indicative of a provisioning time (e.g., indicative of a time at which the secured interaction request is sent, etc.), a requesting time (e.g., a requested time for performing a secure interaction, etc.), and/or the like.

The secured interaction request may be received from a member platform. For example, a user may initiate the secured interaction request through a member application hosted by a member platform on behalf of a member of the exchange network. In some examples, a secured interaction request may be generated and/or provided in response to selection input indicative of a service provider instrument, a UUEK for the service provider instrument, and/or the like. As one example, a user may select an instrument representation, a UUEK representation, and/or the like (e.g., through a partner application associated with a partner platform, a service provider application associated with a service provider platform, etc.) for authorizing a value-based exchange. In some examples, a secured interaction request may be automatically initiated in the event that the user and/or the selected instrument, UUEK, and/or the like is associated with a security code. For example, in response to the selection, a member platform (e.g., through a respective member application) may prompt the user for a security code input. The user may enter the security code input to provide the secured interaction request.

In some embodiments, the term "validation event" refers to a data entity that defines a validation of a security code input for a user. A validation event may include a secured event that may be indicative of a validation between a security code input and a security code reference. In addition, or alternatively, the validation event may include an unsecured event that may be indicative of a failed validation between a security code input and a security code reference. For example, the secured event may be indicative of a determination that a security code input matches a corresponding security code reference. In some examples, the unsecured event may be indicative of a determination that a security code input does not match a corresponding security code reference. In some examples, the exchange platform may generate a secured event in response to a determination that the security code input matches a corresponding security code reference. In addition, or alternatively, the exchange platform may generate an unsecured event in response to a determination that the security code input does not match a corresponding security code reference. In some examples, a secured event may be associated with a secured time period and the exchange platform may generate an unsecured event in response to a determination that the secured time period has expired.

In some embodiments, the validation event is stored in association with a secured data entity, such as a UUEK, service provider instrument, and/or user. For instance, the validation event may be stored in an exchange data object corresponding to the UUEK, a system instrument data object corresponding to a service provider instrument, a system user data object corresponding to a user, and/or the like. In addition, or alternatively, the validation event may be stored in association with a security code tuple. For instance, a secured event may be stored in response to validating a user, whereas an unsecured event may be stored in response to invalidating a user.

In some embodiments, the validation event includes contextual validation data. The contextual validation data, for example, may be indicative of a timing of a validation. The timing of the validation may include a timestamp corresponding to the transmission, reception, creation, and/or adjudication of a validation request. For example, the contextual validation data may include a validation timestamp indicative of a time at which the exchange platform determines that the security code input and security code reference either match or do not match. In some examples, the contextual validation data may be indicative of a secured time period. The secured time period may be indicative of a subsequent timestamp, a time duration, and/or the like in which a UUEK, a service provider instrument, and/or the like may be secured in response to a secured event.

In some embodiments, the term "secured interaction response" refers to a data entity that defines a response to a secured interaction request. In some embodiments, a secured interaction response is provided from an exchange platform to the member that provided the secured interaction request. The secured interaction response may be indicative of the validation event.

In some embodiments, the term "member policy" refers to a data entity that defines one or more validation requirements for a service provider instrument. A member policy may correspond to a member and/or a service provider instrument of a member. For instance, a member policy may define one or more validation requirements for using a service provider instrument based at least in part on one or more member-specific standards. In addition, or alternatively, a member policy may define one or more validation requirements for using a service provider instrument based at least in part on one or more instrument-specific standards. The member-specific standards may apply to a plurality of service provider instruments associated with a member, whereas the instrument-specific standards may apply to at least one of the plurality of service provider instruments associated with a member.

A validation requirement may be indicative of one or more attributes for a value-based exchange that require a secured interaction. For instance, a previously issued UUEK may be used without a security code to authorize a value-based exchange that does not include one or more attributes that require a secured interaction. In the event that a value-based exchange includes at least one attribute requiring a secured interaction, a UUEK may be prevented from authorizing the value-based exchange unless a verified security code is provided.

In some examples, a policy attribute may include an object identifier, one or more object attributes, and/or one or more value-exchange attributes that identify an object and/or one or more authorized/unauthorized amounts of an object. For instance, a member policy may include a plurality of object identifiers. The plurality of object identifiers may be indicative of a plurality of objects that are authorized/unauthorized for obtaining (e.g., purchasing, etc.) without a security code.

In some examples, an object identifier may be a global object identifier. For instance, a global object identifier may be a stock keeping unit (SKU) code. In addition, or alternatively, a global object identifier may be a manufacturer part number (MPN), global trade item number (GTIN), product or service name, international standard book number (ISBN), universal product code (UPC), international article number (EIN), and/or the like. In some examples, an object identifier may include a system object identifier. A system object identifier, for example, may include an identifier (e.g., a table identifier, etc.) that corresponds to a recorded data object that represents an object within an exchange platform. In some embodiments, a system object identifier and a global object identifier are the same.

In some embodiments, a policy attribute includes a value-exchange attribute corresponding to a particular value-based exchange and/or an object included in the value-based exchange. A value-exchange attribute, for example, may include a threshold exchange value without a security code. For example, one or more exchange attributes may be indicative of an exchange value and the one or more validation requirements may define an exchange value threshold in which a respective secured event is required for the service provider instrument.

In some embodiments, the term "recorded data object" refers to a data object that represents an object that may be involved in a value-based exchange. In some examples, a recorded data object may be an internal representation of an object for an exchange platform. For example, an object may include a distinct unit of a value-based exchange for which value is being transferred. A recorded data object for the object may include a data object that records one or more aspects (e.g., object identifiers, object attributes, etc.) of the object.

For instance, a recorded data object may include an object identifier and/or one or more object attributes for a particular object associated with a value system. The object may be based at least in part on the value system. For instance, in a financial value system, an object may be a tangible or intangible item, product, and/or the like that may be purchased in exchange for a unit of currency. In a healthcare value system, an object may be a healthcare procedure, and/or the like that may be covered by a healthcare policy.

In some examples, an exchange platform may maintain and/or have access to an object datastore that includes a plurality of recorded data objects. As described herein, the object datastore may include a plurality of recorded data objects that are at least partially sourced from one or more members of the exchange network.

In some embodiments, the term "object attribute" refers to a data entity that describes a characteristic of an object. An object attribute may include an object-based attribute and/or an exchange-based attribute.

For instance, an object-based attribute may include a spatial attribute, a count attribute, a value attribute, a source attribute, a composition attribute, a categorical attribute, and/or any other attribute that is descriptive of an object characteristic. A spatial attribute, for example, may be indicative of one or more dimensions (e.g., height, width, weight, etc.) of an object, value attribute may be indicative of a value (e.g., price, etc.) of the object, a composition attribute may be indicative of one or more ingredients, components, etc. of the object, a categorical attribute may be indicative of one or more categories (e.g., restricted substances, etc.) of the object, and/or the like. By way of example, one or more categorical attribute may be indicative whether an object is associated with (i) one or more general store categories, such as vegetables, fruits, dairy, meat, grains, seeds, alcohol, tobacco, in-store consumable, hot food, pharmacy, pet feed, and non-food, (ii) one or more medical categories, such as a dental, eyecare, general health, etc., (iii) one or more informational categories, such as international sources, domestic sources, etc. and/or the like. In some examples, a composition attribute may be indicative of one or more components of an object, such as a percentage by volume of alcohol within an object, one or more ingredients, such as meat, dairy-derived, peanut-derived, tree nut-derived, soy-derived, and/or the like.

In some examples, an object-based attribute may be based at least in part on the value system. For instance, in at least a financial-based value system, an object-based attribute may include one or more line item attributes, one or more line item adjustments, and/or the like. Line item attributes may include a sequence, a line item group, a product code, an item name, an item source (e.g., provider, manufacturer, etc.), a description, a quantity, a mass (e.g., gram, kilogram, etc.), one or more spatial dimensions (e.g., length, width, height, volume, etc.), a unit amount, a unit tax amount, a line amount (e.g., amount of the line item), a line tax amount, and/or the like. Line item adjustments may include an adjustment type (e.g., manufactures discount, a store discount, a return, a payment cash, a payment gift card, payment other, and/or the like), an item, product, or service code, an item description, an item quantity, a unit-item, an item mass (e.g., gram, kilogram, etc.), a unit amount, a unit tax amount, a line amount (e.g., amount of the line item), a line tax amount, and/or the like.

In some embodiments, the term "exchange request" refers to a data entity that defines a request to perform an exchange of value. An exchange request may be provided to an exchange platform from a member of the exchange network. The exchange request may include one or more request attributes. The one or more request attributes may include one or more object identifiers, object attributes, and/or the like.

For example, the one or more request attributes may include a plurality of object identifiers corresponding to a plurality of objects associated with the value-based exchange. In addition, or alternatively, the one or more request attributes may include one or more object attributes for the plurality of objects. For example, the one or more object attributes may include one or more object-based attributes, such as one or more line item attributes, one or more exchange-based attributes, such as a quantity of the object, a location of the object, and/or the like. For instance, an exchange request may be indicative of the exchange location from which an object is being obtained.

In some embodiments, the term "exchange authorization request" refers to a data entity that defines a request to a member for executing a value-based exchange. In some embodiments, an exchange authorization request is provided from an exchange platform to a member of the exchange network. The exchange authorization request, for example, may be provided to a service provider of the exchange network in response to an exchange request from a partner of the exchange network. In some examples, the exchange authorization request may be indicative of a validation event associated with a UUEK. For example, the exchange authorization request may be indicative of a disabled and/or enabled status of a UUEK used to initiate the exchange of value.

In some embodiments, the term "exchange authorization response" refers to a data entity that defines a response to an exchange authorization request. In some embodiments, an exchange authorization response is provided to an exchange platform from a member of the exchange network. An exchange authorization response, for example, may be provided by a service provider of the exchange network in response to an exchange authorization request.

In some embodiments, an exchange authorization response is indicative of at least one of an exchange approval or an exchange denial. The exchange authorization response may be based at least in part on a comparison between an exchange value, an asset availability of a service provider instrument, and/or a validation event. For example, responsive to receiving an exchange authorization request, a member may be configured to compare the exchange value to an asset availability of an identified service provider instrument. A value-based exchange may be authorized (e.g., resulting in an exchange approval, etc.) in the event that the asset availability exceeds the exchange value, otherwise the value-based exchange may be denied (e.g., resulting in an exchange denial). In some examples, the value-based exchange may be authorized (e.g., resulting in an exchange approval, etc.) in the event that the exchange value is within an exchange value threshold, otherwise the value-based exchange may be denied unless the exchange authorization response indicates that an enabled UUEK was used to initiate the exchange of value.

In some embodiments, the exchange authorization response is indicative of one or more contextual response attributes. The one or more contextual response attributes, for example, may be indicative of one or more contributing factors to an exchange authorization response. Contributing factors, for example, may include bad actor risk and/or fraud check, error, full approval, instrument closed, instrument-based risk and/or fraud check, insufficient value, invalid UUEK, limit exceeded (e.g., UUEK or instrument usage limit exceeded), missing line items (e.g., for exchanges of value that do not include validated objects), instrument not found, account not found, pin required, partial approval, member not available, transaction risk and/or fraud check, unsupported operation, user contact member (e.g., a user may need to contact a member, such as a service provider, to resolve an issue), user risk and/or fraud check, and combinations thereof.

In some embodiments, the term "exchange response" refers to a data entity that defines a response to an exchange request. In some embodiments, an exchange response is provided from an exchange platform to the member that provided the exchange request. The exchange response may be indicative of the exchange approval and/or the exchange denial. In addition, or alternatively, the exchange response may be indicative of the validated data object, invalidated data object, and/or contextual response attributes. By way of example, the exchange response may be indicative of the one or more validated objects and/or the one or more invalidated objects for the exchange request.

In some embodiments, the term "exchange record" refers to a data entity that provides contextual information for an exchange request. The contextual information may be indicative of one or more aspects of an exchange request, an exchange response, an exchange authorization request, and/or an exchange authorization request. For example, an exchange record may be indicative of the one or more validated objects, invalidated objects, object statuses for each validated and/or invalidated object, and/or any other information associated with the value-based exchange.

In some embodiments, the term "member platform" refers to a computing entity corresponding to a member. The member platform may include a partner computing platform acting on behalf of a partner, a service provider computing platform acting on behalf of a service provider, and/or both. In some examples, a member platform may be both a partner platform and the service provider platform. For example, the same member platform may be configured to operate on behalf of a partner for one value exchange and a service provider for another value exchange. In some examples, the same member platform may be configured to operate on behalf of both a partner and service provider in a single value exchange. It is noted that the term member platform may refer to a partner platform, a service provider platform, or both and, in some examples, may depend on the role of the member platform in a value exchange (e.g., and/or one or more APIs utilized by the member platform in the value exchange).

In some embodiments, a partner platform is a computing entity that is configured to perform one or more operations on behalf of a partner. A partner platform, for example, may include one or more processing devices, memory devices, and/or the like that are physically and/or wirelessly coupled and configured to collectively (and/or individually) perform the one or more computing tasks for requesting value in a value system agnostic exchange. In some examples, a partner platform may include, define, and/or otherwise leverage one or more APIs for facilitating communications (e.g., requests and responses, etc.) with the exchange platform. In some examples, a partner platform may be configured to host one or more user-facing applications (e.g., a partner application, etc.) for interacting with one or more users.

In some embodiments, a service provider platform is a computing entity that is configured to perform one or more operations on behalf of a service provider. A service provider platform, for example, may include one or more processing devices, memory devices, and/or the like that are physically and/or wirelessly coupled and configured to collectively (and/or individually) perform the one or more computing tasks for providing value in a value system agnostic exchange. In some examples, a service provider platform may include, define, and/or otherwise leverage one or more APIs for facilitating communications (e.g., requests and responses, etc.) with the exchange platform. In some examples, a service provider platform may be configured to facilitate one or more service provider instruments. In some examples, the service provider platform may be configured to host one or more user-facing applications (e.g., a service provider application, etc.) for managing the one or more service provider instruments.

In some embodiments, the term "exchange interfaces" refers to a set of instructions for facilitating communications between the exchange platform and one or more member platforms and/or internal services. An exchange interface may include an API, file based interface, a message queue based interface, and/or the like. For instance, an exchange interface may include an API including, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may include one or more RPC APIs, such as one or more gRPC APIs.

The exchange platform may include, define, and/or otherwise leverage one or more different exchange interfaces for facilitating communication with one or more external platforms, such as one or more member platforms (e.g., a partner platform, service provider platform, etc.). Each API may include a plurality of communication instructions, message definitions, and/or the like for exchanging requests and/or responses between the exchange platform and an entity that is taking part in a value exchange. By way of example, an exchange interface may include a partner API for facilitating communication with a partner platform and/or a service provider API for facilitating communication with a service provider platform.

In some embodiments, the term "partner interface" refers to an exchange interface for facilitating one or more communications between a partner platform and the exchange platform. The partner interface may define one or more communication instructions, message definitions, and/or the like for facilitating one or more request messages and/or response messages between a partner platform and the exchange platform. The partner interface, for example, may include an API that defines (i) requests to the exchange platform from a computing entity acting as a partner platform and/or (ii) requests from the exchange platform to the partner platform. For example, the partner interface may define one or more registration messages, session messages, transaction messages, and/or the like for facilitating an exchange of value for the partner. In some embodiments, the partner interface defines one or more identifiers for securely identifying one or more portions of a value exchange.

In some embodiments, the term "service provider interface" refers to an exchange interface for facilitating one or more communications between a service provider platform and the exchange platform. The service provider interface may define one or more communication instructions, message definitions, and/or the like for facilitating one or more request messages and/or response messages between a service provider platform and the exchange platform. The service provider interface, for example, may include an API that defines (i) requests to the exchange platform from a computing entity acting as a service provider platform and/or (ii) requests from the exchange platform to the service provider platform. The service provider interface, for example, may define one or more registration messages, session messages, transaction messages, and/or the like for facilitating an exchange of value using a service provider instrument. In some embodiments, the service provider interface defines one or more identifiers for securely identifying one or more portions of a value exchange.

In some embodiments, the term "entity partition" refers to a unique identifier for a computing entity. An entity partition may include a unique number, alpha-numeric, and/or the like that represents a particular computing entity. An entity partition, for example, may include a member partition that represents a member platform, a service provider partition that represents a service provider platform, a partner partition that represents a partner platform, and/or the like.

In some embodiments, the term "service provider partition" refers to a unique identifier for a service provider and/or service provider platform of a service provider. The service provider partition may include a sequence of numeric, alpha-numeric, any/or any other characters or symbols that are representative of a service provider that is associated (e.g., onboarded, registered, etc.) with the exchange platform. The exchange platform, for example, may include a plurality of service provider partitions that respectively identify a service provider platform that is affiliated with (e.g., onboarded with, registered with, etc.) the exchange platform. Each service provider partition may represent a service provider platform that has configured one or more exchange platform software development kits (SDKs), and/or like for implementing a service provider interface of the exchange platform.

In some embodiments, a "partner partition" refers to a unique identifier for a partner and/or a partner platform of a partner. The partner partition may include a sequence of numeric, alpha-numeric, any/or any other characters or symbols that are representative of a partner that is associated with the exchange platform. The exchange platform, for example, may include a plurality of partner partitions that respectively identify a partner platform that is affiliated with (e.g., onboarded with, registered with, etc.) the exchange platform. Each partner partition may represent a partner platform that has configured one or more exchange SDKs, and/or the like for implementing a partner interface of the exchange platform.

In some embodiments, the term "user-facing application" refers to a computer program hosted by a computing entity for facilitating one or more user interactions. A user-facing application may include software (e.g., computer readable instructions, etc.) designed to perform one or more computing tasks for a computing entity, such as a member platform. For instance, a user-facing application may facilitate communication between a member and a user. As examples, the user-facing application may be configured to present one or more user interfaces for interacting with a user on behalf of a member. In some examples, the user-facing application may be configured to receive user input (e.g., via one or more user interfaces) to receive information from a user.

In some embodiments, a user-facing application is a partner application that is hosted by the partner platform (e.g., a member platform acting as a partner for a particular exchange, etc.) to facilitate functions for a partner. A partner application may include software (e.g., computer readable instructions, etc.) designed to perform one or more computing tasks for a partner. For instance, a partner application may be configured to present one or more user interfaces for interacting (e.g., browsing, purchasing, reviewing, etc.) with one or more products offered by a retail-based partner, one or more units of information offered by an information-based partner, and/or the like. In some examples, the partner application may be configured to receive user input (e.g., via one or more user interfaces) to receive information from a user.

In some embodiments, a user-facing application is a service provider application that is hosted by the service provider platform (e.g., a member platform acting as a service provider for a particular exchange, etc.) to facilitate functions for the service provider. A service provider application may include software (e.g., computer readable instructions, etc.) designed to perform one or more computing tasks for a service provider. For instance, a service provider application may be configured to present one or more user interfaces for interacting (e.g., reviewing, managing, auditing, enrolling, etc.) with one or more service provider instruments facilitated by the service provider. By way of example, in a financial value system, the service provider application may enable access to a bank account, brokerage account, line of credit, and/or the like, to manage funds, assets, and/or the like, handled by the respective accounts. In some examples, the service provider application may be configured to receive user input (e.g., via the one or more user interfaces) to receive information, authorizations, and/or the like from a user.

In some embodiments, the term "instrument data object" refers to a data entity that represents a service provider instrument. The instrument data object may include one or more instrument identifiers and/or one or more instrument attributes. In some examples, the one or more instrument identifiers and/or one or more instrument attributes may be based at least in part on a type of instrument data object. By way of example, a service provider instrument may be represented in a member platform as a member instrument data object. In addition, or alternatively, the service provider instrument may be independently represented by a system instrument data object in an exchange platform. In some examples, the member instrument data object and the system instrument data object may include one or more of the same one or more instrument identifiers and/or one or more instrument attributes. By way of example, a member platform may register a plurality of service provider instruments with an exchange platform. During registration, the member platform may provide one or more of the instrument identifiers and/or instrument attributes and, in some examples, the exchange platform may return another identifier.

In some embodiments, the member instrument data object is an internal representation of a service provider instrument within a member platform. The member instrument data object may include one or more instrument identifiers, such as a member instrument identifier, an instrument key from the exchange platform, and/or a user identifier. The user identifier, for example, may include a member user identifier. In addition, or alternatively, the member instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a (i) currency associated with the service provider instrument, (ii) an asset availability (e.g., a balance, coverage, etc.) of the service provider instrument, (iii) one or more previous transactions with the service provider instrument, and/or the like.

In some embodiments, the system instrument data object is an external representation of a service provider instrument within the exchange platform. The system instrument data object may include one or more instrument identifiers, such as an instrument reference for a member platform, a system instrument identifier, and/or a user identifier. The user identifier, for example, may include a system user identifier. In addition, or alternatively, the system instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a currency associated with the service provider instrument.

In some embodiments, the term "instrument identifier" refers to any representation of a service provider instrument. The instrument identifier may include an instrument identifier, instrument reference, instrument key, and/or the like, as described herein.

In some embodiments, the term "member instrument identifier" refers to a unique identifier for representing a service provider instrument within a member platform. The member instrument identifier, for example, may include a sequence of numeric, alpha-numeric, any/or any other characters or symbols that represent a service provider instrument to a service provider platform.

In some embodiments, the term "instrument reference" refers to a unique identifier for referencing a member instrument identifier. The instrument reference, for example, may be generated and/or provided by a member platform to an exchange platform to allow the exchange platform to reference an instrument maintained at the member platform. In some examples, the instrument reference is the same value as the member instrument identifier. In some examples, the instrument reference is a different value that is mapped to the member instrument identifier.

In some embodiments, the term "system instrument identifier" refers to a unique identifier for representing a service provider instrument within an exchange platform. The system instrument identifier, for example, may include a sequence of numeric, alpha-numeric, any/or any other characters or symbols that represent a service provider instrument to an exchange platform. In some examples, the system instrument identifier may include a UUID.

In some embodiments, the term "instrument key" refers to a unique identifier for referencing a system instrument identifier. The instrument key, for example, may be generated and/or provided by the exchange platform during a registration process of an instrument with the exchange platform. In some examples, the instrument key may include a wrapped system instrument identifier. For example, the instrument key may include a string of alpha-numeric characters that are formatted according to a key format established by the exchange platform (and/or one or more APIs thereof). The key format may include any number of characters, such as fifty characters or more. In some examples, the characters may be case sensitive. A first portion of the characters (e.g., the first six characters) may be reserved as a partition for identifying an entity associated with the key. For an instrument key, the partition may include a service provider partition. A second portion of the characters may identify the system instrument identifier. The key formats described herein may include one or more different portions, each of which may be arranged in any order.

In some embodiments, the term "instrument representation" refers to a unique identifier for representing a service provider instrument to a user. The instrument representation, for example, may include a sequence of numeric, alpha-numeric, any/or any other characters or symbols that are outwardly representative of a service provider instrument. The format and/or value of an instrument representation may be based at least in part on the type of service provider and/or service provider instrument. For instance, in a financial value system, an instrument reference may include a portion (e.g., the last four digits, etc.) of persistent credentials, such as an account number (e.g., debit account, credit account, etc.), a financial account name, and/or the like. As another example, in an information value system, an instrument reference may include a portion (e.g., one or more digits, alpha-numeric characters, etc.) of persistent credentials, such as a subscription account, and/or the like. For instance, the instrument representation may include a derivative of persistent credentials that may only allow entities with prior knowledge of the persistent credentials to identify the persistent credentials using the instrument representation. As another example, the instrument representation may include an instrument nickname that is assigned and thereafter recognized by a user.

In some embodiments, the term "user data object" refers to a data entity that represents a user that interacts with a member platform and/or the exchange platform. A user, for example, may include an entity (e.g., person, organization, group, etc.) that engages in an exchange of value governed by the exchange platform. In some examples, the user may indirectly cooperate with the exchange platform by creating a user account with a registered service provider, registering (and/or giving permission to register) a service provider instrument, and/or the like. In some examples, the exchange platform may act on the user's behalf without the user directly engaging with the exchange platform. For example, the exchange platform may act as a hidden intermediary between a user-facing application and a user's service provider instrument.

In some embodiments, a user data object includes one or more user identifiers and/or one or more user attributes. In some examples, the one or more user identifiers and/or one or more user attributes may be based at least in part on a type of user data object. By way of example, a user may be represented in a member platform as a member user data object. In addition, or alternatively, the user may be independently represented by a system user data object in an exchange platform. In some examples, the member user data object and the system user data object may include one or more of the same one or more user identifiers and/or user attributes. By way of example, a member platform may register a plurality of users with an exchange platform. During registration, the member platform may provide one or more of the user identifiers and/or user attributes and, in some examples, the exchange platform may return another identifier.

In some embodiments, the member user data object is an internal representation of a user within a member platform. The member user data object may include one or more user identifiers, such as a member user identifier, a user key from the exchange platform, and/or the like. In addition, or alternatively, the member user data object may include one or more user attributes. The one or more user attributes may be indicative of one or more contextual characteristics for a user. In some examples, the user attributes may be indicative of one or more identifiable characteristics for a user. By way of example, the user attributes may be indicative of a user's first name, last name, email, physical address (e.g., one or more of a street, locality, region, postal code, country, etc.), birthday (e.g., a birth date, an age band, etc.), phone number, and/or the like. In some examples, the user attributes may include encrypted, hashed, and/or otherwise secured representations of the identifiable characteristics for a user. For instance, the user attributes may include one or more hashed identifiers for the user and/or the like.

In some embodiments, the system user data object is an external representation of a member's user within the exchange platform. The system user data object may include one or more user identifiers, such as a user reference for a member platform, a system user identifier, and/or the like. In addition, or alternatively, the system user data object may include one or more user attributes, such as those described herein. By way of example, a member platform may register a user with the exchange platform. During registration, the member platform may provide the user reference for the user and/or the one or more user attributes. In some examples, the user attributes may include hashed and/or encrypted identifiers for the user.

In some embodiments, the term "user identifier" refers to a unique identifier for a user involved in a value-based exchange. A user identifier may include a sequence of numeric, alpha-numeric, any/or any other characters or symbols that are representative of a user of the exchange platform and/or member platform. In some examples, a user identifier may include a user reference, a user key, a system user identifier, a member user identifier, and/or the like.

In some embodiments, the term "system user identifier" refers to a unique identifier for representing a user within an exchange platform. The system user identifier, for example, may include a sequence of numeric, alpha-numeric, any/or any other characters or symbols that represent a user to an exchange platform. In some examples, the system user identifier may include a UUID specific to a particular user.

In some embodiments, the term "member user identifier" refers to a unique identifier for representing a user within a member platform. The member user identifier, for example, may include a sequence of numeric, alpha-numeric, any/or any other characters or symbols that represent a user to a service provider platform.

In some embodiments, the term "user reference" refers to a unique identifier for referencing a member user identifier. The user reference, for example, may be generated and/or provided by a member platform to an exchange platform to allow the exchange platform to reference a user associated with the member platform. In some examples, the user reference is the same value as the member user identifier. In some examples, the user reference is a different value that is mapped to the member user identifier.

In some embodiments, the term "user key" refers to a unique identifier for referencing a system user identifier. The user key, for example, may be generated and/or provided by the exchange platform during a registration process of a user with the exchange platform. In some examples, the user key may include a wrapped system user identifier. For example, the user key may include a string of alpha-numeric characters that are formatted according to a key format established by the exchange platform (and/or one or more APIs thereof).

The key format, for example, may include a first portion of the characters (e.g., the first six characters) that may be reserved as a partition for identifying an entity (e.g., a member, etc.) associated with the key. For example, for a user key, the partition may include a service provider partition and/or a partner partition. A second portion of the characters may identify the system user identifier.

In some embodiments, the term "exchange data object" refers to a data entity that represents an authorized value exchange between one or more members associated with the exchange platform. In some examples, the exchange data object may include one or more identifiers and/or one or more exchange attributes. For example, the one or more identifiers and/or one or more exchange attributes may be based at least in part on a type of exchange data object. By way of example, an exchange may be represented in a member platform as a member exchange data object. In addition, or alternatively, the exchange may be independently represented by a system exchange data object in an exchange platform. In some examples, the member exchange data object and the system exchange data object may include one or more of the same one or more identifiers and/or exchange attributes. By way of example, using some of the techniques of the present disclosure, the exchange platform may issue one or more unique identifiers to a member platform that may be used to authorize a value exchange.

In some embodiments, the system exchange data object is an internal representation of a value exchange that is intermediated using the exchange platform. In some examples, the system exchange data object may include one or more different identifiers and/or exchange attributes depending on the role of the system exchange data object in a value-based exchange.

For example, a system exchange data object may include a service provider-specific exchange data object that corresponds to a service provider platform. The service provider-specific exchange data object may include one or more identifiers, such as an exchange identifier, a system user identifier, a system instrument identifier, a UUEK, and/or the like. In addition, or alternatively, the service provider-specific exchange data object may include one or more exchange attributes, such as an expiration date, a currency (e.g., for a financial value system, etc.), and/or the like.

In addition, or alternatively, the system exchange data object may include a partner-specific exchange data object that corresponds to a partner platform. The partner-specific exchange data object may include one or more identifiers, such as an exchange identifier, an instrument key, a UUEK, a member instrument reference (e.g., a partner-specific instrument reference, etc.), and/or the like. In addition, or alternatively, the partner-specific exchange data object may include one or more exchange attributes, such as an expiration date, a currency (e.g., for a financial value system, etc.), an instrument type, a previous UUEK identifier, and/or the like. In some embodiments, the member exchange data object is an external representation of a value exchange that is intermediated using the exchange platform. The member exchange data object may include one or more identifiers, such as a member exchange identifier, a member instrument identifier, a UUEK from the exchange platform, and/or the like.

In some embodiments, the term "exchange identifier" refers to a unique identifier for an exchange of value using the exchange platform. The exchange identifier may include a sequence of numeric, alpha-numeric, any/or any other characters or symbols that are representative of at least a user and/or a service provider instrument. In some examples, the unique exchange identifier may include a universally unique identifier (UUID) that may be mapped (e.g., through a series of identifiers, etc.) to a user, a service provider instrument, and/or a member registered with the exchange platform. In some examples, the exchange identifier may be randomly generated using one or more UUID generators. For instance, the exchange identifier may include a randomized sixteen bytes of information generated in accordance with one or more UUID formatting standards, such as UUID v4, and/or the like. Therefore, while the exchange identifier may be leveraged by the exchange platform and/or a member platform for one or more functions, the same exchange identifier will be useless to external parties without a prior association between the exchange identifier and one or more other identifiers. In some examples, the exchange identifier may be externally represented by a UUEK.

In some embodiments, an "universally unique ephemeral key" or "UUEK" refers to an external representation of an exchange identifier that may be issued (e.g., in place of the service provider exchange identifier and/or a partner exchange identifier) to an external entity, such as a user, partner, and/or service provider, to initiate a transaction using the exchange platform. To do so, the UUEK may be generated and issued by the exchange platform to the external entity. Each UUEK may include a plurality of values (e.g., up to fifty characters and/or more that may be case sensitive) that represent one or more aspects of a transaction. For example, the plurality of values may be indicative of an exchange identifier, a partition (e.g., identifying the recipient of the UUEK, etc.), an identifier type, and/or one or more flags. By way of example, a UUEK may include a partner-specific UUEK and/or a service provider-specific UUEK. The partner-specific UUEK may be correlated to a partner-specific exchange data object, whereas a service provider-specific UUEK may be correlated to a service provider-specific exchange data object, as described herein.

By way of example, a UUEK may be generated in accordance with a key format. The key format may include a plurality of characters including, for example, fifty characters or more that may be case sensitive. A first portion of the characters (e.g., the first six characters) may be reserved as a partition for identifying a recipient of the UUEK. The partition, for example, may include a partner partition, a service provider partition, and/or any other member partition. By way of example, a UUEK may be issued in response to a request from an authorized member, such as an affiliated partner and/or service provider.

In addition, or alternatively, at least one character (e.g., a seventh character) of the key format may identify a format of the UUEK. At least another character (e.g., an eighth character) may identify a type of UUEK. In some examples, a second portion of the characters may identify an exchange identifier (e.g., a group of twenty-two characters following the eighth character). A third portion of characters may be reserved (e.g., a group of twenty characters following the first portion of characters). An example representation is provided below:

ppppppFiGGGGGGGGGGGGGGGGGGGGGG-Grrrrrrrrrrrrrrrrrrrr where p represents a partition character, F represents a format character, i represents an identifier type character, G represents an exchange identifier, and r represents a reserved character. The key format allows for $9.8 \times 10$ to the 84 unique permutations, which is more than the number of atoms in the known observable universe. This enables the generation and distribution of new UUEKs on-demand without compromising the security of underlying data to which the UUEKs may be mapped, such as identifiers for a user, an instrument, and/or any other potentially sensitive information. The key formats described herein may include one or more different portions, each of which may be arranged in any order.

In some embodiments, a "UUEK representation" refers to a viewable representation of a UUEK. A UUEK representation may include a digital representation of a UUEK that is viewable by a user. A UUEK representation, for example, may be represented in one or more different forms, such as a machine readable optical image (e.g., barcode, quick response code, etc.), a keyword, a virtual widget, and/or the like. In some examples, a UUEK representation may include a scannable representation (e.g., a barcode, QR code, non-fungible token, near-field communication sequence, etc.) of a UUEK. The scannable representation may be saved to a member account of a member platform to enable a user to physically execute a value-based exchange using a service provider instrument without referencing persistent credentials of the service provider instrument. The UUEK representation, for example, may be scanned by a barcode scanner, and/or the like to read the UUEK and initiate a value-based exchange with the UUEK.

In some embodiments, an "enabled UUEK representation" refers to a UUEK representation for a UUEK that is enabled by a previous secured event. An enabled UUEK representation may include a status indicator and/or one or more other indicators that represent an enabled status for a UUEK. In some examples, an enabled UUEK representation may include a readable UUEK representation.

In some embodiments, an "disabled UUEK representation" refers to a UUEK representation for a UUEK that is not enabled by a previous secured event. A disabled UUEK representation may include a status indicator and/or one or more other indicators that represent a disabled status for a UUEK. In some examples, a disabled UUEK representation may include an unreadable UUEK representation. The unreadable UUEK representation, for example, may include a grayed out, obstructed, partially covered, and/or the like, scannable representation that prevents the scannable representation from being read.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, messaging flows, and other representations of data, operations, and messaging schemes. It should be understood that each block of the block, arrow, and/or the like of the diagrams, flowchart illustrations, etc. may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments may produce specifically-configured machines performing the steps or operations specified in the representations of the present disclosure. Accordingly, the representations of the present disclosure support various combinations of embodiments for performing the specified instructions, operations, or steps.

IV. EXAMPLE SYSTEM ARCHITECTURE

Figure 1:
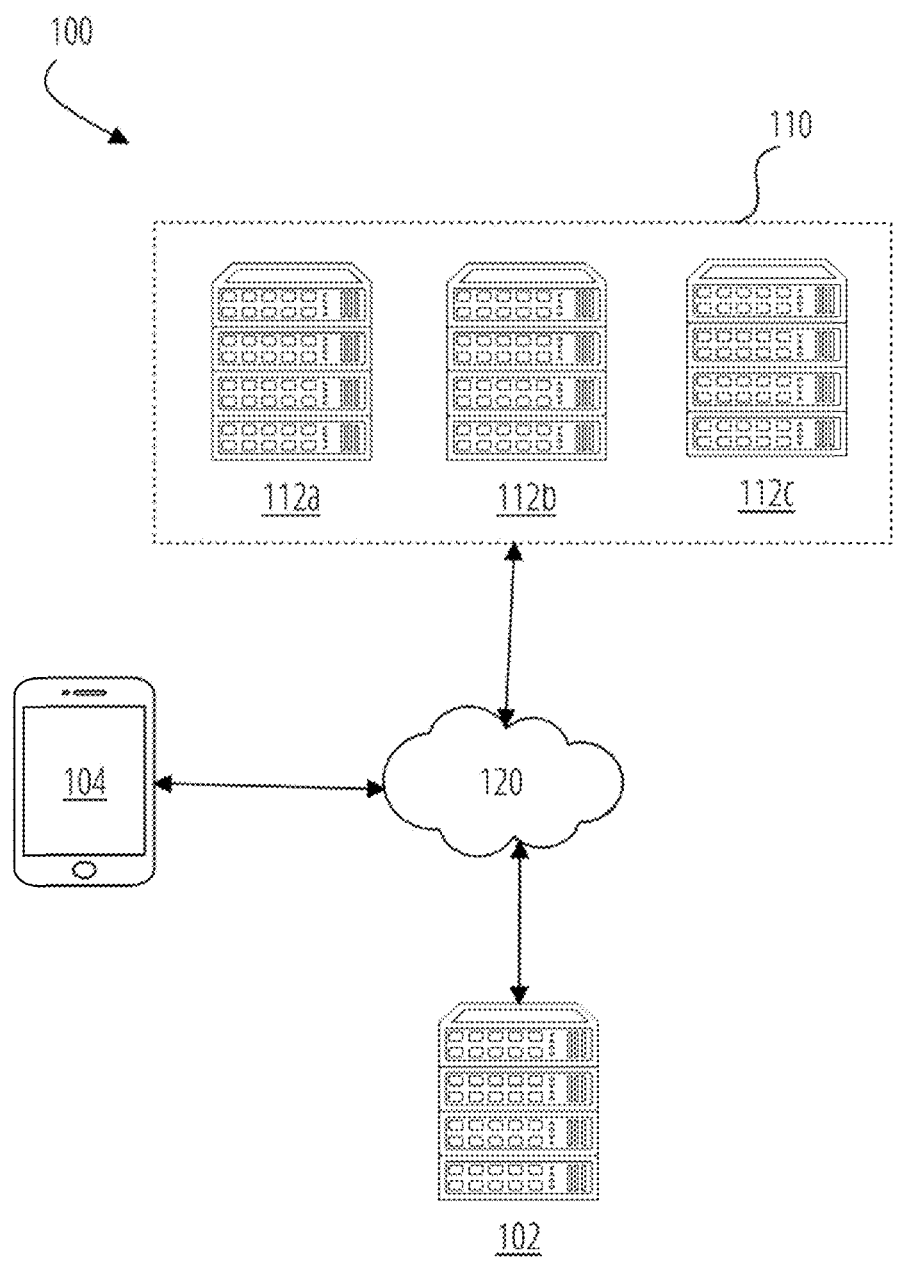
FIG. 1 is an example diagram of a computing ecosystem in accordance with one or more embodiments of the present disclosure.

FIG. 1 provides an illustration of a computing ecosystem 100 that may be used in conjunction with various embodiments of the present disclosure. As shown in FIG. 1, the architecture may include an exchange platform 102, one or more client devices 104, a network of member platforms 110, one or more networks 120, and/or the like. The network of member platforms 110 may include a first member platform 112a, a second member platform 112b, a third member platform 112c, and/or the like that are affiliated (e.g., registered, etc.) with the exchange platform 102. For example, as described herein, the network of member platforms 110 may include a partner platform and/or a service provider platform. In some examples, the partner platform may include a first member platform 112a and the service provider platform may include a second member platform 112b that is different from the first member platform 112a. In some examples, the partner platform and/or the service provider platform may include a single member platform (e.g., third member platform 112c). In some examples, the network of member platforms 110 may be configured for one or more different services.

Each of the components of the computing ecosystem 100 may be in electronic communication with, for example, one another over the same or different wireless or wired networks 120 including, for example, a wired or wireless Personal Area Network (PAN), Local Area Network (LAN), Metropolitan Area Network (MAN), Wide Area Network (WAN), or the like. The network 120, for example, may include any network connection including any type of network and/or across any geographic boundary (e.g., inter-country connections involving one or more sovereign entities, etc.). Additionally, while FIG. 1 illustrates certain systems as separate, standalone entities, the various embodiments are not limited to this particular architecture.

Although not explicitly illustrated, the exchange platform 102 may be a client device 104 and/or may be a part of the network of member platforms 110. In addition, or alternatively, the member platforms 112a-c may be a client device 104 and/or a part of the exchange platform 102. In some embodiments, each of the exchange platform 102 and/or the member platforms 112a-c may include the same computing platform.

a. Example Computing Platform

Figure 2:
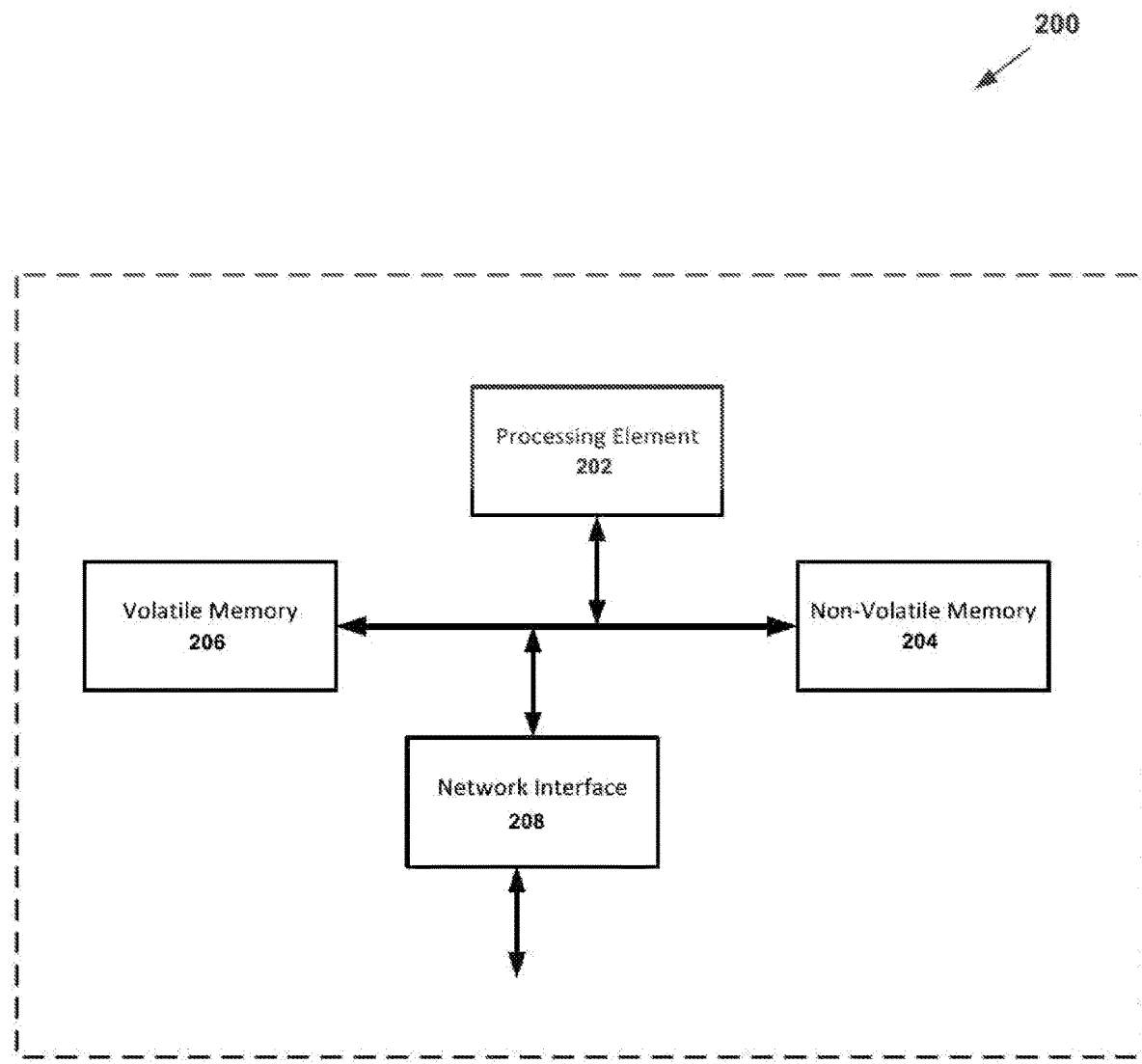
FIG. 2 is an example schematic of a computing platform in accordance with one or more embodiments of the present disclosure.

FIG. 2 is an example schematic of a computing platform 200 in accordance with one or more embodiments of the present disclosure. A computing platform 200, such as the exchange platform 102, the member platforms 112a-c, and/or the like of FIG. 1, may include, or be in communication with, one or more processing elements 202 (also referred to as processors, processing circuitry, and/or similar terms used herein interchangeably) that communicate with other elements within the computing platform 200 via a bus, for example. As will be understood, the processing element 202 may be embodied in a number of different ways.

For example, the processing element 202 may be embodied as one or more complex programmable logic devices (CPLDs), microprocessors, multi-core processors, co-processing entities, application-specific instruction-set processors (ASIPs), microcontrollers, and/or controllers. Further, the processing element 202 may be embodied as one or more other processing devices or circuitry. The term circuitry may refer to an entirely hardware embodiment or a combination of hardware and computer program products. Thus, the processing element 202 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 202 may be configured for a particular use or configured to execute instructions stored in volatile or non-volatile media or otherwise accessible to the processing element 202. As such, whether configured by hardware or computer program products, or by a combination thereof, the processing element 202 may be capable of performing steps or operations according to embodiments of the present disclosure when configured accordingly.

In some embodiments, the computing platform 200 includes, or is in communication with, non-volatile memory 204 (also referred to as non-volatile storage, media, memory storage, memory circuitry, and/or similar terms used herein interchangeably). In some examples, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile memory 204 may store data, databases, database instances, database management systems, files, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the computing platform 200 includes, or is in communication with, volatile memory 206 (also referred to as volatile storage, media, memory storage, memory circuitry, and/or similar terms used herein interchangeably). In some examples, the volatile memory 206 may also include one or more volatile storage or memory media, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile memory 206 may be used to store at least portions of the databases, database instances, database management systems, data, applications, programs, program modules, scripts, source code, object code, byte code, compiled code, interpreted code, machine code, executable instructions, and/or the like being executed by, for example, the processing element 202. Thus, the databases, database instances, database management systems, data, applications, programs, program modules, scripts, source code, object code, byte code, compiled code, interpreted code, machine code, executable instructions, and/or the like may be used to control certain aspects of the step/operation of the computing platform 200 with the assistance of the processing element 202 and operating system.

As indicated, in one embodiment, the computing platform 200 may also include one or more network interfaces 208 for communicating with various computing entities (e.g., one or more components of FIG. 1), such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing platform 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing platform 200 may include, or be in communication with, one or more input elements, such as a keyboard input, a mouse input, a touch screen/display input, motion input, movement input, audio input, pointing device input, joystick input, keypad input, and/or the like. The computing platform 200 may also include, or be in communication with, one or more output elements (not shown), such as audio output, video output, screen/display output, motion output, movement output, and/or the like.

As indicated, the computing platform 200 may be an example of one or more of the components of FIG. 1, such as the exchange platform 102 and/or the member platforms 112a-c.

b. Example Client Device

Figure 3:
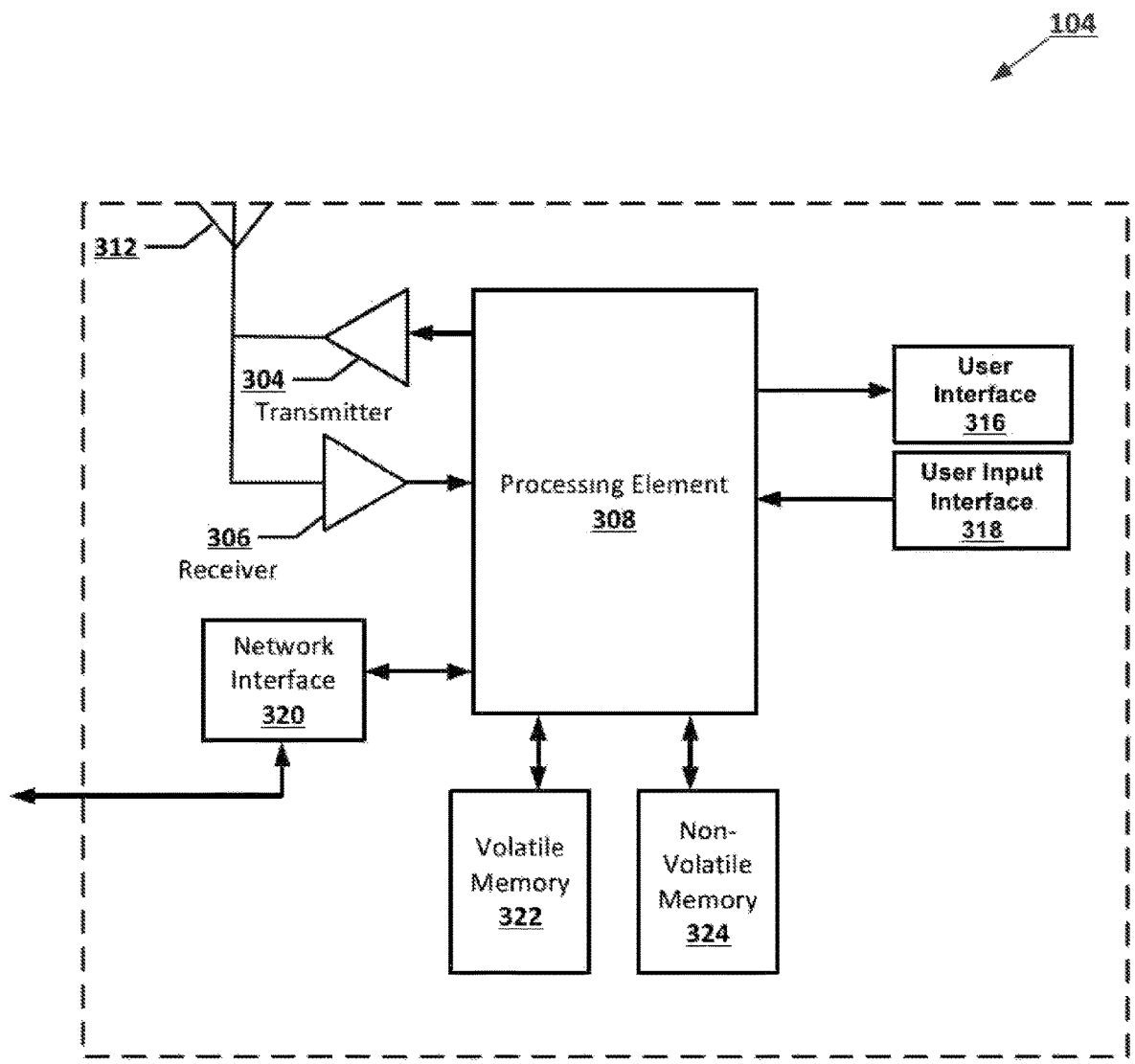
FIG. 3 is an example schematic of a client device in accordance with one or more embodiments of the present disclosure.

FIG. 3 is an example schematic of a client device 104 in accordance with one or more embodiments of the present disclosure. Client devices 104 may be operated by various entities, and an example computing ecosystem may include one or more client devices 104. For example, a client device 104 may be associated with, owned by, operated by, and/or the like by one or more end users. In various embodiments, an end user of a client device 104 may wish to engage in a value exchange between a partner and a service provider. As described herein, the user may do so by interacting leverage one or functionalities provided by an exchange platform through user input with the client device 104.

For example, a client device 104 may be a personal computing device, smartphone, tablet, laptop, personal digital assistant, and/or the like. In various embodiments, the computing platform 200 may communicate with and manage value exchanges for one or more client devices 104. As shown in FIG. 3, the client device 104 may include an antenna 312, a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the computing platform 200. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 104 may operate in accordance with multiple wired communication standards and protocols, such as those described above with regard to the computing platform 200 via a network interface 320.

Via these communication standards and protocols, the client device 104 may communicate with a computing platform 200 using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 may also download changes, add-ons, and updates, for instance, to its firmware, software (e.g., including executable instructions, applications, program modules), and operating system.

In some embodiments, the client device 104 includes location determining aspects, devices, modules, functionalities, and/or similar words used herein interchangeably. For example, the client device 104 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client device 104 in connection with a variety of other systems, including cellular towers, Wi-Fi access points, and/or the like. Similarly, the client device 104 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

In some embodiments, the client device 104 may include a user interface 316 (e.g., a display screen, a speaker, a tactile mechanization, etc. coupled to a processing element 308) and/or a user input interface 318 (e.g., a touch screen, a microphone, etc. coupled to a processing element 308). For example, the user interface 316 may be a present one or more application screens presented by one or more computing platforms described herein. The user input interface 318 may include any of a number of devices or interfaces allowing the client device 104 to receive data, such as a keypad (hard or soft), a touch display, voice/speech or motion interfaces, or other input device. In examples including a keypad, the keypad may include (or cause display of) the conventional numeric (0-9) and related keys (#, *), and other keys used for operating the client device 104 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client device 104 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the client device 104. As indicated, this may include a partner application, service provider application, and/or the like that is resident on the client device 104 and/or accessible through a browser or other user interface for communicating with a computing platform 200.

In some embodiments, the client device 104 may include one or more components or functionality that are the same or similar to those of a computing platform 200, as described in greater detail above. As will be recognized, these architectures and descriptions are provided for example purposes only and are not limited to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Example Networks

In some embodiments, any two or more of the illustrative components of the computing ecosystem 100 of FIG. 1 may be configured to communicate with one another via respective communicative couplings to one or more networks 120. The networks 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may include, for example, global networks (e.g., the Internet), MANs, WANs, LANs, or PANs. In addition, the networks 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

d. Example Value Exchange System

Figure 4:
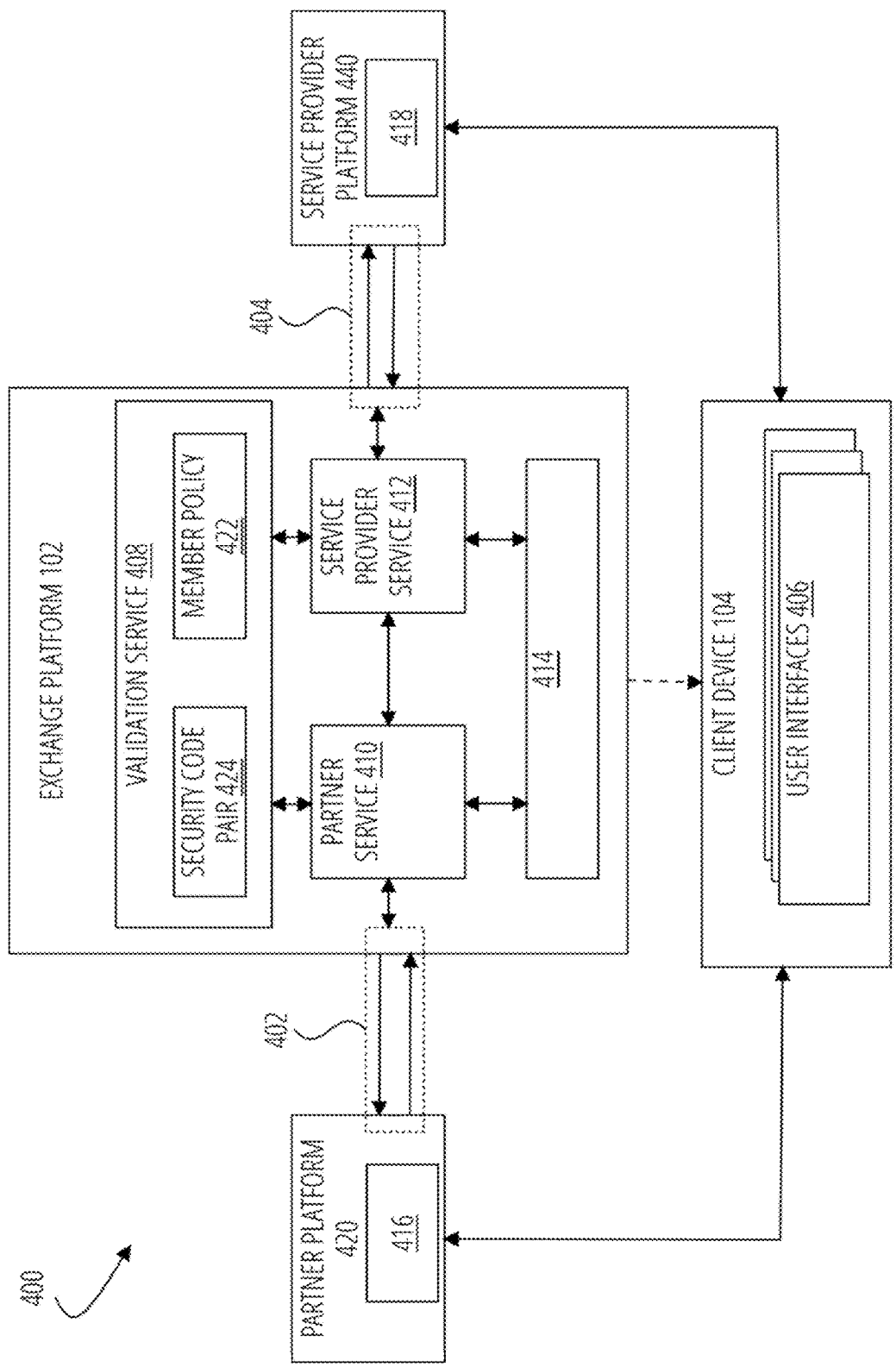
FIG. 4 is an example block diagram of an example credential-less value exchange system in accordance with one or more embodiments of the present disclosure.

FIG. 4 is an example block diagram of an example network-based exchange system 400 in accordance with one or more embodiments of the present disclosure. The network-based exchange system 400 includes a new computing ecosystem and computing platforms that provide an end-to-end value exchange solution to replace traditional exchange processing systems. As described herein, the network-based exchange system 400 may be value system agnostic and may be applied to any value-based exchange including, as examples, information-based exchanges, financial-based exchanges, reputation-based exchanges, healthcare-based exchanges, benefit-based exchanges, and/or the like. In any value system, the network-based exchange system 400 may leverage an intermediary entity and one or more defined communication interfaces to facilitate a network-based exchange between a value seeking entity (e.g., a partner) and a value providing entity (e.g., a service provider) that may be associated with one or more member platforms of the network-based exchange system 400.

As depicted, the network-based exchange system 400 may include an exchange platform 102, a partner platform 420, and/or a service provider platform 440 that may be configured to communicate through one or more exchange interfaces. The partner platform 420 and/or service provider platform 440 may include one or more member platforms 112*a-c* from the network of member platforms 110. For instance, the partner platform 420 and the service provider platform 440 may include a single member platform (e.g., member platform 112*c*). In addition, or alternatively, the partner platform 420 and the service provider platform 440 may include one or more different member platforms (e.g., member platforms 112*a* and 112*b*). In some examples, a user may interact with one or more of the platforms through a client device 104.

In some embodiments, the exchange platform 102 is a computing entity that is configured to facilitate a credential-less exchange of value for one or more members in a network. The exchange platform 102 may include one or more processing devices, memory devices, and/or the like that are physically and/or wirelessly coupled and configured to collectively (and/or individually) perform the one or more computing tasks for facilitating a value system agnostic exchange. In some examples, the exchange platform 102 may include, define, and/or otherwise leverage one or more exchange interfaces for facilitating communications (e.g., requests, responses, etc.) between a plurality of members. As described herein, the interfaces may be leveraged to facilitate a secure exchange between one or more members in any value system.

In some embodiments, the member is an entity that collaborates with the exchange platform 102 to take part in an exchange of value. As examples, a member may include (i) a partner that utilizes the exchange platform 102 to receive value, (ii) a service provider that utilizes the exchange platform 102 to provide value, and/or (iii) both a partner and a service provider. As used herein, a member may be referred to as a partner when it receives value through a value exchange and/or a service provider when it provides value through a value exchange. Thus, the same member may be a partner or a service provider depending on the role of the member in a value exchange. For example, a member may be a partner that receives value for a value exchange. The same member may be a service provider that provides value in another value exchange. In some examples, the same member may be both the partner and the service provider in the same value exchange, such that the member utilizes the exchange platform 102 to provide and then receive value in a sole member value exchange.

In some embodiments, a member is a partner when it utilizes a service provided by a service provider. A partner may include any value seeking entity in any value system. As an example, in a financial value system, a partner may include a merchant (e.g., retailer, brick-and-mortar establishment, etc.) that may utilize a service provider, such as a financial institution, to access funds for a financial transaction. In addition, or alternatively, in an information value system, a partner may include a news publisher (e.g., a newspaper, media organization, etc.) that may utilize a service provider, such as a news agency (e.g., wire service, news service, etc.) to access information for an information transaction. In a healthcare value system, a partner may include a healthcare provider that may access a healthcare benefits administrator to access medical benefits for funding a medical operation. As will be understood, the techniques of the present disclosure may be applied to any value system and the partner may include any value seeker for any respective value system.

In some embodiments, a member is a service provider when it provides a service for a partner. A service provider may include a source of value in any value system. As an example, in a financial value system, a service provider may include a financial institution (e.g., bank, currency exchange, credit union, etc.) that may provide access to funds for a financial transaction between one or more entities. In addition, or alternatively, in an information value system, a service provider may include a news agency (e.g., wire service, news service, etc.) that may source information for publication by a news publisher. In a healthcare value system, a service provider may include a healthcare benefits administrator that may provide access to medical benefits for a healthcare provider. As will be understood, the techniques of the present disclosure may be applied to any value system and the service provider may include any source of value for any respective value system.

In some embodiments, a service provider instrument is a mechanism leveraged by a service provider for providing value on behalf of a particular user. The service provider instrument may depend on the value system and/or service provider. In some examples, the service provider instrument may include an account with the service provider. For example, in a financial value system, a service provider instrument may include a bank account (e.g., checking, saving, etc.), brokerage account, line of credit, and/or the like. In an information value system, the service provider instrument may include a subscriber account, and/or the like. In a healthcare value system, the service provider instrument may include a health care benefits account, and/or the like.

In some embodiments, a service provided by a service provider is subject to one or more policies and/or security codes. For instance, the service provider and/or a service provider instrument may be associated with a security code for verifying the use of a service provider instrument. In addition, or alternatively, a service provider may be associated with one or more member policies for authenticating a security code.

In some embodiments, a security code is a data entity that defines a sequence of characters for verifying a user in an exchange. A security code may include a sequence of one or more distinct characters of a dynamic length (e.g., six characters, eight characters, etc.) that may be previously set by and/or provided to a user. The security code may be later provided by the user to validate the user's presence for an exchange (e.g., by comparing a security code input to a security code reference as described herein). The one or more distinct characters may include any number of alphanumeric, emoji, kanji, wingdings, and/or the like.

In some embodiments, the security code is a network administered n-character PIN. As described herein, the security code may be managed as a micro-service through a client device to enable and/or disable a UUEK (and/or any other exchange credential) prior to an exchange request. In this manner, the security code may be deployed against any type of service provider instrument through the enablement and/or disablement of a corresponding UUEK. By managing the security code at the network level, members may benefit from faster exchanges since the chance of an authorization decline for invalid PIN is eliminated. For example, a UUEK may be disabled until a security code is received for enabling the UUEK. The exchange platform 102 may prevent a user from initiating an exchange until a UUEK is enabled, thereby ensuring that all exchange authorization requests provided to a service provider are pre-validated in view of a security code.

In some embodiments, a security code corresponds to a user. For instance, a security code may be previously set by and/or provided to a user for a UUEK accessible to the user. In some examples, each security code may be UUEK-specific. For instance, each respective security code may be configured to enable a single UUEK. By way of example, the exchange platform 102 may be configured to enable a UUEK using plurality security code tuples 424 that each correlate a security code to a respective UUEK.

In some embodiments, a security code tuple 424 is a data entity that defines a correlation between a UUEK and a security code. A security code tuple 424 may include data object, record, and/or any other data structure (e.g., linked nodes, etc.) that is configured to represent an association between a security code and a UUEK. A security code tuple 424, for example, may include a security code reference, a UUEK, one or more derivative identifiers of the UUEK (as described herein), and/or contextual pairing data. The contextual pairing data may include one or more pairing attributes, such as one or more timing attributes. The timing attributes, for example, may be indicative of a configuration time (e.g., indicative of a time at which the security code tuple is set, etc.), an expiration time (e.g., a time at which the security code must be reset, etc.), and/or the like. As described herein, a security code tuple 424 may be leveraged by the exchange platform 102 to identify a security code reference for a UUEK and enable (and/or disable) the UUEK based at least in part on a comparison between the security code reference and a security code input provided by a user.

In some embodiments, a security code reference is a data entity that defines a recorded security code. A security code reference may include an internal representation (e.g., for the exchange platform 102, etc.) of a security code for a UUEK.

In some embodiments, a member policy 422 defines one or more validation requirements for a service provider instrument. A member policy 422 may correspond to a member and/or a service provider instrument of a member. For instance, a member policy 422 may define one or more validation requirements for using a service provider instrument based at least in part on one or more member-specific standards. In addition, or alternatively, a member policy 422 may define one or more validation requirements for using a service provider instrument based at least in part on one or more instrument-specific standards. The member-specific standards may apply to a plurality of service provider instruments associated with a member, whereas the instrument-specific standards may apply to at least one of the plurality of service provider instruments associated with a member.

A validation requirement may be indicative of one or more policy attributes for a value-based exchange that require an enabled UUEK. For instance, a disabled UUEK may be used to authorize a value-based exchange that does not include one or more attributes that require an enabled UUEK. In the event that a value-based exchange includes at least one attribute requiring an enabled UUEK, a disabled UUEK may be prevented from authorizing the value-based exchange.

In some examples, a policy attribute may include an object identifier, one or more object attributes, and/or one or more value-exchange attributes that identify an object and/or one or more authorized/unauthorized amounts of an object. For instance, a member policy 422 may include a plurality of object identifiers. The plurality of object identifiers may be indicative of a plurality of objects that are authorized/unauthorized for obtaining (e.g., purchasing, etc.) with a disabled UUEK.

In some examples, an object identifier may be a global object identifier. For instance, a global object identifier may be a stock keeping unit (SKU) code. In addition, or alternatively, a global object identifier may be a manufacturer part number (MPN), global trade item number (GTIN), product or service name, international standard book number (ISBN), universal product code (UPC), international article number (EIN), and/or the like. In some examples, an object identifier may include a system object identifier. A system object identifier, for example, may include an identifier (e.g., a table identifier, etc.) that corresponds to a recorded data object that represents an object within an exchange platform 102. In some embodiments, a system object identifier and a global object identifier are the same.

In some embodiments, a policy attribute includes a value-exchange attribute corresponding to a particular value-based exchange and/or an object included in the value-based exchange. A value-exchange attribute, for example, may include a threshold exchange value for a disabled UUEK. For example, one or more exchange attributes may be indicative of an exchange value and the one or more validation requirements may define an exchange value threshold in which a respective secured event is required for the service provider instrument.

A service provider and a partner may communicate through one or more respective member platforms that are respectively associated with the entities. As one example, a service provider may be associated with a service provider platform 440 and a partner may be associated with a partner platform 420.

In some embodiments, a member platform is a computing entity corresponding to a member associated with the exchange platform 102. The member platform may include a partner platform 420 acting on behalf of a partner, a service provider platform 440 acting on behalf of a service provider, and/or both. In some examples, a member platform may be both a partner platform 420 and a service provider platform 440. For example, the same member platform may be configured to operate on behalf of a partner for one value exchange and a service provider for another value exchange. In some examples, the same member platform may be configured to operate on behalf of both a partner and service provider in a single value exchange. It is noted that the term member platform may refer to a partner platform 420, a service provider platform 440, or both and, in some examples, may depend on the role of the member platform in a value exchange (e.g., and/or one or more interfaces utilized by the member platform in the value exchange).

In some embodiments, the partner platform 420 is a computing entity that is configured to perform one or more operations on behalf of a partner. The partner platform 420, for example, may include one or more processing devices, memory devices, and/or the like that are physically and/or wirelessly coupled and configured to collectively (and/or individually) perform the one or more computing tasks for requesting value in a value system agnostic exchange. In some examples, the partner platform 420 may include, define, and/or otherwise leverage one or more exchange interfaces for facilitating communications (e.g., requests, responses, etc.) with the exchange platform 102. In some examples, the partner platform 420 may be configured to host one or more user-facing applications (e.g., a partner application, etc.) for interacting with one or more users.

The partner platform 420, for example in a financial value system, may host an online marketplace for the partner that allows a user to interact (e.g., search, browse, purchase, return, etc.) with one or more products or services offered by the partner. In the event of a product purchase, the partner platform 420 may cooperate with one or more service providers to access funds for the purchase. Traditionally, access to funds from a service provider is facilitated using a card number, account number, and/or another financial credential that may expose a user to malicious parties. To address network security and data privacy concerns with traditional financial systems (and/or other value-based systems), the partner platform 420 may register with the exchange platform 102 by configuring one or more software development kits (SDKs), APIs, and/or the like for facilitating communications with the exchange platform 102. For example, the partner platform 420 may include, define, and/or otherwise leverage one or more partner interface 402 for facilitating communications (e.g., requests, responses, etc.) with the exchange platform 102.

In some embodiments, the service provider platform 440 is a computing entity that is configured to perform one or more operations on behalf of a service provider. A service provider platform 440, for example, may include one or more processing devices, memory devices, and/or the like that are physically and/or wirelessly coupled and configured to collectively (and/or individually) perform the one or more computing tasks for providing value in a value system agnostic exchange. In some examples, a service provider platform 440 may include, implement, and/or otherwise leverage one or more interfaces for facilitating communications (e.g., requests, responses, etc.) with the exchange platform 102. In some examples, a service provider platform 440 may be configured to facilitate one or more service provider instruments. In some examples, the service provider platform 440 may be configured to host one or more user-facing applications (e.g., a service provider applications, etc.) for managing the one or more service provider instruments.

In some examples, the service provider platform 440, for example in a financial value system, may maintain one or more financial assets (e.g., lines of credit, bank accounts, etc.) that allow a user to fund an exchange for purchasing a product from a partner. In the event of a product purchase, the service provider platform 440 may cooperate with partner platform 420 to authorize an exchange and/or otherwise provide access to funds for the purchase. Traditionally, access to funds from the service provider is facilitated by presenting a card number, account number, and/or another financial credential to the service provider platform 440 which may expose a user, service provider, or partner to malicious parties, especially when provided over an unsecure network (e.g., public network, and/or the like). To address network security and data privacy concerns with traditional financial systems (and/or other value-based systems), the service provider platform 440 may register with the exchange platform 102 by configuring one or more software development kits (SDKs), APIs, and/or the like for facilitating communications with the exchange platform 102. For example, the service provider platform 440 may include, implement, and/or otherwise leverage one or more service provider interfaces 404 for facilitating communications (e.g., requests, responses, etc.) with the exchange platform 102.

As described herein, a service provider interface 404 may enable the exchange platform 102 to identify and request the use of a service provider instrument for facilitating a transaction. For example, the service provider platform 440 may be configured to facilitate one or more service provider instruments. In some examples, a service provider instrument may include a virtual instrument (e.g., virtual account, line of credit, etc.) hosted by a service provider platform 440. For instance, the service provider platform 440 may be configured to maintain a plurality of instrument data objects indicative of a plurality of service provider instruments for a plurality of affiliated entities.

In some embodiments, an instrument data object is a data entity that represents a service provider instrument. The instrument data object may include one or more instrument identifiers and/or one or more instrument attributes. In some examples, the one or more instrument identifiers and/or one or more instrument attributes may be based at least in part on a type of instrument data object. By way of example, a service provider instrument may be represented in a member platform (e.g., the service provider platform 440) as a member instrument data object. In addition, or alternatively, the service provider instrument may be independently represented by a system instrument data object in an exchange platform 102. In some examples, the member instrument data object and the system instrument data object may include one or more of the same one or more instrument identifiers and/or one or more instrument attributes. By way of example, a member platform may register a plurality of service provider instruments with the exchange platform 102 (e.g., using a service provider interface 404). During registration, the member platform (e.g., service provider platform 440) may provide one or more of the instrument identifiers and/or instrument attributes and, in some examples, the exchange platform 102 may return another identifier.

In some embodiments, the member instrument data object is an internal representation of a service provider instrument within a member platform, such as the service provider platform 440. The member instrument data object may include one or more instrument identifiers, such as a member instrument identifier, an instrument key from the exchange platform 102, and/or a user identifier. The user identifier, for example, may include a member user identifier, as described herein. In addition, or alternatively, the member instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a (i) currency associated with the service provider instrument, (ii) an asset availability (e.g., a balance, coverage, etc.) of the service provider instrument, (iii) one or more previous transactions with the service provider instrument, and/or the like.

In some embodiments, the system instrument data object is an external representation of a service provider instrument within the exchange platform 102. The system instrument data object may include one or more instrument identifiers, such as an instrument reference for a member platform, a system instrument identifier, and/or a user identifier. The user identifier, for example, may include a system user identifier, as described herein. In addition, or alternatively, the system instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a currency associated with the service provider instrument.

As described herein, a service provider instrument may be associated with one or more usage restrictions, such as a security code and/or member policy 422. In some examples, the exchange platform 102 may include a validation service 408 that is configured to adjudicate secured interaction requests and/or exchange requests based at least in part on a valid security code input and/or the member policy 422. To do so, the exchange platform 102 (and/or validation service 408 thereof) may have access to a security code tuple 424 and/or member policy 422 for a service provider instrument. For example, a member platform may register a security code with exchange platform 102 (e.g., using a service provider interface 404 and/or partner interface 402). After registration, the security code may be stored as a security code reference of a security code tuple 424 that associates the security code reference with a user, member, service provider instrument, and/or UUEK associated therewith. In addition, or alternatively, a member platform may register the member policy 422 with the exchange platform 102 (e.g., using a service provider interface 404). During registration, the member platform (e.g., service provider platform 440) may provide one or more policy attributes, attribute updates, and/or the like for validating secured interaction and/or exchange requests that reference one or more service provider instruments that are maintained, and/or the like by the member platform. In some examples, the member platform may continuously update the member policy 422 as one or more policy attributes are modified, added, and/or removed.

As described herein, the exchange platform 102 (e.g., the validation service 408, etc.) may validate a user, service provider instrument, UUEK, and/or exchange requests using a security code and/or member policy 422. In some examples, the validation of an exchange request may be based at least in part on recorded data objects.]

In some embodiments, a recorded data object is a data object that represents an object that may be involved in a value-based exchange. In some examples, a recorded data object may be an internal representation of an object for the exchange platform 102. For example, an object may include a distinct unit of a value-based exchange for which value is being transferred. A recorded data object for the object may include a data object that records one or more aspects (e.g., object identifiers, object attributes, etc.) of the object.

For instance, a recorded data object may include an object identifier and/or one or more object attributes for a particular object associated with a value system. The object may be based at least in part on the value system. For instance, in a financial value system, an object may be a tangible or intangible item, product, and/or the like that may be purchased in exchange for a unit of currency. In a healthcare value system, an object may be a healthcare procedure, and/or the like that may be covered by a healthcare policy.

In some examples, the exchange platform 102 may maintain and/or have access to an object datastore that includes a plurality of recorded data objects. As described herein, the object datastore may include a plurality of recorded data objects that are at least partially sourced from one or more members of the exchange network.

In some embodiments, an object attribute of a data entity that describes a characteristic of an object. An object attribute may include an object-based attribute and/or an exchange-based attribute.

For instance, an object-based attribute may include a spatial attribute, a count attribute, a value attribute, a source attribute, a composition attribute, a categorical attribute, and/or any other attribute that is descriptive of an object characteristic. A spatial attribute, for example, may be indicative of one or more dimensions (e.g., height, width, weight, etc.) of an object, value attribute may be indicative of a value (e.g., price, etc.) of the object, a composition attribute may be indicative of one or more ingredients, components, etc. of the object, a categorical attribute may be indicative of one or more categories (e.g., restricted substances, etc.) of the object, and/or the like. By way of example, one or more categorical attribute may be indicative whether an object is associated with (i) one or more general store categories, such as vegetables, fruits, dairy, meat, grains, seeds, alcohol, tobacco, in-store consumable, hot food, pharmacy, pet feed, and non-food, (ii) one or more medical categories, such as a dental, eyecare, general health, etc., (iii) one or more informational categories, such as international sources, domestic sources, etc. and/or the like. In some examples, a composition attribute may be indicative of one or more components of an object, such as a percentage by volume of alcohol within an object, one or more ingredients, such as meat, dairy-derived, peanut-derived, tree nut-derived, soy-derived, and/or the like.

In some examples, an object-based attribute may be based at least in part on the value system. For instance, in at least a financial-based value system, an object-based attribute may include one or more line item attributes, one or more line item adjustments, and/or the like. Line item attributes may include a sequence, a line item group, a product code, an item name, an item source (e.g., provider, manufacturer, etc.), a description, a quantity, a mass (e.g., gram, kilogram, etc.), one or more spatial dimensions (e.g., length, width, height, volume, etc.), a unit amount, a unit tax amount, a line amount (e.g., amount of the line item), a line tax amount, and/or the like. Line item adjustments may include an adjustment type (e.g., manufactures discount, a store discount, a return, a payment cash, a payment gift card, payment other, and/or the like), an item, product, or service code, an item description, an item quantity, a unit-item, an item mass (e.g., gram, kilogram, etc.), a unit amount, a unit tax amount, a line amount (e.g., amount of the line item), a line tax amount, and/or the like.

In some examples, a member platform, such as the partner platform 420 and/or service provider platform 440, may be associated with a user-facing application for facilitating one or more interactions with a user and/or other affiliated entity (e.g., through the client device 104).

In some embodiments, the user-facing application is a computer program hosted by a computing entity for facilitating one or more user interactions. A user-facing application may include software (e.g., computer readable instructions, etc.) designed to perform one or more computing tasks for a computing entity, such as a member platform. For instance, a user-facing application may facilitate communication between a member and a user. As examples, the user-facing application may be configured to present one or more user interfaces 406 (e.g., via a client device 104) for interacting with a user on behalf of a member. In some examples, the user-facing application may be configured to receive user input (e.g., via the one or more user interfaces 406) to receive information from a user. The user input, for example, may include a security code input for securing an interaction for a user.

In some embodiments, a user-facing application is a partner application 416 that is hosted by the partner platform 420 (e.g., a member platform acting as a partner for a particular exchange, etc.) to facilitate functions for a partner. A partner application 416 may include software (e.g., computer readable instructions, etc.) designed to perform one or more computing tasks for a partner. In some examples, the partner application 416 may be configured with one or more devices (e.g., point of sale terminals, etc.) from a standalone partner establishment (e.g., a brick and mortar bank, etc.). For instance, a partner application 416 may be configured to present one or more user interfaces 406 for interacting (e.g., browsing, purchasing, reviewing, etc.) with one or more products offered by a retail-based partner, one or more units of information offered by an information-based partner, and/or the like. In some examples, the partner application 416 may be configured to receive user input (e.g., via one or more user interfaces 406) to receive information from a user.

In some embodiments, the service provider platform 440 is configured to host one or more service provider applications 418 for managing one or more service provider instruments. For example, a user-facing application may be a service provider application 418 that is hosted by the service provider platform 440 (e.g., a member platform acting as a service provider for a particular exchange, etc.) to facilitate functions for the service provider. In some examples, the service provider application 418 may be configured with one or more devices from a standalone service provider establishment (e.g., a brick and mortar bank, etc.). A service provider application 418 may include software (e.g., computer readable instructions, etc.) designed to perform one or more computing tasks for a service provider. For instance, a service provider application 418 may be configured to present one or more user interfaces for interacting (e.g., reviewing, managing, auditing, enrolling, etc.) with one or more service provider instruments facilitated by the service provider. By way of example, in a financial value system, the service provider application 418 may enable access to a bank account, brokerage account, line of credit, and/or the like, to manage funds, assets, and/or the like, handled by the respective accounts. In some examples, the service provider application 418 may be configured to receive user input (e.g., via the one or more user interfaces 406) to receive information, authorizations, and/or the like from a user.

In some embodiments, the partner application 416 and/or the service provider application 418 is configured to maintain, update, and/or register a security code and/or a member policy 422 for a user, service provider instrument, and/or UUEK corresponding thereto. For instance, the partner platform 420 and/or service provider platform 440 may enable a user, organization, and/or any other entity to configure a security code for initiating a secured interaction. In addition, or alternatively, the service provider platform 440 may enable a user, organization, and/or any other entity to configure a member policy 422 for governing the use of a service provider instrument.

In some examples, a user input may be provided and/or received through the service provider application 418 and/or the partner application 416. The user input, for example, may include a security code input for initiating a secured interaction. For example, the security code input may be provided to the exchange platform 102 through input to a user interface of the service provider application 418 and/or the partner application 416. In some embodiments, the exchange platform 102 facilitates communication between the partner platform 420 and the service provider platform 440 using one or more exchange interfaces.

In some embodiments, an exchange interface is a set of instructions for facilitating communications between the exchange platform 102 and one or more member platforms and/or internal services. An exchange interface may include an API, file based interface, a message queue based interface, and/or the like. For instance, an exchange interface may include an API including, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may include one or more RPC APIs, such as one or more gRPC APIs.

The exchange platform 102 may include, define, and/or otherwise leverage one or more different exchange interfaces for facilitating communication with one or more external platforms, such as one or more member platforms (e.g., a partner platform 420, service provider platform 440, etc.). Each interface may include a plurality of communication instructions, message definitions, and/or the like for exchanging requests and/or responses between the exchange platform 102 and an entity that is taking part in a value exchange. By way of example, an exchange interface may include a partner interface 402 for facilitating communication with a partner platform 420 and/or a service provider interface 404 for facilitating communication with a service provider platform 440.

In some embodiments, the partner interface 402 is an exchange interface for facilitating one or more communications between a partner platform 420 and the exchange platform 102. The partner interface 402 may define one or more communication instructions, message definitions, and/or the like for facilitating one or more request messages and/or response messages between a partner platform 420 and the exchange platform 102. The partner interface 402, for example, may include an API that defines (i) requests to the exchange platform 102 from a computing entity acting as a partner platform 420 and/or (ii) requests from the exchange platform 102 to the partner platform 420. For example, the partner interface 402 may define one or more registration messages, session messages, transaction messages, and/or the like for facilitating an exchange of value for the partner. In some embodiments, the partner interface 402 defines one or more identifiers for securely identifying one or more portions of a value exchange.

In some embodiments, the service provider interface 404 is an exchange interface for facilitating one or more communications between a service provider platform 440 and the exchange platform 102. The service provider interface 404 may define one or more communication instructions, message definitions, and/or the like for facilitating one or more request messages and/or response messages between a service provider platform 440 and the exchange platform 102. The service provider interface 404, for example, may include an API that defines (i) requests to the exchange platform 102 from a computing entity acting as a service provider platform 440 and/or (ii) requests from the exchange platform 102 to the service provider platform 440. The service provider interface 404, for example, may define one or more registration messages, session messages, transaction messages, and/or the like for facilitating an exchange of value using a service provider instrument. In some embodiments, the service provider interface 404 defines one or more identifiers for securely identifying one or more portions of a value exchange.

The exchange platform 102 may facilitate communications between a network of member platforms. The network of members, for example, may include a plurality of entities that have been onboarded with the exchange platform 102 by, for example, registering with the exchange platform 102, configuring a respective interface for communicating with the exchange platform 102, and/or the like. In some examples, the exchange platform 102 may execute one or more individual services for interacting with each onboarded entity. The individual services, for example, may include one or more partner services 410 and/or service provider services 412.

In some embodiments, the exchange platform 102 instantiates a separate partner-specific service, the partner service 410, for each of the network of members. In addition, or alternatively, for example in a multi-tenant environment, the partner service 410 may be instantiated for one or more partners from the network of members. The partner service 410 may be configured to execute one or more exchange operations for resolving exchange requests from a partner platform 420. In some embodiments, the exchange platform 102 instantiates a separate service provider-specific service, the service provider service 412, for each of the network of members. In addition, or alternatively, for example in a multi-tenant environment, the service provider service 412 may be instantiated for one or more service providers from the network of members. The service provider service 412 may be configured to execute one or more exchange operations for acquiring and resolving an exchange request from a partner platform 420. The exchange operations may include any of the steps and/or operations described herein.

In some embodiments, the partner service 410 and/or the service provider service 412 interact, through one or more local communication mechanisms, with each other and/or one or more other components of the exchange platform 102 to perform an exchange operation. For example, the exchange platform 102 may include a validation service 408. The validation service 408 may be configured to perform one or more validation operations of the present disclosure to validate a UUEK. In this manner, an exchange platform 102 may pre-process exchange requests and authorization credentials of an exchange request on behalf of a member platform to implement a member policy 422 thereof.

Through the performance of one or more exchange operations, the partner service 410 and/or service provider service 412 may generate and leverage a plurality of non-traditional identifiers for referencing one or more aspects of a user, a service provider instrument, and/or a value exchange. At least some of these identifiers may include universally unique identifiers, such as a UUEK, that may be leveraged to provide a credential-less value exchange. Each identifier may be at least temporarily stored in a platform data vault 414. The platform data vault 414 may include any type of memory device as described herein. In some examples, each service and/or one or more sets of services may be associated with an individual portion of the platform data vault 414.

As described herein, one or more identifiers may by stored in associated with each other to form identifier mappings that may be leveraged by the exchange platform 102 (and/or one or more services thereof) to reference a user, service provider instrument, and/or any other aspect of a value exchange from communications between the partner platform 420, the service provider platform 440, and/or any other member platform without including user credentials. An example of the non-traditional identifiers will now further be described with reference to FIG. 5.

e. Example Data Structures

Figure 5:
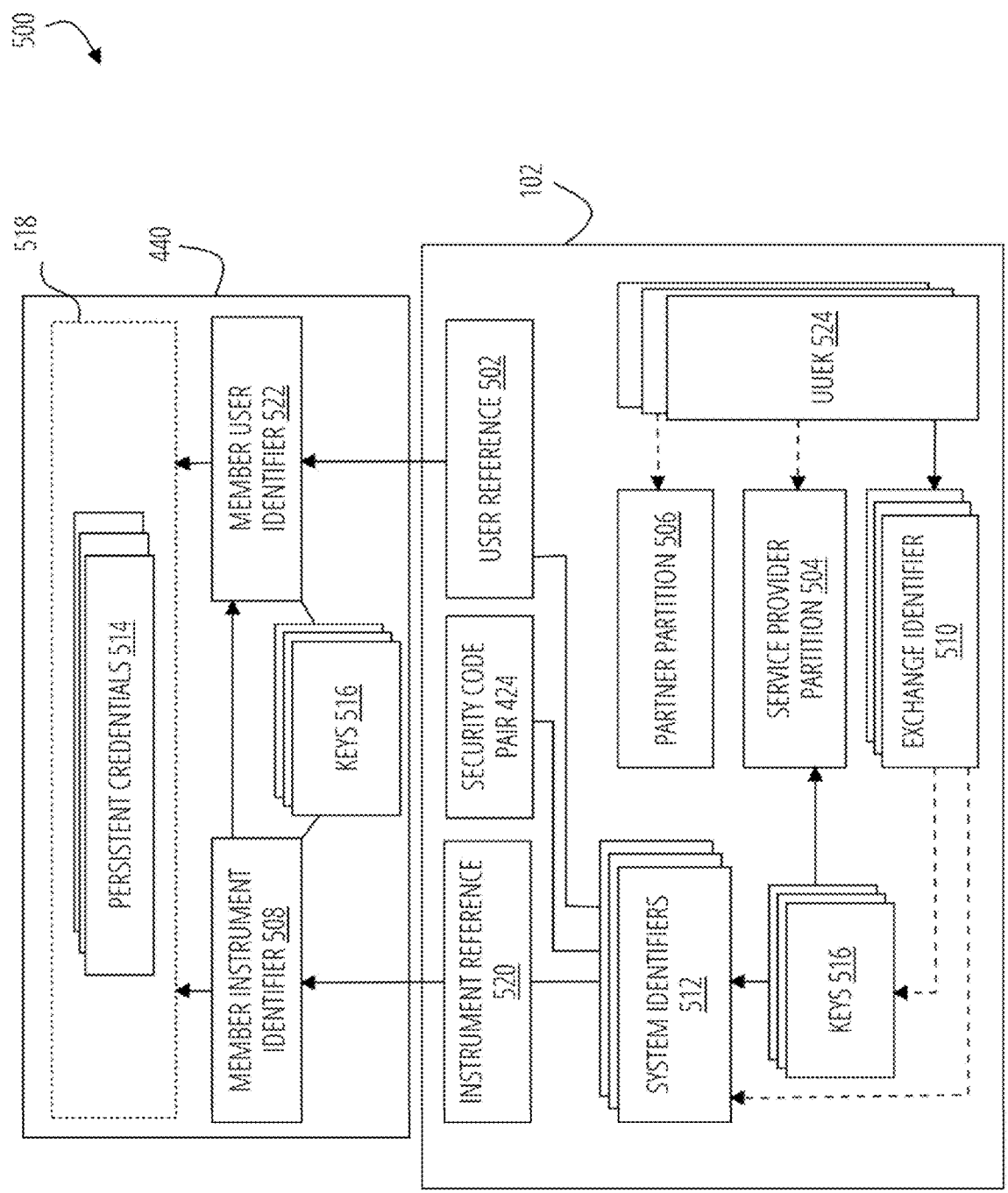
FIG. 5 is an example data diagram for facilitating a credential-less exchange of value in accordance with one or more embodiments of the present disclosure.

FIG. 5 is an example data diagram 500 for facilitating a credential-less exchange of value in accordance with one or more embodiments of the present disclosure. The data diagram 500 illustrates a plurality of related identifiers of different types. As depicted, each identifier may be associated with at least one related identifier to form identifier mappings within one or more platforms, such as the exchange platform 102 and/or a service provider platform 440. The identifier mappings empower communications between the exchange platform 102 and the service provider platform 440 that reference a service provider instrument 518 without exposing persistent credentials 514 (e.g., username, password, card number, etc.) associated with the service provider instrument 518 that are susceptible to fraud, misuse, and exploitation by malicious parties. As illustrated, using some of the techniques of the present disclosure, the persistent credentials 514 may never have to be communicated outside of a service provider platform 440. The data diagram 500 illustrates just some of the plurality of identifiers that may be generated, stored, and/or leveraged by the various embodiments of the present disclosure. It will be understood that the illustrated identifiers are not an exhaustive list and may include other, non-illustrated identifiers. Each of the identifiers may be labeled as an identifier, reference, key, and/or other similar terms. These terms are used herein interchangeably to refer to a unit of information for identifying data structures, entities, and/or any other component described herein.

As illustrated, some of the plurality of related identifiers in various embodiments of the present disclosure may include, as examples, (i) one or more user references 502 that may be mapped to member user identifiers 522 of the service provider platform 440, (ii) one or more service provider partitions 504 corresponding to a network of onboarded service provider platforms, such the service provider platform 440, (iii) one or more partner partitions 506 corresponding to a network of onboarded partner platforms, (iv) one or more instrument references 520 that may be mapped to member instrument identifiers 508 of the service provider platform 440, (v) one or more keys 516 and/or system identifiers 512 that may be associated with the user references 502 and/or instrument references 520, (vi) one or more exchange identifiers 510 that may be mapped to either the system identifiers 512 and/or the keys 516, and/or (vii) one or more UUEKs 524 that may be mapped to the exchange identifiers 510 and/or at least one of a partner partition 506 and/or the service provider partition 504.

In some examples, the service provider platform 440 may store one or more identifiers that may be mapped to a service provider instrument 518 and/or one or more identifier of the exchange platform 102 to enable the service provider platform 440 to reference a service provider instrument 518 based at least in part on identifiers that, by themselves, are not indicative of any aspect of the service provider instrument 518, including the persistent credentials 514 thereof.

By way of example, the service provider platform 440 may store, maintain, and/or otherwise access one or more keys 516 that map to (e.g., is a duplicate of, derivative of, etc.) one or more system identifiers 512 of the exchange platform 102. The keys 516, for example, may include the system identifiers 512 as a portion of the keys 516. The keys 516 may be mapped to member instrument identifiers 508 and/or member user identifiers 522 that may internally reference a user and/or service provider instrument 518 of the service provider platform. The keys 516, for example, may be provided during a registration process between the service provider platform 440 and/or the exchange platform 102.

As another example, the exchange platform 102 may store, maintain, and/or otherwise access one or more references, such as the instrument reference 520 and/or the user reference 502 that map to (e.g., is a duplicate of, derivative of, etc.) one or more member identifiers, such as the member instrument identifier 508 and/or the member user identifier 522 of the service provider platform 440. The references, for example, may be provided during a registration process between the service provider platform 440 and/or the exchange platform 102.

In some embodiments, the exchange platform 102 references each member platform of a network of member platforms using one or more entity partitions. In some embodiments, an entity partition is a unique identifier for a computing entity. An entity partition may include a unique number, alpha-numeric, and/or the like that represents a particular computing entity. An entity partition, for example, may include a member partition that represents a member platform, a service provider partition 504 that represents the service provider platform 440, a partner partition 506 that represents a partner platform 420, and/or the like.

In some embodiments, the service provider partition 504 is a unique identifier for a service provider and/or service provider platform 440 of a service provider. The service provider partition 504 may include a sequence of numeric, alpha-numeric, any/or any other characters or symbols that are representative of a service provider that is associated (e.g., onboarded, registered, etc.) with the exchange platform 102. The exchange platform 102, for example, may include a plurality of service provider partitions that respectively identify a service provider platform 440 that is affiliated with (e.g., onboarded with, registered with, etc.) the exchange platform 102. Each service provider partition 504 may represent a service provider platform 440 that has configured one or more exchange platform software development kits (SDKs), and/or like for implementing a service provider interface of the exchange platform 102.

In some embodiments, the partner partition 506 is a unique identifier for a partner and/or a partner platform of a partner. The partner partition 506 may include a sequence of numeric, alpha-numeric, any/or any other characters or symbols that are representative of a partner that is associated with the exchange platform 102. The exchange platform 102, for example, may include a plurality of partner partitions that respectively identify a partner platform that is affiliated with (e.g., onboarded with, registered with, etc.) the exchange platform 102. Each partner partition 506 may represent a partner platform that has configured one or more exchange SDKs, and/or the like for implementing a partner interface of the exchange platform 102.

In some embodiments, the entity partitions are generated to identify a member when the member platform is onboarded with the exchange platform 102. In some examples, after onboarding with the exchange platform, the member platforms may leverage one or more exchange interfaces to register one or more service provider instruments with the exchange platform 102. A service provider instrument 518 may be registered with the exchange platform 102 by exchanging one or more instrument identifiers with the exchange platform 102.

In some embodiments, an instrument identifier includes any representation of the service provider instrument 518 that identifies the service provider instrument without the exposing persistent credentials 514 of the service provider instrument 518. The instrument identifier may include a member instrument identifier 508, a system instrument identifier, an instrument reference 520, instrument key, and/or the like, as described herein.

In some embodiments, a member instrument identifier 508 is a unique identifier for representing a service provider instrument 518 within a member platform, such as the service provider platform 440. The member instrument identifier 508, for example, may include a sequence of numeric, alpha-numeric, any/or any other characters or symbols that represent a service provider instrument 518 to the service provider platform 440. In some examples, the member instrument identifier 508 may include a table identifier for a member instrument data object.

In some embodiments, the instrument reference 520 is a unique identifier for referencing a member instrument identifier 508. The instrument reference 520, for example, may be generated and/or provided by a member platform to the exchange platform 102 to allow the exchange platform 102 to reference the service provider instrument 518 maintained at the member platform. In some examples, the instrument reference 520 is the same value as the member instrument identifier 508. In some examples, the instrument reference 520 is a different value that is mapped to the member instrument identifier 508.

In some embodiments, a system instrument identifier is a unique identifier for representing a service provider instrument 518 within the exchange platform 102. The system instrument identifier, for example, may include a sequence of numeric, alpha-numeric, any/or any other characters or symbols that represent the service provider instrument 518 to the exchange platform 102 without exposing the persistent credentials 514 of the service provider instrument 518. In some examples, the system instrument identifier may include a UUID. In some examples, the system instrument identifier may include at least one of the system identifiers 512.

In some embodiments, the instrument key is a unique identifier for referencing a system instrument identifier. The instrument key, for example, may be generated and/or provided by the exchange platform 102 during a registration process of the service provider instrument 518 with the exchange platform 102. In some examples, the instrument key may include a wrapped system instrument identifier. For example, the instrument key may include a string of alphanumeric characters that are formatted according to a key format established by the exchange platform 102 (and/or one or more APIs thereof). The key format may include any number of characters, such as fifty characters or more. In some examples, the characters may be case sensitive. A first portion of the characters (e.g., the first six characters) may be reserved as a partition for identifying an entity associated with the key. For an instrument key, for example, the partition may include the service provider partition 504. A second portion of the characters may identify the system instrument identifier. In some examples, the instrument key may include at least one of the keys 516. The key formats described herein may include one or more different portions, each of which may be arranged in any order.

In some embodiments, after onboarding with the exchange platform 102, a member platform may leverage one or more exchange interfaces to register one or more users with the exchange platform 102. A user may be registered with the exchange platform 102 by exchanging one or more user identifiers with the exchange platform 102. The user identifiers, for example, may be leveraged to generate, maintain, and/or update one or more user data objects reflective of a user of a member platform and/or the exchange platform 102.

In some embodiments, a user data object is a data entity that represents a user that interacts with a member platform and/or the exchange platform 102. A user, for example, may include an entity (e.g., person, organization, group, etc.) that engages in an exchange of value governed by the exchange platform 102. In some examples, the user may indirectly cooperate with the exchange platform 102 by creating a user account with a registered service provider, registering (and/or giving permission to register) a service provider instrument 518, and/or the like. In some examples, the exchange platform 102 may act on the user's behalf without the user directly engaging with the exchange platform 102. For example, the exchange platform 102 may act as a hidden intermediary between a user-facing application and a user's service provider instrument 518.

In some embodiments, a user data object includes one or more user identifiers and/or one or more user attributes. In some examples, the one or more user identifiers and/or one or more user attributes may be based at least in part on a type of user data object. By way of example, a user may be represented in a member platform as a member user data object. In addition, or alternatively, the user may be independently represented by a system user data object in an exchange platform. In some examples, the member user data object and the system user data object may include one or more of the same one or more user identifiers and/or user attributes. By way of example, a member platform may register a plurality of users with the exchange platform 102. During registration, the member platform may provide one or more of the user identifiers and/or user attributes and, in some examples, the exchange platform 102 may return another identifier.

In some embodiments, a member user data object is an internal representation of a user within a member platform, such as the service provider platform 440. The member instrument data object may include one or more user identifiers, such as a member user identifier 522, a user key from the exchange platform 102, and/or the like. In addition, or alternatively, the member user data object may include one or more user attributes. The one or more user attributes may be indicative of one or more contextual characteristics for a user. In some examples, the user attributes may be indicative of one or more identifiable characteristics for a user. By way of example, the user attributes may be indicative of a user's first name, last name, email, physical address (e.g., one or more of a street, locality, region, postal code, country, etc.), birthday (e.g., a birth date, an age band, etc.), phone number, and/or the like. In some examples, the user attributes may include encrypted, hashed, and/or otherwise secured representations of the identifiable characteristics for a user. For instance, the user attributes may include one or more hashed identifiers for the user and/or the like.

In some embodiments, the system user data object is an external representation of a member's user within the exchange platform 102. The system user data object may include one or more user identifiers, such as a user reference 502 for a member platform, a system user identifier, and/or the like. In addition, or alternatively, the system user data object may include one or more user attributes, such as those described herein. By way of example, a member platform may register a user with the exchange platform 102. During registration, the member platform may provide the user reference 502 for the user and/or the one or more user attributes. In some examples, the user attributes may include hashed and/or encrypted identifiers for the user.

In some embodiments, a user identifier includes a unique identifier for a user involved in a value-based exchange. A user identifier may include a sequence of numeric, alpha-numeric, any/or any other characters or symbols that are representative of a user of the exchange platform 102 and/or a member platform. In some examples, a user identifier may include a user reference 502, a user key, a system user identifier, a member user identifier, and/or the like.

In some embodiments, a system user identifier is a unique identifier for representing a user within the exchange platform 102. The system user identifier, for example, may include a sequence of numeric, alpha-numeric, any/or any other characters or symbols that represent a user to the exchange platform 102. In some examples, the system user identifier may include a UUID specific to a particular user. In some examples, the system user identifier may include at least one of the system identifiers 512.

In some embodiments, a member user identifier 522 is a unique identifier for representing a user within a member platform. The member user identifier, for example, may include a sequence of numeric, alpha-numeric, any/or any other characters or symbols that represent a user to the service provider platform 440.

In some embodiments, a user reference 502 may be a unique identifier for referencing a member user identifier 522. The user reference 502, for example, may be generated and/or provided by a member platform to an exchange platform 102 to allow the exchange platform 102 to reference a user associated with the member platform. In some examples, the user reference 502 is the same value as the member user identifier 522. In some examples, the user reference 502 is a different value that is mapped to the member user identifier 522.

In some embodiments, a user key is a unique identifier for referencing a system user identifier. The user key, for example, may be generated and/or provided by the exchange platform 102 during a registration process of a user with the exchange platform 102. In some examples, the user key may include a wrapped system user identifier. For example, the user key may include a string of alpha-numeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for a user key, the partition may include a service provider partition 504 and/or a partner partition. A second portion of the characters may identify the system user identifier.

As illustrated by FIG. 5, the keys 516, such as the user and instrument keys described herein, may be shared across the exchange platform 102 and the service provider platform 440. In addition, in some examples, references, such as the instrument reference 520 and user reference 502, may be shared across entities. These identifiers, and the mapping schemes described herein, allow the exchange platform 102 to reference a service provider instrument 518 without knowledge of persistent credentials 514 (e.g., card numbers, etc.) of the service provider instrument 518. As described herein, one or more of the keys 516 and/or references may be provided to the service provider platform 440 individually, or in any combination. In some examples, each of the keys 516 and the references may be provided to the service provider platform 440 in a redundant process that allows the service provider platform to verify that a communication is provided by the exchange platform 102 (e.g., an entity with access to the specific set of keys and references, etc.).

In some embodiments, persistent credentials 514 for a service provider instrument 518 include sensitive user and/or instrument credentials, such as a card number, account number, subscription number, and/or the like, that may expose a user, member, and/or intermediary entity to risk. The persistent credentials 514 may be generated, accessed, and/or otherwise provided by a service provider platform 440 to a user when a user applies for, is authorized for, and/or otherwise is enabled to open a new service provider instrument 518. Traditionally, persistent credentials 514 are then used by the user to initiate value exchanges using the service provider instrument. By doing so, the user is forced to expose sensitive credentials that are tied directly to the service provider instrument 518 each time the service provider instrument 518 is used. The keys 516, references, and identifier mapping scheme of the present disclosure overcome these technical deficiencies.

In some examples, each of the identifiers are interpretable to a computing platform, such as the exchange platform 102 and/or service provider platform 440, but not the user. To enable the user to select a service provider instrument 518 while maintaining the enhanced security features of the present disclosure, in some examples, the identifiers of FIG. 5 may be further enhanced with instrument representations.

In some embodiments, an instrument representation (not depicted by FIG. 5) is a unique identifier for representing a service provider instrument 518 to a user, without exposing the persistent credentials 514 of the service provider instrument 518. The instrument representation, for example, may include a sequence of numeric, alpha-numeric, any/or any other characters or symbols that are outwardly representative of a service provider instrument 518 only to entities with previous knowledge of service provider instrument 518. The format and/or value of an instrument representation may be based at least in part on the type of service provider and/or service provider instrument 518. For instance, in a financial value system, an instrument representation may include a portion (e.g., the last four digits, etc.) of the persistent credentials 514, such as a card number (e.g., debit card, credit card, etc.), a financial account number, and/or the like.

As another example, in an information value system, an instrument representation may include a portion (e.g., one or more digits, alpha-numeric characters, etc.) of persistent credentials 514, such as a subscription account, and/or the like. For instance, the instrument representation may include a derivative of persistent credentials 514 that may only allow entities with prior knowledge of the persistent credentials 514 to identify the persistent credentials 514 using the instrument representation. As another example, the instrument representation may include an instrument nickname that is assigned by and thereafter recognized by a user.

In some embodiments, the instrument representation may be provided (e.g., during a registration process) the exchange platform 102 in place of the persistent credentials 514. In this manner, the exchange platform 102 may represent the service provider instrument 518 using the instrument representation without knowledge of the persistent credentials 514 from which the instrument representation may be derived. For example, unlike traditional network-based exchange platforms, the exchange platform 102 may not require the persistent credentials 514 corresponding to a service provider instrument 518 to implement various computing tasks of the present disclosure. This, in turn, allows the exchange platform 102 to operate more flexibly, while storing previously unrecorded contextual data, lowering operational computing costs, and improving user and platform safeguards from infiltration attacks by malicious computing entities.

In some embodiments, the identifier mapping scheme is supplemented by unique ephemeral keys that are issued to member platforms to facilitate secure, real time value exchanges. For example, the exchange platform 102 may facilitate additional layers of network and data security by implementing exchange identifiers 510 for representing aspects of a value-based exchange. Some examples of exchange identifiers 510 may include a service provider-specific exchange identifier and/or the partner-specific exchange identifier. A service provider-specific exchange identifier may include an ephemeral, unique exchange identifier that temporarily represents the service provider instrument 518 and the service provider platform 440. The service provider-specific exchange identifier, for example, may be mapped to the system identifiers 512 for the service provider instrument 518. A partner-specific exchange identifier may include an ephemeral, unique exchange identifier that temporarily represents the service provider instrument 518 and a partner platform. The partner-specific exchange identifier, for example, may be mapped to the keys 516 for the service provider instrument 518 which may be used to identify the service provider platform 440. In some examples, such mapping may be defined by exchange data objects.

In some embodiments, an exchange data object is a data entity that represents an authorized value exchange between one or more members associated with the exchange platform 102. In some examples, the exchange data object may include one or more identifiers and/or one or more exchange attributes. For example, the one or more identifiers and/or one or more exchange attributes may be based at least in part on a type of exchange data object. By way of example, an exchange may be represented in a member platform as a member exchange data object. In addition, or alternatively, the exchange may be independently represented by a system exchange data object in the exchange platform 102. In some examples, the member exchange data object and the system exchange data object may include one or more of the same one or more identifiers and/or exchange attributes. By way of example, using some of the techniques of the present disclosure, the exchange platform 102 may issue one or more unique identifiers to a member platform that may be used to authorize a value exchange.

In some embodiments, the system exchange data object is an internal representation of a value exchange that is intermediated using the exchange platform 102. In some examples, the system exchange data object may include one or more different identifiers and/or exchange attributes depending on the role of the system exchange data object in a value-based exchange.

For example, a system exchange data object may include a service provider-specific exchange data object that corresponds to the service provider platform 440. The service provider-specific exchange data object may include one or more identifiers, such as an exchange identifier 510, system identifiers 512, such as the system user identifier and/or the system instrument identifier, a UUEK 524, and/or the like. In addition, or alternatively, the service provider-specific exchange data object may include one or more exchange attributes, such as an expiration date, a currency (e.g., for a financial value system, etc.), and/or the like.

In addition, or alternatively, the system exchange data object may include a partner-specific exchange data object that corresponds to a partner platform. The partner-specific exchange data object may include one or more identifiers, such as an exchange identifier 510, one or more keys 516, such as an instrument key, a UUEK 524, a member instrument reference (e.g., a partner-specific instrument reference, etc.), and/or the like. In addition, or alternatively, the partner-specific exchange data object may include one or more exchange attributes, such as an expiration date, a currency (e.g., for a financial value system, etc.), an instrument type, and/or the like.

In some embodiments, a member exchange data object is an external representation of a value exchange that is intermediated using the exchange platform 102. The member exchange data object may include one or more identifiers, such as a member exchange identifier, a member instrument identifier 508, a UUEK 524 from the exchange platform 102, and/or the like.

In some embodiments, an exchange identifier 510 is a unique identifier for an exchange of value using the exchange platform 102. The exchange identifier 510 may include a sequence of numeric, alpha-numeric, any/or any other characters or symbols that are representative of at least a user and/or a service provider instrument 518. In some examples, the exchange identifier 510 may include a universally unique identifier (UUID) that may be mapped (e.g., through a series of identifiers, etc.) to a user, a service provider instrument 518, and/or a member registered with the exchange platform 102. In some examples, the exchange identifier 510 may be generated using one or more UUID generators. For instance, the exchange identifier 510 may include sixteen bytes of information generated in accordance with one or more UUID formatting standards, such as UUID v4, and/or the like. Therefore, while the exchange identifier 510 may be leveraged by the exchange platform 102 and/or a member platform for one or more functions, the same exchange identifier 510 will be useless to external parties without a prior association between the exchange identifier 510 and one or more other identifiers. In addition to the prior identifier associations, the exchange identifier 510 may be associated with the exchange platform 102. Thus, even if the exchange identifier 510 is identified by an adverse party, the adverse party would still be required to impersonate the exchange platform 102 in order to use the exchange identifier 510. Moreover, the adverse party would need to update settlement accounts to accounts owned by the adverse party, among a number of other tasks before the exchange identifier 510 may be used adversely. Each of these tasks increase the amount of work necessary to overcome the layers of enhanced security added by the exchange identifier 510. When paired with the ephemeral nature of the exchange identifier 510, these tasks may become prohibitively expensive.

In some examples, the exchange identifier 510 may be externally represented by a UUEK 524. By way of example, to facilitate credential-less exchanges, the exchange platform 102 may issue one or more UUEKs 524 to one or more member platforms. As described herein, the UUEKs 524 may eliminate the reliance on traditional, persistent credentials 514 by identifying aspects of a value exchange through previously mapped data entities.

In some embodiments, a UUEK 524 is an external representation of an exchange identifier 510 that may be issued (e.g., in place of the exchange identifier 510) to an external entity, such as a user, partner platform, and/or service provider platform, and/or the like, to initiate a value-based exchange using the exchange platform 102. To do so, the UUEK 524 may be generated and issued by the exchange platform 102 to the external entity. Each UUEK 524 may include a plurality of values (e.g., up to fifty characters and/or more that may or may not be case sensitive) that represent one or more aspects of a value-based exchange. For example, the plurality of values may be indicative of an exchange identifier 510, a partition (e.g., identifying the recipient of the UUEK 524, etc.), an identifier type, and/or one or more flags. By way of example, a UUEK 524 may include a partner-specific UUEK and/or a service provider-specific UUEK. The partner-specific UUEK may be correlated to a partner-specific exchange data object and may include a partner partition 506, whereas a service provider-specific UUEK may be correlated to a service provider-specific exchange data object and may include a service provider partition 504, as described herein By way of example, a UUEK 524 may be generated in accordance with a key format. The key format may include a plurality of characters including, for example, fifty characters or more that may or may not be case sensitive. A first portion of the characters (e.g., the first six characters) may be reserved as a partition for identifying a recipient of the UUEK 524. The partition, for example, may include a partner partition 506, a service provider partition 504, and/or any other member partition. By way of example, a UUEK 524 may be issued in response to a request from an authorized member, such as an affiliated partner and/or service provider.

In addition, or alternatively, at least one character (e.g., a seventh character) of the key format may identify a format of the UUEK 524. At least another character (e.g., an eighth character) may identify a type of UUEK 524. In some examples, a second portion of the characters may identify an exchange identifier 510 (e.g., a group of twenty-two characters following the eighth character). A third portion of characters may be reserved (e.g., a group of twenty characters following the first portion of characters). An example representation is provided below:

pppppppFiGGGGGGGGGGGGGGGGGGGGGG-
   Grrrrrrrrrrrrrrrrrrrr where p represents partition characters, F represents a format character, i represents an identifier type character, G represents the exchange identifier 510, and r represents reserved characters. The key format allows for 9.8×10 to the 84 unique permutations, which is more than the number of atoms in the known observable universe. This enables the generation and distribution of new UUEKs 524 on-demand without compromising the security of underlying data to which the UUEKs 524 may be mapped, such as identifiers for a user, an instrument, and/or any other potentially sensitive information.

In some embodiments, the exchange platform 102 maintains a plurality of security code tuples 424 for one or more users, member platforms, service provider instruments, and/or the like that are registered with the exchange platform 102. The security code tuple 424 may be a data entity that defines a correlation between a security code, a user, and one or more of a member platform and/or service provider instrument. A security code tuple 424 may include a data object, record, and/or any other data structure (e.g., linked nodes, etc.) that is configured to represent an association between a security code, and a user, and, in some embodiments, either a member platform, a service provider instrument, or both. A security code tuple 424, for example, may include a security code reference, one or more system identifiers 512, such as a user identifier, one or more member identifiers, one or more instrument identifiers, and/or the like, and/or contextual pairing data. The contextual pairing data may include one or more pairing attributes, such as one or more timing attributes. The timing attributes, for example, may be indicative of a configuration time (e.g., indicative of a time at which the security code tuple is set, etc.), an expiration time (e.g., a time at which the security code must be reset, etc.), and/or the like. As described herein, the security code tuple 424 may be leveraged by the exchange platform 102 to identify a security code reference for a user to perform a secure action (e.g., such enabling the use of a UUEK for an exchange, etc.) on the user's behalf based at least in part on a comparison between the security code reference and a security code input provided by the user.

In some embodiments, the security code reference is a data entity that defines a recorded security code. A security code reference may include an internal representation (e.g., for the exchange platform 102, etc.) of a security code for a user.

In some embodiments, the security code is a data entity that defines a sequence of characters for verifying a user in an interaction, such as a physical exchange, a virtual exchange, an enrollment, and/or the like. A security code may include a sequence of one or more distinct characters of a dynamic length (e.g., six characters, eight characters, etc.) that may be previously set by and/or provided to a user. The security code may be later provided by the user to validate the user's presence for an interaction (e.g., by comparing a security code input to a security code reference as described herein). The one or more distinct characters may include any number of alpha-numeric, emoji, kanji, wingdings, and/or the like.

In some embodiments, the security code is a network administered n-character PIN. As described herein, the security code may be managed as a service through a client device to (i) securely retrieve a UUEK, (ii) enroll an instrument with a member platform, and/or (iii) enable or disable the use of a UUEK (and/or any other exchange credential) prior to an exchange request. In this manner, the security code may be deployed against any type of service provider instrument through the retrieval, enrollment, and/or enablement or disablement of a corresponding UUEK. By managing the security code at the network level, members may benefit from faster exchanges since the chance of an authorization decline for invalid PIN is eliminated. For example, a UUEK may be disabled until a security code is received for enabling the UUEK. The exchange platform may prevent a user from initiating an exchange until a UUEK is enabled, thereby ensuring that all exchange authorization requests provided to a service provider are pre-validated in view of a security code. This effectively reduces network traffic between members in an exchange network, thereby decreasing network congestion in traditionally high traffic communication systems.

In some embodiments, a security code corresponds to a user. For instance, a security code may be previously set by and/or provided to a user through interaction with the exchange platform 102. As an example, a security code may be set by a user through interaction with an exchange network widget embedded within a member software application. This allows the security code to be set without directly interacting with or sharing the security code with a respective member platform, such as the service provider platform 440. In some examples, a security code may be instrument- or member-specific. For instance, a respective security code may be configured to retrieve and/or enable a UUEK of a particular member platform and/or a service provider instrument of the particular member platform. In addition, or alternatively, a respective security code may be configured to enroll an account of a member platform with the exchange network. By way of example, the exchange platform 102 may govern the use of security code to implement one or more secure action using a plurality security code tuples that each correlate a security code to a respective user, member platform, and/or service provider instrument.

V. EXAMPLE SYSTEM OPERATIONS

FIG. 6 provides a process flow for facilitating a network administered security code for a user in accordance with one or more embodiments of the present disclosure. The process flow depicts a network process 600 for establishing a network administered security code to for use in the performance of secured interaction between a user and a third party. The process 600 may be leveraged to overcome various limitations of traditional exchange systems that rely on limited PIN mechanisms that inadequately secure networks interactions due to the limited complexity of conventional PINs and, as described herein, the party administering the PIN. The process 600 may be implemented by one or more computing devices, entities, and/or systems described herein. For example, via the various steps/operations of the process 600, the exchange platform may leverage various communication and validation techniques to overcome the various limitations with traditional mechanisms of network exchange by improving the administration of security codes for securing network-based interactions.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/operation 602, establishing a security code session. For example, the exchange platform (e.g., a partner service, service provider, etc. thereof) may establish a security code session. In some examples, the process 602 may begin on a member application, such as a partner application (e.g., a partner website, user application, etc.) and/or a service provider application at which point a member platform may allow a user to manage (e.g., set, reset, remove, etc.) a network administered security code. The member platform may enable the management of the network administered security code by initiating a security code session with the exchange platform.

For example, a user may access the member application through a portal, such as a browser, web application, and/or the like, via a client device, as described herein. The user's browser, web application, mobile application, and/or the like may fetch a platform connect widget from the content delivery network (CDN) and issue a communication session request to the member platform to establish the security code session. In response to the request, the member platform may generate (e.g., using one or more exchange interfaces, etc.) a communication session request for the exchange platform (e.g., a member service thereof). The communication session request may include an API request, provided through the partner interface, to initiate a security code management widget for establishing the security code session for the user.

In some embodiments, the process 600 includes, at step/operation 604, receiving a security code request. For example, the exchange platform (e.g., a partner service, service provider, etc. thereof) may receive the security code request through the established communication session with the member platform. For example, the security code management widget may provide a user prompt for information regarding a network administered security code for the user. The user may respond to the prompts, through the client device, to generate and provide the security code request to the exchange platform. The security code request is generated and provided through the widget, which runs within the member application. In this way, a member application may be used as an interface between the exchange platform and a user without the member platform ever having access to security code information provided by the user.

In some embodiments, a security code request is a data entity that defines a request to set, reset, and/or remove a security code for a user. A security code request may be provided to an exchange platform from a member of the exchange network. The security code request may be indicative of member user reference for the user and, in some examples, a member instrument reference for the user. By way of example, a security code request that only includes a member user reference may default to all service provider instruments associated with a user and may, for example, initiate a security code tuple action (e.g., one or more set, reset, and/or remove operations, etc.) for a security code that applies to all service provider instruments that are maintained by a respective member platform for the user. In addition, or alternatively, a security code request that includes a member user reference and a member instrument reference may initiate a security code tuple action (e.g., one or more set, reset, and/or remove operations, etc.) for a security code that applies to a particular service provider instrument maintained by the respective member platform for the user. In addition to the references, the security code request may include a code action attribute that is indicative of a desired set, reset, and/or remove operation and security code input indicative of a new, modified, or existing n-character PIN to replace, modify, or remove a security code for a user.

In this manner, a security code widget may be configured to interact with the user to set, reset, and/or remove a particular security code which allows a security code to be set, reset, and/or removed without directly interacting with a member platform. This improves network security by provide one access point, the exchange platform, for modifying a plurality of different security codes across multiple different member platforms for a single user.

In some embodiments, the process 600 includes, at step/operation 606, validating a user. For example, the exchange platform (e.g., a partner service, service provider, etc. thereof) may validate the user by comparing a user reference from the security code request with a plurality of pre-registered user identifiers. The user may be validated in the event that the user reference corresponds to a user identifier. If the user is validated, the process 600 may proceed to step/operation 610 to perform a security code tuple action on behalf of the identified user. Otherwise, the process 600 may proceed to step/operation 612 to provide a security code response indicative of a failure to validate the user.

In some embodiments, the process 600 includes, at step/operation 608, optionally validating a service provider instrument. For example, the exchange platform (e.g., a partner service, service provider, etc. thereof) may validate a service provider instrument if the security code request incudes an instrument reference. The instrument may be validated in the event that the instrument reference corresponds to a pre-registered instrument identifier. If the instrument is validated, the process 600 may proceed to step/operation 610 to perform a security code tuple action on behalf of the identified user. Otherwise, the process 600 may proceed to step/operation 612 to provide a security code response indicative of a failure to validate the instrument.

In some embodiments, the process 600 includes, at step/operation 610, performing a security code tuple action. For example, the exchange platform (e.g., a partner service, service provider, etc. thereof) may perform a security code tuple action by setting a new security code for the user, resetting a security code for the user, and/or removing a security code for a user. To do so, the exchange platform may (i) generate a new security code tuple including a user identifier and a new security code for the user, (ii) modify an existing security code tuple that corresponds to the user identifier to update the security code for the user, and/or (iii) remove an existing security code tuple that corresponds to the user.

In some embodiments, the process 600 includes, at step/operation 612, providing a security code response. For example, the exchange platform (e.g., a partner service, service provider, etc. thereof) may provide a security code response indicative of a completion and/or failure of the security code tuple action.

FIGS. 7A-C provide process flows for establishing a secured cross-entity relationship in accordance with one or more embodiments of the present disclosure. The process flows illustrate one or more stages of an enrollment process 700 for enrolling a user and/or a service provider instrument with another member platform to facilitate a credential-less value exchange between a two member platforms. FIGS. 7A-C illustrate an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

Various embodiments of the process 700 address technical challenges related to the data security and efficiency of network-based exchanges in a value exchange between one or more computing entities. Traditional systems address these challenges using enrollment mechanisms that require a user to expose sensitive and persistent credentials to a third-party enrollment service. These traditional enrollment services then validate a user's account ownership and provide the persistent credentials to a partner platform for storage and subsequent processing. By doing so, user credentials are transmitted and exposed to multiple different entities during the course of traditional enrollment processes ultimately increasing the risk of exposure to malicious parties during and after network communications. Various embodiments of the process 700 provide improved network communication, data encryption, and data management techniques for enabling a credential-less exchange enrollment capability that reduces the data security risks imposed by traditional processes.

One or more embodiments of the process 700 may be implemented by one or more computing devices, entities, and/or systems described herein. For example, via the various steps/operations of the process 700, the exchange platform 102 may leverage the credential-less enrollment techniques to overcome the various limitations with traditional enrollment mechanisms by enrolling a service provider instrument with a partner platform without access to persistent credentials of the service provider instrument. By doing so, sensitive information underlying a service provider instrument for engaging in a value exchange is never exposed to potentially malicious parties or a partner platform that may be susceptible to network-based attacks. For instance, unlike traditional techniques the exchange platform 102 never receives identifiable or operable account information for the user, whereas a service provider that manages the account is engaged in the enrollment process rather than being disintermediated by a potentially insecure enrollment service. This, in turn, removes the need to implement resource data governance standards across each device involved in an enrollment process, ultimately resulting in improved computing resource utilization, while enhancing network and data security.

FIG. 7A is a flowchart showing an example of a first stage of an enrollment process 700 for enrolling a user with an exchange platform without exposing persistent credentials associated with the user and/or a service provider instrument. The flowchart depicts communication techniques to overcome various limitations of traditional enrollment systems by circumventing traditional systems' reliance on sensitive and persistent credentials. The communication techniques may be implemented by one or more computing devices, entities, and/or systems described herein, such as the exchange platform, to establish a secure communication session with a user through a partner application.

In some embodiments, the process 700 includes, at step/operation 702, establishing an enrollment session for a user and a partner platform. For example, the enrollment process 700 may begin on a partner application (e.g., a partner website, user application, etc.) at which point the partner platform may allow a user to enroll a partner account on the partner application with the exchange platform to facilitate access to a service provider instrument. The partner platform may enable the enrollment of the user by initiating an enrollment session with the exchange platform.

For example, a user may access the partner application through a portal, such as a browser, web application, and/or the like, via a client device, as described herein. The user's browser, web application, mobile application, and/or the like may fetch a platform connect widget from the content delivery network (CDN) and issue a communication session request to the partner platform to establish the enrollment session. In response to the request, the partner platform may generate (e.g., using one or more exchange interfaces, etc.) a communication session request for the exchange platform (e.g., a partner service thereof). The communication session request may include an API request, provided through the partner interface, to initiate an enrollment widget for establishing an enrollment session for the user.

In some embodiments, the communication session request includes one or more enrollment attributes, such as user data, user identifiers, user hashes, time stamps, device identifiers, partner identifiers, and/or the like. As described herein, some techniques of the present disclosure enable a computing entity to identify a service provider instrument using identifiers without including persistent credentials of the service provider instrument with the communication session request. For instance, the partner platform may be configured to obtain user data for the user (e.g., through user input to a user interface screen, pre-recorded data from a partner account, etc.) and provide the user data to the exchange platform to begin the enrollment process. In some examples, the user data may be provided by the partner platform (e.g., through one or more API calls of the partner interface, etc.) with the communication session request to the exchange platform (e.g., a partner service thereof) to initialize a widget session. In some examples, the user data may be encrypted, hashed, and/or the like before transmission to the exchange platform. In some examples, the user data may include one or more user attributes as described herein.

In some embodiments, the exchange platform (e.g., a partner service thereof) receives, using the partner interface, the communication session request to initialize the enrollment session at the client device of the user. In some examples, the communication session request may include user data for the user. In addition, or alternatively, the enrollment initialization request may include one or more user attributes for the user. In some examples, the user attributes may be encrypted and/or hashed as described herein.

In some embodiments, the process 700 includes, at step/operation 704, setting user and partner data. For example, the exchange platform (e.g., the connect service, partner service, etc. thereof) may identify and/or generate user and/or partner data from the data provided in the communication session request. In some examples, the user data may include one or more user attributes. In some examples, the user data may include one or more encrypted and/or hashed user attributes. In some examples, the partner data may include a shared identifier between the exchange platform and the partner platform, such as a partner partition as described herein.

In some embodiments, the process 700 includes, at step/operation 706, generating a session identifier for the enrollment session. For example, the exchange platform (e.g., a connect service, partner service, etc. thereof) may generate a session identifier for a communication session between a partner platform and the exchange platform to track communications exchanged during the enrollment session. The session identifier, for example, may include a unique number, string of characters, and/or the like for authenticating messages exchanged during the course of an enrollment session. The exchange platform may utilize a connect service and/or the partner service to establish the enrollment session. For example, in response to the enrollment initialization request, a partner service may call another service, such as the connect service, to establish a communication session that may be used by a client-side widget to provide an interface between a user and the partner service to complete a user enrollment. The connect service may generate the session identifier and return the session identifier to the partner service. The partner service may return the session identifier to the partner platform, which may utilize the session identifier to initialize a client-side widget through an instance of the partner application on a client device. Once the partner application receives the session identifier, the partner application may start up (e.g., execute, initialize, etc.) the client-side widget. The user may then interact with the widget to complete the enrollment process 700.

In some embodiments, the process 700 includes, at step/operation 708, determining and providing a member list for the user. The member list may be a service provider list. For example, the exchange platform (e.g., the connect service, partner service, etc. thereof) may determine the service provider list for the user from a network of service providers that are affiliated with (e.g., registered with, etc.) the exchange platform. In some examples, the service provider list may include each service provider platform affiliated with the exchange platform. In addition, or alternatively, the service provider list may include a subset of the affiliated service provider platforms that is tailored to the user.

For example, the exchange platform may determine one or more service provider platforms based at least in part on the user attributes for the enrollment session and tailor the service provider list to the one or more service provider platforms. By way of example, the exchange platform may include a plurality of system user data objects and/or system instrument data objects, as described herein. In some examples, the exchange platform may identify one or more system user data objects corresponding to the user based on the user attributes. In some examples, each system user data object may identify a service provider platform affiliated with the user. In this manner, the exchange platform may determine one or more service providers affiliated with the user based on the one or more system user data objects.

In addition, or alternatively, the exchange platform (e.g., one or more service provider services thereof) may provide a presence request for user presence data (e.g., via a service provider interface) from each of the service provider platforms in the network of member platforms. The user presence request may include one or more user attributes (e.g., encrypted attributes, hashed attributes, etc.) for the user that may be leveraged by the service provider platforms to determine whether a user has an instrument with the service provider platforms. In response to the request, the exchange platform (e.g., one or more service provider services thereof) may receive presence data from one or more of the service provider platforms that is indicative of the presence of an instrument with the respective service provider platforms. The exchange platform (e.g., partner service thereof) may determine the one or more service providers based at least in part on the presence data.

In some examples, the exchange platform (e.g., the connect service, partner service, etc. thereof) may initiate, using the partner interface and via an enrollment user interface provided by a partner application, the presentation of a pre-enrollment screen based at least in part on the one or more service providers. The client device, for example, may be configured to access a partner application that is hosted by the partner platform. The enrollment user interface may be presented to the user on the client device through a widget within the partner application. The widget can be internally defined by the partner or can be provided by the exchange platform. The pre-enrollment screen may present a plurality of selectable icons indicative of the service provider list.

Next, the enrollment process 700 may proceed to a second stage, in which an instrument identifier corresponding to the user is identified through interactions between the exchange platform, the user, and the service provider platform, as described in further detail with reference to FIG. 7B.

Referring now to FIG. 7B, FIG. 7B is a flowchart showing an example of a second stage of an enrollment process 700 for enrolling a service provider instrument with a partner platform without exposing persistent credentials associated with the user and/or a service provider instrument. The flowchart depicts communication techniques to overcome various limitations of traditional enrollment systems by circumventing traditional systems' reliance on persistent credentials, such as a card number, and/or the like, provided by a user. The communication techniques may be implemented by one or more computing devices, entities, and/or systems described herein, such as the exchange platform to establish a connection between a user, a partner platform, and a service provider instrument.

In some embodiments, the process 700 includes, at step/operation 710, determining and providing a service provider instrument list for a user. The service provider instrument list may be determined based at least in part on a selection of a service provider from the pre-enrollment screen. For instance, in some examples, the exchange platform (e.g., the connect service, partner service, etc. thereof) may receive, using the partner interface, pre-selection data indicative of a selection of a particular service provider from the one or more service providers presented by the pre-enrollment screen. For instance, the widget may receive the pre-selection data from the partner application and provide an instrument registration request (e.g., via the partner interface) to the exchange platform (e.g., the connect service, partner service, etc. thereof). The instrument registration request may include the session identifier and/or a service provider identifier indicative of a selected service provider.

Responsive to the request, the exchange platform (e.g., connect service, partner service, etc. thereof) may receive service provider-instrument data based at least in part on the pre-selection data. The service provider-instrument data may be indicative of the one or more service provider instruments for the user that are facilitated by the selected service provider platform. For example, the service provider-instrument data may include one or more system instrument identifiers and/or corresponding instrument representations from one or more instrument data objects that correspond to the service provider and the user. Each of the instrument data objects, for example, may include a system user identifier that corresponds to the user.

In addition, or alternatively, the exchange platform (e.g., one or more service provider services thereof) may provide an instrument request for the service provider-instrument data (e.g., via a service provider interface) from the selected service provider platform. The instrument request, for example, may include a user reference that corresponds to a member user identifier of the service provider platform. In response to the request, the service provider platform may identify one or more member instrument data objects that include the member user identifier, identify one or more instrument references corresponding to the one or more member instrument data objects, and provide service provider-instrument data to the exchange platform that is indicative of the one or more instrument references and/or one or more corresponding instrument representations.

The exchange platform (e.g., connect service, partner service, etc. thereof) may initiate, using the partner interface and via the enrollment user interface, the presentation of an instrument enrollment screen via the client device of the user based at least in part on the service provider-instrument data. The instrument enrollment screen may be internally defined by the partner and/or be provided by the exchange platform. The instrument enrollment screen, for example, may be indicative of one or more service provider instruments associated with the user and the selected service provider. By way of example, the instrument enrollment screen may be indicative of a respective instrument representation for each of the one or more service provider instruments. In some examples, for instance when the user is only affiliated with a single service provider instrument, the instrument enrollment screen may include a confirmation prompt to confirm the user's intention to enroll the service provider instrument.

In some embodiments, the process 700 includes, at step/operation 712, receiving a secured interaction request. For example, the exchange platform may receive, using a member interface, the secured interaction request from the member platform. In some embodiments, a secured interaction request is a data entity that defines a request to perform a secure interaction using a security code input. A secured interaction request may be provided to an exchange platform from a member of the exchange network. The secured interaction request may be indicative of (i) a user, member platform, and/or service provider instrument and (ii) a security code input for the user. In some examples, the secured interaction request may be indicative of a service provided instrument selected by the user from the service provider instrument list.

In some example, the secured interaction request may be indicative of one or more contextual security attributes. The one or more contextual security attributes may include one or more timing attributes. The one or more timing attributes, for example, may be indicative of a provisioning time (e.g., indicative of a time at which the secured interaction request is sent, etc.), a requesting time (e.g., a requested time for performing a secure interaction, etc.), and/or the like.

The secured interaction request may be received from a member platform. For example, a user may initiate the secured interaction request through a member application hosted by a member platform on behalf of a member of the exchange network. In some examples, a secured interaction request may be generated and/or provided in response to selection input indicative of a service provider instrument, a UUEK for the service provider instrument, and/or the like. As one example, a user may select an instrument representation, a UUEK representation, and/or the like (e.g., through a partner application associated with a partner platform, a service provider application associated with a service provider platform, etc.) for enrolling the service provider instrument, authorizing a value-based exchange, and/or the like. In some examples, a secured interaction request may be automatically initiated in the event that the user and/or the selected instrument, UUEK, and/or the like is associated with a security code. For example, in response to the selection, a member platform (e.g., through a respective member application) may prompt the user for a security code input. The user may enter the security code input to provide the secured interaction request.

In some examples, the exchange platform may receive, using the partner interface, the secured interaction request from the client-side widget. The request may include selection data and/or the security code input. The selection data may be indicative of a selection of a service provider instrument from the enrollment user interface. For example, the selection data may be indicative of an instrument representation (e.g., an account nickname, etc.) for a selected service provider instrument. In some examples, the selection data may include at least one of an instrument type, a currency type (e.g., in a financial value system), and/or an instrument identifier (e.g., instrument representation, etc.) corresponding to the selection.

In some embodiments, the process 700 includes, at step/operation 714, verifying the security code input of the secured interaction request. In some examples, the exchange platform (e.g., the connect service, partner service, etc. thereof) may compare the security code input to a security code tuple corresponding to the secured interaction request to verify the presence of the user. The exchange platform may generate a validation event indicative of the verification and/or nonverification of the security code input. In the event of the verification, the process 700 may proceed to step/operation 718, where the exchange platform provides a valid secured interaction response. In the event of a nonverification, the exchange platform may proceed to step/operation 716, wherein the exchange platform provides an invalid secured interaction response and then return to step/operation 712 to receive another secured interaction request.

In some embodiments, a validation event is a data entity that defines a validation of a security code input for a user. The validation event may include a secured event that may be indicative of a validation between a security code input and a security code reference. In addition, or alternatively, the validation event may include an unsecured event that may be indicative of a failed validation between a security code input and a security code reference. For example, the secured event may be indicative of a determination that a security code input matches a corresponding security code reference. In some examples, the unsecured event may be indicative of a determination that a security code input does not match a corresponding security code reference. In some examples, the exchange platform may generate a secured event in response to a determination that the security code input matches a corresponding security code reference. In addition, or alternatively, the exchange platform may generate an unsecured event in response to a determination that the security code input does not match a corresponding security code reference. In some examples, a secured event may be associated with a secured time period and the exchange platform may generate an unsecured event in response to a determination that the secured time period has expired.

In some embodiments, the validation event is stored in association with a secured data entity, such as a UUEK, service provider instrument, and/or user. For instance, the validation event may be stored in an exchange data object corresponding to the UUEK, a system instrument data object corresponding to a service provider instrument, a system user data object corresponding to a user, and/or the like. In addition, or alternatively, the validation event may be stored in association with a security code tuple. For instance, a secured event may be stored in response to validating a user, whereas an unsecured event may be stored in response to invalidating a user.

In some embodiments, the validation event includes contextual validation data. The contextual validation data, for example, may be indicative of a timing of a validation. The timing of the validation may include a timestamp corresponding to the transmission, reception, creation, and/or adjudication of a validation request. For example, the contextual validation data may include a validation timestamp indicative of a time at which the exchange platform determines that the security code input and security code reference either match or do not match. In some examples, the contextual validation data may be indicative of a secured time period. The secured time period may be indicative of a subsequent timestamp, a time duration, and/or the like in which a UUEK, a service provider instrument, and/or the like may be secured in response to a secured event.

In some embodiments, the process 700 includes, at step/operation 718, providing a valid secured interaction response to the partner platform. For example, the exchange platform may provide the valid secured interaction response to the partner platform. A secured interaction response may define a response to a secured interaction request. In some embodiments, a secured interaction response is provided from an exchange platform to the member that provided the secured interaction request. The secured interaction response may be indicative of the validation event. The valid secured interaction response may be indicative of a successful validation event.

In some embodiments, the process 700 includes, at step/operation 720, providing an enrollment request to the service provider platform corresponding to the service provider instrument in response to a network level validation of the user. For example, the exchange platform (e.g., a service provider service, etc. thereof) may provide, using the service provider interface, an enrollment request to a service provider platform corresponding to a selected service provider instrument. The enrollment request may include service provider enrollment data indicative of one or more user identifiers for the user and/or one or more instrument identifiers for the service provider instrument. In response to the enrollment request, the service provider platform may verify the service provider instrument using the one or more identifiers.

The service provider enrollment data, for example, may include one or more identifiers for referencing the service provider instrument without using the persistent credentials for the service provider instrument (e.g., card number, account number, etc.) in communications between the exchange platform, the service provider platform, and/or the partner platform. The one or more identifiers, for example, may include various combinations of user identifiers and/or instrument identifiers to validate a user and/or instrument through one or more redundancy checks. For example, the user identifiers for the user may include a user reference for the service provider platform and/or a user key from the exchange platform that corresponds to the user reference. As another example, the instrument identifiers for the service provider instrument may include an instrument reference for the service provider platform and/or an instrument key from the exchange platform that corresponds to the instrument reference.

The service provider enrollment data may include any combination of references, keys, and/or identifiers described herein. In one example, the service provider enrollment data may include one of the instrument reference, instrument key, user reference, and/or user key. In addition, or alternatively, the service provider enrollment data may include a combination of the corresponding instrument reference, instrument key, user reference, and user key for built in redundancies. In some examples, a combination of identifiers may be specified by an interface call. The combination may be service provider specific and/or be dynamically changed according to a communication scheme. In this way, the specific combination of identifiers provided in an enrollment request may be leveraged as an additional verification check to ensure that the enrollment request is received from an affiliated platform, such as the exchange platform.

The service provider may compare the identifiers from the enrollment request to one or more member data objects (e.g., a member instrument data object, a member user data object, etc.) to identify a service provider instrument corresponding to the enrollment request without exposing the persistent credentials of the service provider instrument.

Referring now to FIG. 7C, FIG. 7C is a flowchart showing an example of a third stage of an enrollment process 700 for issuing an UUEK for facilitating a credential-less exchange of value. The flowchart depicts communication techniques to overcome various limitations of traditional enrollment systems by circumventing traditional systems' reliance on instrument references, such as a card number, and/or the like, provided by a user. The communication techniques may be implemented by one or more computing devices, entities, and/or systems described herein, such as the exchange platform to establish a user-instrument record for enrolling a user with the exchange platform.

In some embodiments, the process 700 includes, at step/operation 722, receiving an enrollment response from the service provider platform. For example, the exchange platform may receive the enrollment response indicative of a successful or failed enrollment.

In some embodiments, the process 700 includes, at step/operation 724, determining whether the service provider instrument is successfully enrolled. In the event that the service provider instrument is successfully enrolled, the process 700 may proceed to step/operation 728. Otherwise, the process may process to step/operation 726, where the exchange platform provides a failure response.

In some embodiments, the process 700 includes, at step/operation 728, generating an UUEK in response to a successful enrollment. For example, the exchange platform may generate an UUEK in response to a validation of the user and/or instrument by the exchange network (e.g., using the security code) and/or the service provider platform. By way of example, the exchange platform may generate an UUEK that corresponds to the user, the service provider instrument, and the partner platform. The exchange platform may store the UUEK in a partner-specific exchange data object that associates the UUEK with an exchange identifier, an instrument key, and the partner-specific instrument reference, as described herein.

In some embodiments, the process 700 includes, at step/operation 730, providing the UUEK to the partner platform. For example, the exchange platform may provide, using the partner interface, data indicative of the UUEK to the partner platform. In some examples, the partner platform may provide the UUEK and/or a representation thereof to the user (e.g., for storage in virtual wallet, etc.). By way of example, the UUEK may be represented in one or more different forms, such as a machine readable optical image (e.g., barcode, quick response code, etc.), a keyword, a virtual widget, and/or the like.

FIGS. 8A-B provides a process flow for facilitating a secured credential-less interaction in accordance with one or more embodiments of the present disclosure. The process flow depicts a network process 800 for establishing a network administered UUEK to securely verify a user's presence for an exchange of value. The process 800 may be leveraged to overcome various limitations of traditional exchange systems that expose sensitive and persistent credentials to multiple third parties and rely on limited PIN mechanisms that inadequately secure value-based exchanges, as described herein. The process 800 may be implemented by one or more computing devices, entities, and/or systems described herein. For example, via the various steps/operations of the process 800, the exchange platform may leverage various communication and validation techniques to overcome the various limitations with traditional mechanisms of exchange by improving the administration of security codes for securing network-based exchanges.

FIGS. 8A-B illustrate an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some examples, the process 800 begins after a registration and/or security code process, such as process 600, in which a user may manage a network administered security code for facilitating a secured credential-less interaction. For example, as described herein, one or more registration processes may be previously performed between one or more member platforms and/or the exchange platform to register a plurality of service provider instruments with the exchange platform. Thereafter, the exchange platform may generate and issue UUEKs to registered service provider platforms for initiating a value-based exchange using a registered service provider instrument without referencing persistent credentials for the service provider instruments. In addition, or alternatively, an enrollment process may be performed to enroll a registered service provider instrument maintained by a service provider platform with a partner platform. In some examples, the exchange platform may facilitate the enrollment process and, in response to a successful enrollment, generate and issue a UUEK to the partner platform for initiating a future value-based exchange. In some examples, once registered, a user may establish a network administered security code with the exchange platform to facilitate the dispensation of UUEK and/or enable a previously issued UUEK.

In this way, using some of the communication techniques of the present disclosure, a member platform may augment the security of a UUEK by establishing one or more security codes for a user. For instance, by replacing the persistent credentials of a service provider instrument with a UUEK, the communication techniques of the present disclosure may manage access to the service provider instrument by issuing a new UUEK and/or enabling or disabling a previously issued UUEK to enforce criteria on behalf of a member. In some examples, this includes mandating the use of a security code to verify the presence of a user for a secured interaction. For example, using some of the techniques of the present disclosure, the exchange platform may act as an adjudication engine to verify the presence of a user before issuing a UUEK and/or to validate a previously issued UUEK on behalf of a member platform. In accordance with the steps/operations of the process 800, the exchange platform may enforce security codes for a user, service provider instrument, and/or UUEK thereof that may be leveraged to enforce member policies on behalf of member platforms without continuous involvement from the member platforms. In this way, network administered security codes may be established that expand upon the security provided by UUEKs in a credential-less exchange.

With reference to FIG. 8A, in some embodiments, the process 800 includes, at step/operation 802, receiving a secure interaction request. For example, the exchange platform (e.g., a partner service, service provider, etc. thereof) may receive the security interaction request from a member platform. As described herein, the secure interaction request may include a security code input, a user identifier, and/or an instrument identifier.

In some embodiments, the process 800 includes, at step/operation 804, identifying a security code tuple. For example, the exchange platform (e.g., a validation service, etc. thereof) may identify a security code tuple that corresponds to the user identifier and/or instrument identifier.

In some embodiments, the process 800 includes, at step/operation 806, determining whether a security code input is valid. For example, the exchange platform (e.g., a validation service, etc. thereof) may validate the security code input based at least in part on a comparison between the security code input and a corresponding security code reference. By way of example, the user identifier and/or instrument identifier may be associated with a security code tuple that includes the security code reference and a corresponding user and/or instrument identifier. The security code tuple, for example, may be previously generated in response to a security code request from a member platform, as described herein with reference to FIGS. 6A-C.

In some embodiments, the security code reference includes an n-character sequence of one or more distinct characters. The one or more distinct characters may include one or more alphanumeric characters, and/or any other character. The security code input may include a second n-character sequence of one or more distinct characters. The security code input may be validated in the event that it matches (e.g., strictly matches, partially matches, etc.) the sequence of characters of the security code reference.

In the event that the security code input is valid, the process 800 may proceed to step/operation 808, where a secured event is recorded. In the event that the security code input is invalid (e.g., one or more characters do not match the security code reference, etc.), the process 800 may proceed to step/operation 810, where an unsecured event is recorded.

In some embodiments, the process 800 includes, at step/operation 812, storing a validation event. For example, the exchange platform (e.g., a validation service thereof) may store data indicative of the validation event with reference to the user, the instrument, and/or the security code tuple for the user and/or service provider instrument.

In some embodiments, a validation event is a data entity that defines a validation of a security code input for a user. A validation event may include a secured event that may be indicative of a validation between a security code input and a security code reference. In addition, or alternatively, the validation event may include an unsecured event that may be indicative of a failed validation between a security code input and a security code reference. For example, the secured event may be indicative of a determination that a security code input matches a corresponding security code reference. In some examples, the unsecured event may be indicative of a determination that a security code input does not match a corresponding security code reference. In some examples, the exchange platform may generate a secured event in response to a determination that the security code input matches a corresponding security code reference. In addition, or alternatively, the exchange platform may generate an unsecured event in response to a determination that the security code input does not match a corresponding security code reference. In some examples, a secured event may be associated with a secured time period and the exchange platform may generate an unsecured event in response to a determination that the secured time period has expired.

In some embodiments, the validation event is stored in association with a secured data entity, such as a UUEK, service provider instrument, and/or user. For instance, the validation event may be stored in an exchange data object corresponding to the UUEK, a system instrument data object corresponding to a service provider instrument, a system user data object corresponding to a user, and/or the like. In addition, or alternatively, the validation event may be stored in association with a security code tuple. For instance, a secured event may be stored in response to validating a user, whereas an unsecured event may be stored in response to invalidating a user.

In some embodiments, the validation event includes contextual validation data. The contextual validation data, for example, may be indicative of a timing of a validation. The timing of the validation may include a timestamp corresponding to the transmission, reception, creation, and/or adjudication of a validation request. For example, the contextual validation data may include a validation timestamp indicative of a time at which the exchange platform determines that the security code input and security code reference either match or do not match. In some examples, the contextual validation data may be indicative of a secured time period. The secured time period may be indicative of a subsequent timestamp, a time duration, and/or the like in which a UUEK, a service provider instrument, and/or the like may be secured in response to a secured event.

In some embodiments, in the event that the security code is valid, the process 800 includes, at step/operation 808, storing a secured event. For example, the exchange platform may store a secured event for the user in response to validating the UUEK. In some examples, the exchange platform may generate the secured event in response to a determination that the security code input matches a corresponding security code reference. For instance, the secured event may be stored in response to validating the security code input.

In some embodiments, in the event that the security code is invalid, the process 800 includes, at step/operation 810, storing an unsecured event. For example, the exchange platform may store an unsecured event for the user in response to invalidating the user. In some examples, the exchange platform may generate an unsecured event in response to a determination that the security code input does not match a corresponding security code reference. For example, the unsecured event may be stored in response to invalidating the user. In some examples, a secured event may be associated with a secured time period and the exchange platform may generate an unsecured event in response to a determination that the secured time period has expired.

In some embodiments, the process 800 includes, at step/operation 814, providing a secured interaction response. For example, the exchange platform (e.g., a service provider service, etc. thereof) may provide the secured interaction response indicative of a validation event to a member platform (and/or client device) associated with the secured interaction request. In some embodiments, the secured interaction response defines a response to a secured interaction request. In some embodiments, a secured interaction response is provided from an exchange platform to the member that provided the secured interaction request. The secured interaction response may be indicative of the validation event. In some examples, the secured interaction response may include a UUEK for the user and/or service provider instrument.

In some examples, the security code input may correspond to a previously established UUEK for a user. For example, as described herein, one or more registration processes may be previously performed between one or more service provider platforms and the exchange platform to register a plurality of service provider instruments with the exchange platform. Thereafter, the exchange platform may generate and issue UUEKs to registered service provider platforms for initiating a value-based exchange using a registered service provider instrument without referencing persistent credentials for the service provider instruments. In addition, or alternatively, an enrollment process may be performed to enroll a registered service provider instrument maintained by a service provider platform with a partner platform. In some examples, the exchange platform may facilitate a security code registration process for an issued UUEK to generate a security code tuple. In the event that a security code tuple is generated for a UUEK, the exchange platform may perform one or more steps/operations of the process 800 to enable and/or disable a UUEK on behalf of a member platform. In this way, network administered security codes may be provided that proactively prevent the use of UUEKs for invalid exchanges.

In some embodiments, the interaction request may include an enabling request for enabling a previously issued UUEK for a user. In such a case, secured interaction request may be indicative of a UUEK and a security code input for the UUEK and/or one or more contextual security attributes, such as a provisioning time (e.g., indicative of a time at which the secured interaction request is sent, etc.), a requesting time (e.g., a requested time to enable the use of a UUEK, etc.), and/or the like.

In some examples, an secured interaction request may be generated and/or provided in response to selection input indicative of a disabled UUEK. For example, a user may select a UUEK (e.g., through a partner application associated with a partner platform, a service provider application associated with a service provider platform, etc.) for authorizing a value-based exchange. In some examples, an secured interaction request may be automatically initiated in the event that the selected UUEK is a disabled UUEK. For example, in response to the selection, a member platform (e.g., through a respective member application) may prompt the user for a security code input. The user may enter the security code input to provide the secured interaction request.

In some embodiments, a UUEK representation is a viewable representation of a UUEK. A UUEK representation may include a digital representation of a UUEK that is viewable by a user. A UUEK representation, for example, may be represented in one or more different forms, such as a machine readable optical image (e.g., barcode, quick response code, etc.), a keyword, a virtual widget, and/or the like. In some examples, a UUEK representation may include a scannable representation (e.g., a barcode, QR code, non-fungible token, near-field communication sequence, etc.) of a UUEK. The scannable representation may be saved to a member account of a member platform to enable a user to execute a value-based exchange using a service provider instrument without referencing persistent credentials of the service provider instrument. The UUEK representation, for example, may be scanned by a barcode scanner, and/or the like to read the UUEK and initiate a value-based exchange with the UUEK.

In some embodiments, a disabled UUEK representation is a UUEK representation for a disabled UUEK. A disabled UUEK representation may include a status indicator and/or one or more other indicators that represent a disabled status for a UUEK. In some examples, a disabled UUEK representation may include an unreadable UUEK representation. The unreadable UUEK representation, for example, may include a grayed out, obstructed, partially covered, and/or the like, scannable representation that prevents the scannable representation from being read.

In some examples, the secure interaction response may initiate the enablement of a UUEK. An enabled UUEK, for example, may be associated with an enabled UUEK representation. An enabled UUEK representation may include a status indicator and/or one or more other indicators that represent an enabled status for a UUEK. In some examples, an enabled UUEK representation may include a readable UUEK representation.

Turning to FIG. 8B, in response to a secured event, the process 800 includes, at step/operation 816, receiving an exchange request with an UUEK (e.g., issued through a secured interaction, etc.). For example, the exchange platform may receive an exchange request for executing a value-based exchange. The exchange request may be indicative of the UUEK and/or one or more exchange attributes. In some examples, the exchange request may be contingent on a previous secured interaction. For instance, the UUEK may be issued through the secured interaction and/or enabled through the secured interaction. In this manner, requests may be filtered before they are transmitted to the exchange platform and again, by the exchange platform, before they are transmitted to another member platform. In this way, exchange request may be minimized to prevalidated exchanges, which may reduce network congestion between multiple parties in a high traffic exchange network.

The exchange attributes may be indicative of one or more characteristics of the requested exchange. For example, the one or more exchange attributes may include at least one exchange attribute that is indicative of an exchange value, such as a monetary value, rewards value, and/or the like.

In some embodiments, the process 800 includes, at step/operation 818, identifying an exchange data object indicative of an exchange identifier. For example, the exchange platform (e.g., a partner service, service provider service, etc. thereof) may identify the exchange identifier for the UUEK using some of the techniques described herein. As described herein, the exchange identifier may be associated with an exchange data object corresponding to the UUEK. The exchange data object (and/or one or more identifiers) thereof may be associated with a security code tuple and/or one or more validation events for the UUEK.

In some embodiments, the process 800 includes, at step/operation 820, determining whether validation is required for the exchange request. For example, the exchange platform (e.g., validation service, etc. thereof) may determine whether the validation is required for the exchange request. The exchange platform may determine whether the validation is required based at least in part on a member policy and/or one or more exchange attributes for the exchange request. By way of example, a member platform may be associated with a member policy that defines one or more validation requirements for a service provider instrument. In some examples, the exchange request may be indicative of one or more exchange attributes. The one or more validation requirements may correspond to the one or more exchange attributes. The exchange platform (e.g., validation service, etc. thereof) may compare the one or more exchange attributes to the one or more validation requirements to determine whether a validation is required for the UUEK of the exchange request.

As one example, the one or more exchange attributes may be indicative of an exchange value and the one or more validation requirements may define an exchange value threshold in which a respective secured event is required for the service provider instrument. In such a case, a validation may be required for the exchange request in the event that the exchange value of the exchange request satisfies the exchange value threshold.

As other examples, the one or more validation requirements may define one or more objects (e.g., object identifiers, object attributes, etc.) in which a respective secured event is required for the service provider instrument. In such a case, a validation may be required for the exchange request in the event that the exchange request includes one or more exchange attributes that identify at least one of the one or more objects.

In some embodiments, the process 800 includes, at step/operation 822, determining whether the UUEK is enabled. For example, the exchange platform (e.g., a partner service, service provider service, etc. thereof) may determine that the UUEK is enabled (or disabled) based at least in part on a member policy, the exchange request, and/or one or more validation events (e.g., secured event, unsecured event, etc.) associated with the UUEK. By way of example, the exchange platform may determine whether the UUEK is enabled based at least in part on the presence of a secured event, an unsecured event, and/or one or more timing attributes thereof.

In some embodiments, the exchange platform determines that the UUEK is enabled based at least in part on a latest time attribute for a plurality of validation events. For example, the UUEK may be enabled in the event that a secured event postdates any unsecured event. In addition, or alternatively, the exchange platform determines that the UUEK is enabled based at least in part on a comparison between a secured time period and a time (e.g., reception time, response time, processing time, etc.) for the exchange request. For example, the UUEK may be enabled in the event that a time, such as a reception time of the exchange request, is within an enabled time period.

In some embodiments, the process 800 includes, at step/operation 824, providing an exchange authorization request. For example, the exchange platform (e.g., a service provider service, etc. thereof) may provide the exchange authorization request to the member platform. In some examples, the exchange authorization request may be provided, using a service provider interface, to the service provider platform The exchange authorization request may be indicative of the instrument identifier and/or the secured event. In some examples, the exchange authorization request may be indicative of the enabled time period for the secured event and/or a reception time of the exchange request.

For example, the exchange platform (e.g., a service provider service thereof) may request the exchange approval from a service provider platform of a service provider instrument correlated to the UUEK. In some examples, the exchange platform (e.g., a partner service thereof) may identify the member platform based at least in part on the UUEK (e.g., the entity partition thereof). In addition, or alternatively, the exchange platform (e.g., a service provider service thereof) may identify the service provider instrument based at least in part on the UUEK (e.g., the exchange identifier).

The exchange platform (e.g., a service provider service thereof) may provide, using the service provider interface, an exchange authorization request to the member platform. The exchange authorization request may be indicative of at least one of the one or more request attributes, an instrument identifier for the service provider instrument, and/or a secured event. By way of example, the exchange platform may generate the exchange authorization request based at least in part on a system instrument data object identified from one or more aspects of the UUEK. The exchange authorization request may include an instrument key and/or an instrument reference from the system instrument data object.

In some examples, the exchange authorization request may be indicative of a user identifier associated with the service provider instrument. By way of example, the exchange platform may generate the exchange authorization request based at least in part on a system user data object identified from one or more aspects of the UUEK. In some examples, the system user data object may be identified based at least in part on a user identifier (e.g., system user identifier) of the exchange data object. In addition, or alternatively, the system user data object may be identified based at least in part on a user identifier (e.g., system user identifier) of the system instrument data object. In some examples, the exchange authorization request may include a user key and/or user reference from the system user data object.

In addition, or alternatively, the exchange authorization request may be indicative of an exchange identifier. By way of example, the exchange platform may generate an exchange identifier for representing the value-based exchange and provide the exchange identifier to the member platform.

In some embodiments, the process 800 includes, at step/operation 826, receiving an exchange authorization response. For example, the exchange platform (e.g., a partner service, service provider service, etc. thereof) may receive an exchange authorization response that is indicative of at least one of an exchange approval and/or an exchange denial. In some examples, the exchange authorization response may be received, using the service provider interface, from the service provider platform.

In some embodiments, the exchange authorization response is based at least in part on the secured event. For example, the exchange authorization response may be based at least in part on the secured event, a reception time of the exchange request, a member policy, and/or the like.

In some embodiment, the exchange platform (e.g., a service provider service thereof) may receive, using the service provider interface, an exchange authorization response that is indicative of at least one of a transaction approval and/or a transaction denial. In some embodiments, the exchange authorization response is based at least in part on a comparison between the transaction value and an asset availability of a service provider instrument. For example, responsive to receiving an exchange authorization request, a member platform may be configured to compare the transaction value to an asset availability of an identified service provider instrument. A value-based exchange may be authorized (e.g., resulting in a transaction approval, etc.) in the event that the asset availability exceeds the transaction value, otherwise the exchange may be denied (e.g., resulting in a transaction denial).

In some examples, the exchange authorization response may be indicative of one or more response attributes. The response attributes may include one or more error codes and/or the like for characterizing the exchange authorization response.

The exchange platform may generate an exchange record for the value-based exchange based at least in part on the exchange authorization request and/or the exchange authorization response. In some examples, the exchange record may be indicative of the exchange identifier, the one or more exchange attributes, one or more response attributes, the exchange authorization response, one or more instrument and/or user identifiers, and/or any other data related to the value-based exchange. In some examples, the exchange platform may store the exchange record in the platform data vault in association with the one or more instrument and/or user identifiers.

In some embodiments, the process 800 includes, at step/operation 828, providing an exchange response. For example, the exchange platform (e.g., a partner service, service provider service, etc. thereof) may provide the exchange response based at least in part on the exchange authorization response. In some examples, the exchange platform may provide, using the partner interface, the exchange response to the partner platform. The exchange response may be indicative of the exchange approval or the exchange denial.

The exchange response may be based at least in part on the exchange authorization response. For instance, the exchange response may be indicative of the transaction approval and/or the transaction denial. In some examples, the exchange response may be indicative of a replacement UUEK (if generated), one or more exchange attributes, an exchange identifier, and/or one or more response attributes. In some examples, the member platform may be configured to replace the UUEK with the replacement UUEK. For instance, the exchange response may be provided to a partner platform. The partner platform may receive the exchange response and replace the UUEK with the replacement UUEK. Having thus described various operations, processes, methods, functions, and/or the like for handling an exchange on behalf of a user, various user interface screens for controlling, initiating, executing, and/or the like such steps/operations are provided and described. In various embodiments, the user interface screens provided and described in the present disclosure are configured to be provided via a user interface of a client device 104.

FIGS. 9A-D provide an example user interface flow configured for a client device 104. The user interfaces may be configured to guide a user through a credential-less exchange process to facilitate a value-based exchange between one or more member platforms without exposing sensitive and persistent credentials for a service provider instrument that is used to execute the value-based exchange. The credential-less exchange process may begin when the user selects a payment method from a partner application's exchange processing screen 902, as shown by FIG. 9A. Upon selection of a payment method facilitated by the exchange platform, the user may be transitioned to an instrument selection screen 904, as shown by FIG. 9B. The instrument selection screen 904 may include a plurality of selectable instrument icons 906 that may each be affiliated with an UUEK issued by the exchange platform using various techniques described herein. The user may execute the exchange by selecting one or more of the selectable instrument icons 906.

In some examples, in response to the selection, a scanning screen 908 may be provided for an in-store exchange. The scanning screen 908 may present an enabled and/or disabled UUEK representation 910 corresponding to an UUEK. The user may scan the UUEK representation 910 to complete the value-based exchange. In the event that the UUEK is a disabled UUEK, the user may be transitioned to a verification user screen 912 to supply a security code 914 associated with the UUEK. The user may enter the security code 914 to enable the UUEK and complete the exchange.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
receiving from a partner platform, by one or more processors of an exchange platform with a preestablished relationship with the partner platform and a service provider platform, a secured interaction request that comprises a security code input associated with a user;
identifying, by the one or more processors, a security code tuple for the security code input, wherein the security code tuple comprises a security code reference and a user identifier;
validating, by the one or more processors, the security code input based at least in part on a comparison between the security code input the security code reference;
in response to validating the security code input,
(i) generating, by the one or more processors, a secured event;
(ii) storing, by the one or more processors, the secured event in association with a system exchange data object that (a) corresponds to the user identifier and (b) comprises an exchange identifier and a system instrument identifier, wherein the system instrument identifier (a) corresponds to an instrument reference that references a member instrument identifier internally stored by the service provider platform and (b) corresponds to an instrument key that is previously provided to the service provider platform by the exchange platform,
(iii) accessing, by the one or more processors, a universally unique ephemeral key (UUEK) that comprises (a) the exchange identifier and (b) a partner partition that is previously defined by the exchange platform to identify the partner platform, and
(iv) issuing to the partner platform, by the one or more processors, a secured interaction response that comprises the UUEK;
receiving, by one or more processors and through a partner interface preconfigured for the partner platform, an exchange request with the UUEK for executing a network exchange between the partner platform and the service provider platform;
identifying, by the one or more processors, the exchange identifier and the partner partition based at least in part on the UUEK;
identifying, by the one or more processors, the partner platform based at least in part on the partner partition;
identifying, by the one or more processors and using the exchange identifier and the partner partition, the system exchange data object that corresponds to the instrument reference and the instrument key;
providing to the service provider platform, by the one or more processors, an exchange authorization request comprising the instrument reference, the instrument key corresponding to the system instrument identifier, and an indication of the secured event; and
receiving from the service provider platform, by the one or more processors, an exchange authorization response for the network exchange.

2. The computer-implemented method of claim 1, wherein the secured interaction request is received, using the partner interface corresponding to the partner platform, in response to a selection input to a disabled UUEK representation that corresponds to an unissued UUEK.

3. The computer-implemented method of claim 2, wherein:
(i) the disabled UUEK representation is presented for display through a user interface, and
(ii) in response to the secured interaction response, the user interface is modified to present an enabled UUEK representation that corresponds to an issued UUEK.

4. The computer-implemented method of claim 1, further comprising:
providing to the partner platform, by the one or more processors, an exchange response that is reflective of the exchange authorization response from the service provider platform.

5. The computer-implemented method of claim 1, wherein the security code reference comprises an n-character sequence of one or more distinct characters.

6. The computer-implemented method of claim 5, wherein the one or more distinct characters comprise one or more alphanumeric characters.

7. The computer-implemented method of claim 1, wherein the security code tuple comprises the security code reference and the user identifier and is previously generated by the exchange platform in response to a security code request from the service provider platform.

8. The computer-implemented method of claim 1, wherein the secured event is associated with a secured time period, and the exchange authorization response is based at least in part on the secured event and a reception time of the exchange request.

9. The computer-implemented method of claim 1, wherein the service provider platform is associated with a member policy that defines one or more validation requirements for a service provider instrument corresponding to the system instrument identifier, and wherein the computer-implemented method further comprises:

determining that the UUEK is enabled based at least in part on the member policy, the exchange request, and the secured event.

10. The computer-implemented method of claim 9, wherein the exchange request comprises one or more object attributes and the one or more validation requirements correspond to one or more exchange attributes that are based at least in part on the one or more object attributes.

11. The computer-implemented method of claim 10, wherein the one or more exchange attributes comprise an exchange value and the one or more validation requirements define an exchange value threshold in which a respective secured event is required for the service provider instrument.

12. The computer-implemented method of claim 1, wherein the exchange identifier comprises a universally unique identifier (UUID), and the computer-implemented method further comprises:
  generating, by the one or more processors, the UUEK in accordance with a key format that defines a placement of the exchange identifier, the partner partition, an identifier type, and one or more flags.

13. The computer-implemented method of claim 1, further comprising:
  generating, by the one or more processors, an exchange record for the network exchange that comprises the exchange identifier, one or more exchange attributes, and one or more response attributes from the exchange authorization response;
  storing, by the one or more processors, the exchange record in a platform data vault of the exchange platform; and
  disabling, by the one or more processors, the UUEK for a subsequent network exchange.

14. A computing system comprising memory and one or more processors communicatively coupled to the memory, the one or more processors configured to:
  receive from a partner platform and by an exchange platform with a preestablished relationship with the partner platform and a service provider platform, a secured interaction request that comprises a security code input associated with a user;
  identify, by the exchange platform, a security code tuple for the security code input, wherein the security code tuple comprises a security code reference and a user identifier;
  validate, by the exchange platform, the security code input based at least in part on a comparison between the security code input the security code reference;
  in response to validating the security code input,
  (i) generate, by the exchange platform, a secured event;
  (ii) store, by the exchange platform, the secured event in association with a system exchange data object that (a) corresponds to the user identifier and (b) comprises an exchange identifier and a system instrument identifier, wherein the system instrument identifier (a) corresponds to an instrument reference that references a member instrument identifier internally stored by the service provider platform and (b) corresponds to an instrument key that is previously provided to the service provider platform by the exchange platform, and
  (iii) accessing, by the exchange platform, a universally unique ephemeral key (UUEK) that comprises (a) the exchange identifier and (b) a partner partition that is previously defined by the exchange platform to identify the partner platform, and
  (iv) issuing, by the exchange platform and to the partner platform, a secured interaction response that comprises the UUEK;
  receive, by the exchange platform and through a partner interface preconfigured for the partner platform, an exchange request with the UUEK for executing a network exchange between the partner platform and the service provider platform;
  identifying, by the exchange platform, the exchange identifier and the partner partition based at least in part on the UUEK;
  identifying, by the exchange platform, the partner platform based at least in part on the partner partition;
  identifying, by the exchange platform and using the exchange identifier and the partner partition, the system exchange data object that corresponds to the instrument reference and the instrument key;
  provide, by the exchange platform and to the service provider platform, an exchange authorization request comprising the instrument reference, the instrument key corresponding to the system instrument identifier, and an indication of the secured event; and
  receive, by the exchange platform and from the service provider platform, an exchange authorization response for the network exchange.

15. The computing system of claim 14, wherein the secured interaction request is received, using the partner interface corresponding to the partner platform, in response to a selection input to a disabled UUEK representation that corresponds to an unissued UUEK.

16. The computing system of claim 15, wherein:
  (i) the disabled UUEK representation is presented for display through a user interface, and
  (ii) in response to the secured interaction response, the user interface is modified to present an enabled UUEK representation that corresponds to an issued UUEK.

17. The computing system of claim 14, wherein the one or more processors configured to:
  providing, by the exchange platform to the partner platform, an exchange response that is reflective of the exchange authorization response from the service provider platform.

18. The computing system of claim 14, wherein the secured event is associated with a secured time period, and the exchange authorization response is based at least in part on the secured event and a reception time of the exchange request.

19. One or more non-transitory computer-readable storage media including instructions that, when executed by one or more processors, cause the one or more processors to:
  receive from a partner platform and by an exchange platform with a preestablished relationship with the partner platform and a service provider platform, a secured interaction request that comprises a security code input associated with a user;
  identify, by the exchange platform, a security code tuple for the security code input, wherein the security code tuple comprises a security code reference and a user identifier;
  validate, by the exchange platform, the security code input based at least in part on a comparison between the security code input the security code reference;
  in response to validating the security code input,
  (i) generate, by the exchange platform, a secured event;
  (ii) store, by the exchange platform, the secured event in association with a system exchange data object that (a) corresponds to the user identifier and (b) comprises an exchange identifier and a system instrument identifier, wherein the system instrument identifier (a) corresponds to an instrument reference that references a member instrument identifier internally stored by the service provider platform and (b) corresponds to an instrument key that is previously provided to the service provider platform by the exchange platform, and (iii) accessing, by the exchange platform, a universally unique ephemeral key (UUEK) that comprises (a) the exchange identifier and (b) a partner partition that is previously defined by the exchange platform to identify the partner platform, and (iv) issuing, by the exchange platform and to the partner platform, a secured interaction response that comprises the UUEK;

receive, by the exchange platform and through a partner interface preconfigured for the partner platform, an exchange request with the UUEK for executing a network exchange between the partner platform and the service provider platform;

identifying, by the exchange platform, the exchange identifier and the partner partition based at least in part on the UUEK;

identifying, by the exchange platform, the partner platform based at least in part on the partner partition;

identifying, by the exchange platform and using the exchange identifier and the partner partition, the system exchange data object that corresponds to the instrument reference and the instrument key;

provide, by the exchange platform and to the service provider platform, an exchange authorization request comprising the instrument reference, the instrument key corresponding to the system instrument identifier, and an indication of the secured event; and receive, by the exchange platform and from the service provider platform, an exchange authorization response for the network exchange.

20. The one or more non-transitory computer-readable storage media of claim 19, wherein the security code reference comprises an n-character sequence of one or more distinct characters and the one or more distinct characters comprise one or more alphanumeric characters.

* * * * *